(12) United States Patent
Guion et al.

(10) Patent No.: US 7,414,920 B2
(45) Date of Patent: Aug. 19, 2008

(54) ACOUSTIC GENERATOR FOR DISTANCE SOUNDING WITH MICROPHONE DESIGNED FOR EFFICIENT ECHO DETECTION

(75) Inventors: Walter Franklin Guion, Channel Islands, CA (US); Steven Lee Herbruck, Ojai, CA (US)

(73) Assignee: WellSonic LC, Port Hueneme, CA (US)

( * ) Notice: Subject to any disclaimer, the term of this patent is extended or adjusted under 35 U.S.C. 154(b) by 0 days.

(21) Appl. No.: 10/907,612

(22) Filed: Apr. 8, 2005

(65) Prior Publication Data

US 2007/0140059 A1 Jun. 21, 2007

(51) Int. Cl.
*G01V 1/137* (2006.01)
(52) U.S. Cl. ...................................... 367/144
(58) Field of Classification Search ................. 367/144, 367/908, 13; 181/108
See application file for complete search history.

(56) References Cited

U.S. PATENT DOCUMENTS

| | | | |
|---|---|---|---|
| 2,209,944 A | 7/1940 | Walker | |
| 2,232,476 A | 2/1941 | Ritzmann | |
| 2,927,301 A | 3/1960 | Booth et al. | |
| 4,408,676 A * | 10/1983 | McCoy | 367/908 |
| 4,637,463 A * | 1/1987 | McCoy | 367/908 |
| 4,646,871 A * | 3/1987 | Wolf | 367/144 |
| 4,750,583 A * | 6/1988 | Wolf | 367/144 |
| 5,834,710 A * | 11/1998 | Finnestad | 367/908 |
| 2006/0225948 A1* | 10/2006 | Guion | 181/107 |
| 2006/0227665 A1* | 10/2006 | Guion et al. | 367/144 |
| 2007/0036032 A1* | 2/2007 | Guion | 367/144 |
| 2007/0115756 A1* | 5/2007 | Guion | 367/144 |

FOREIGN PATENT DOCUMENTS

WO    WO 2006110417 A2 * 10/2006

* cited by examiner

*Primary Examiner*—Dan Pihulic
(74) *Attorney, Agent, or Firm*—Mark D. Fox

(57) ABSTRACT

In the oil industry, the acoustic sounding method is a well-known technique for taking the depth measurements of particular attributes of an oil well or borehole. The method involves sending a short, sharp, clear, loud bang sound down a borehole, normally between the inside wall of the borehole casing, commonly referred to as the annulus and the outside of the production tubing string, and recording the echoes generated. One device for generating the sound needed in the acoustic sounding method is an air or gas pressurized chamber which is discharged at or near the wellhead of the borehole. The sound being generated by this device, commonly known as an acoustic generator, comes from the energy released by the equilibration of the different gas pressures. The current invention is an acoustic generator with an improved microphone and microphone unit design for more efficient and effective echo detection.

19 Claims, 34 Drawing Sheets

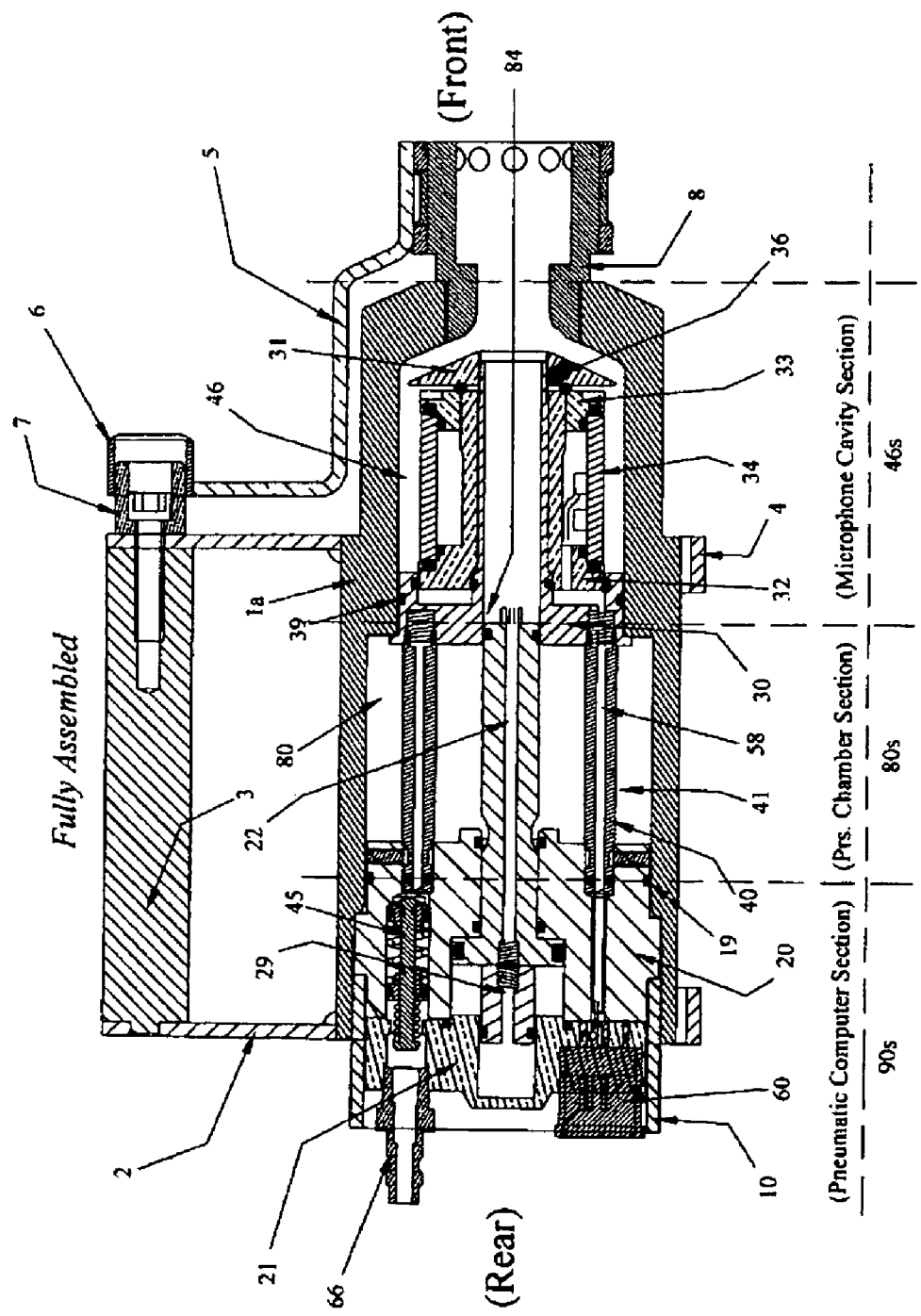

Stationary Housing

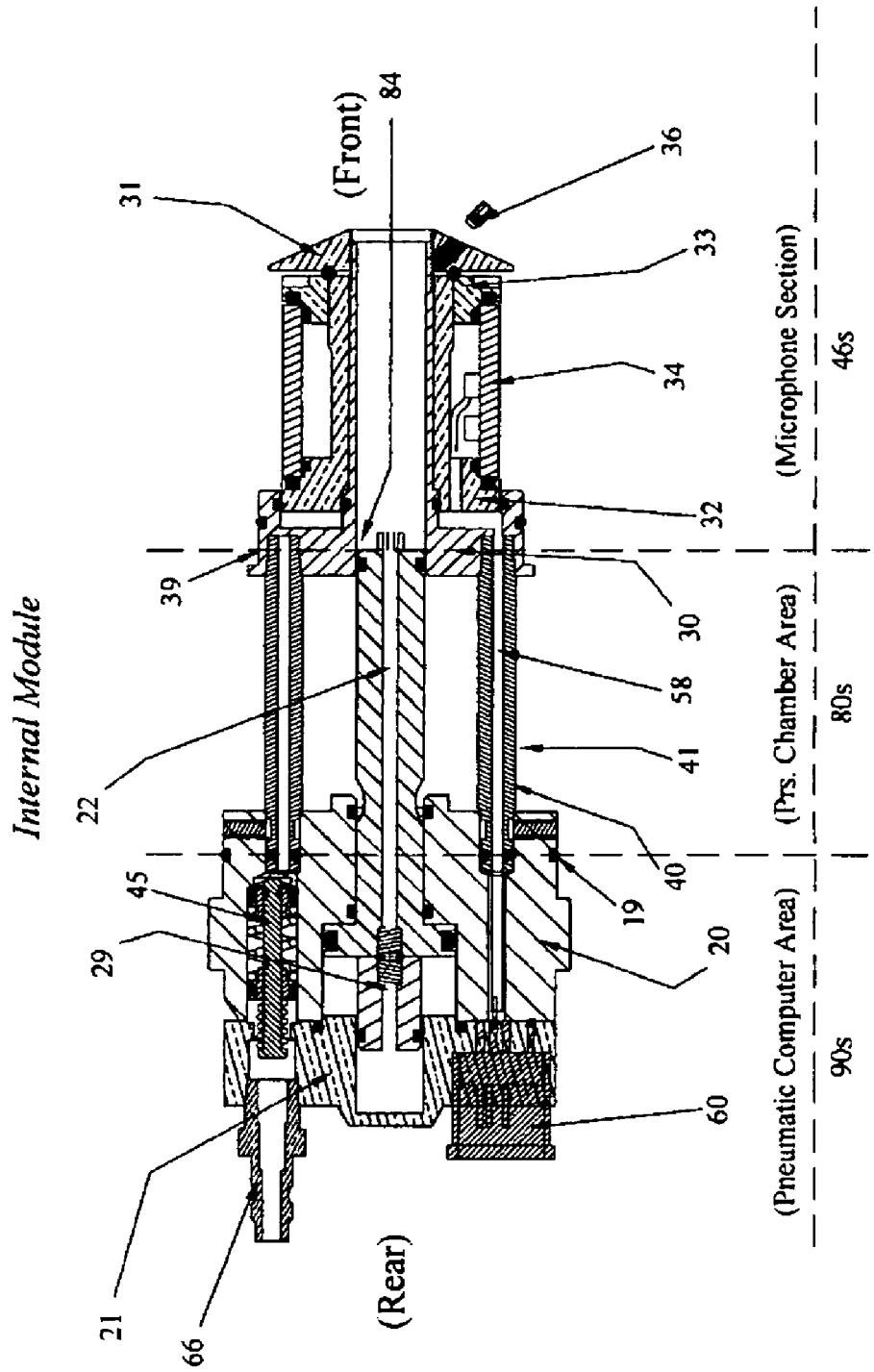

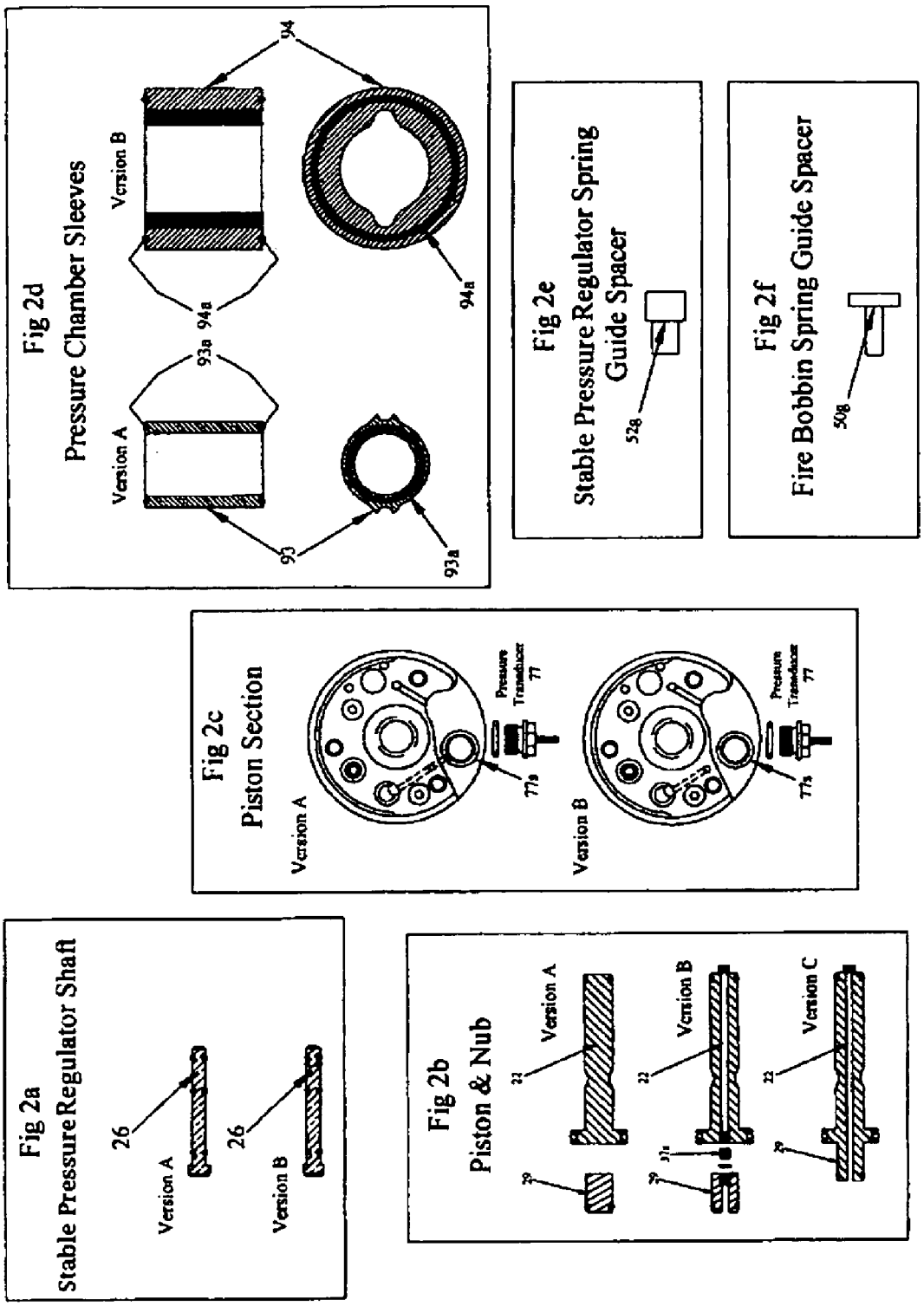

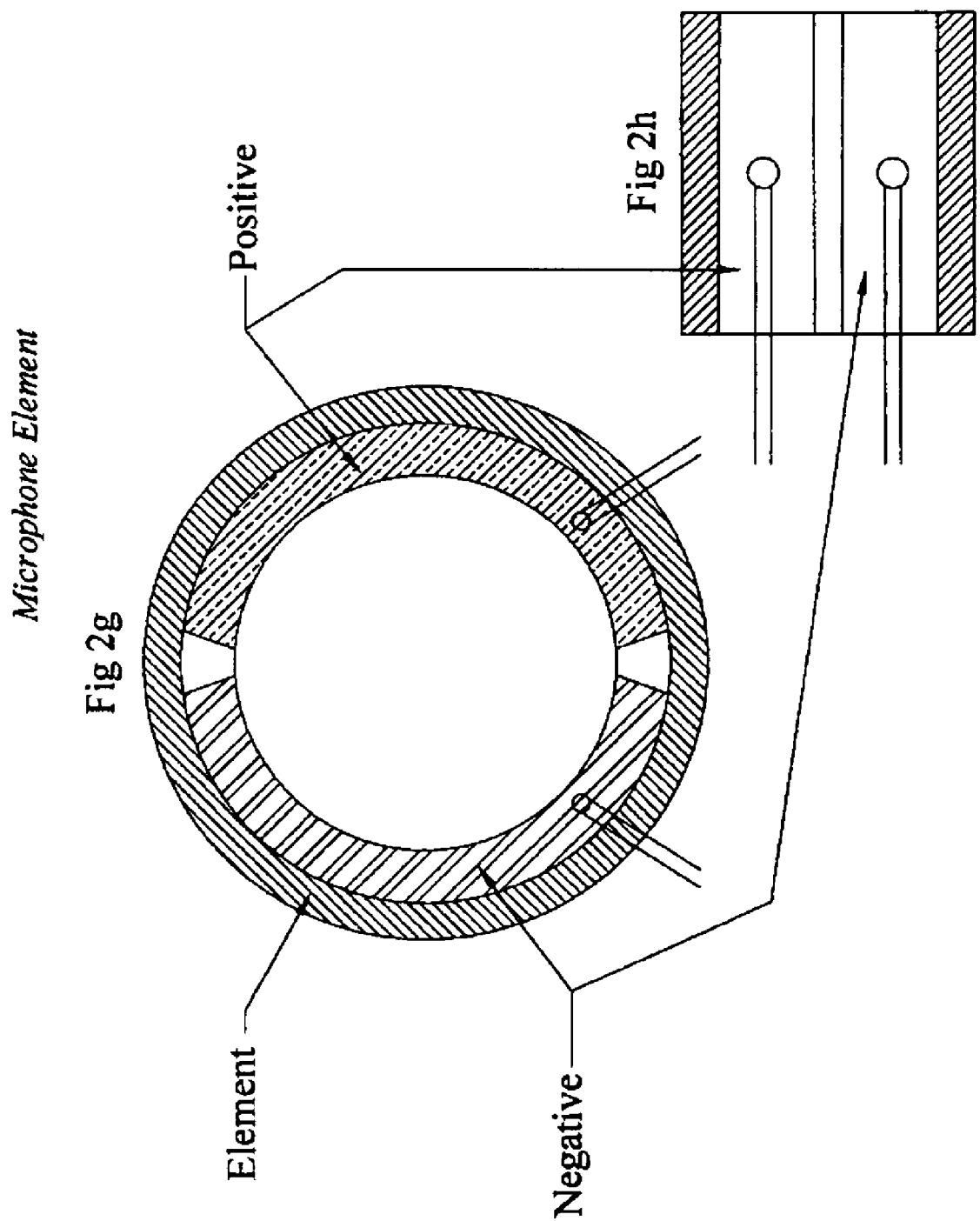

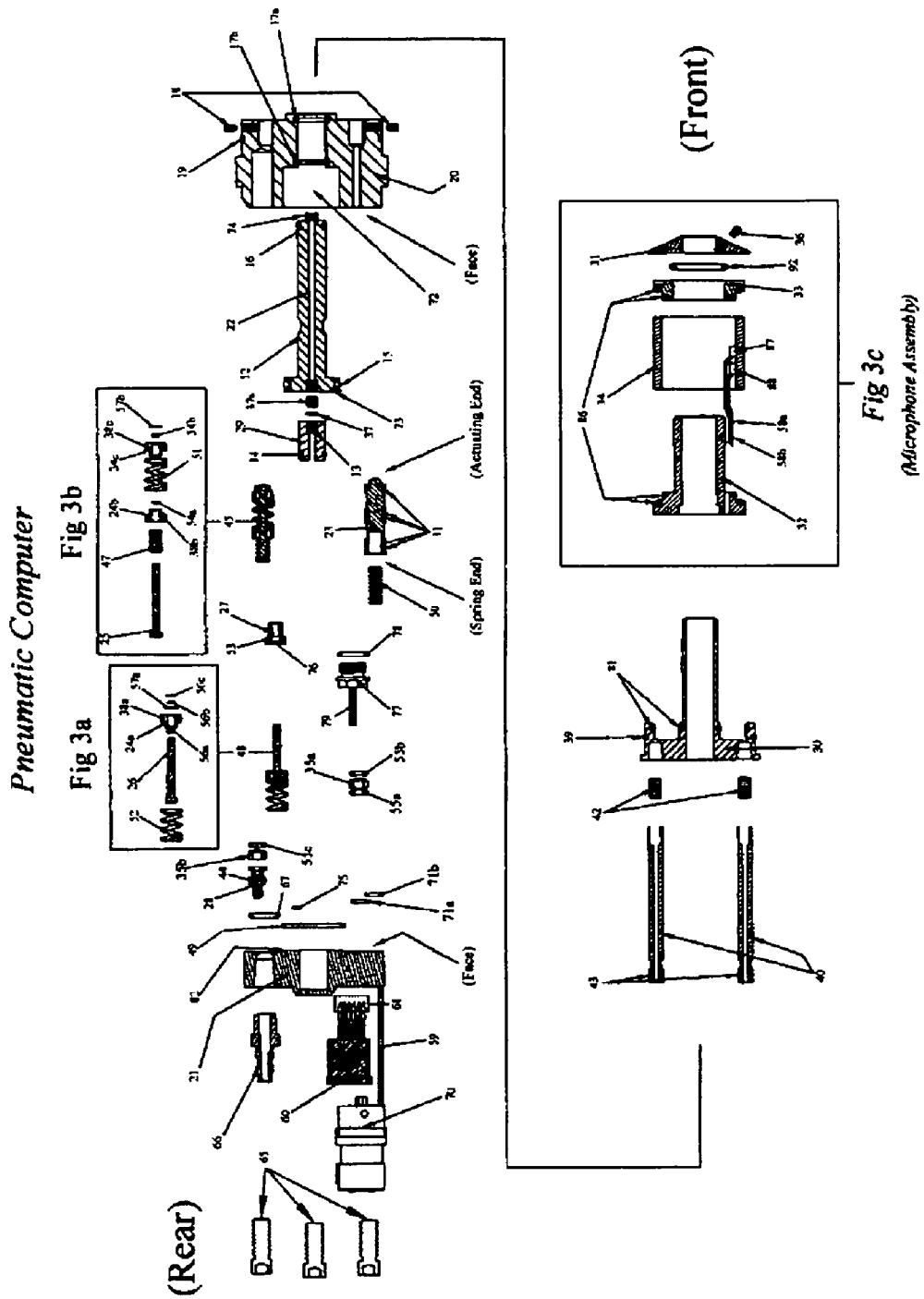

Fig 4
*Top and Piston Section Views*
Fig 4a
(Top Section Rear View) (21)
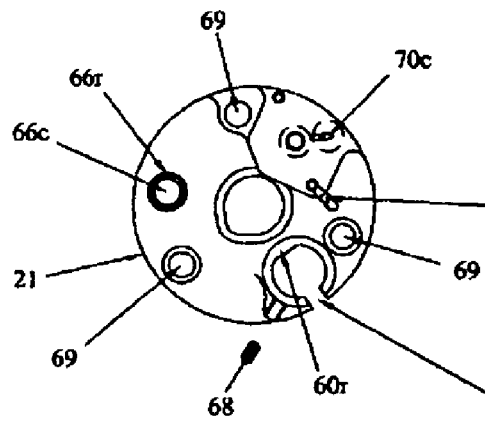
Fig 4b
(Top Section Front View)
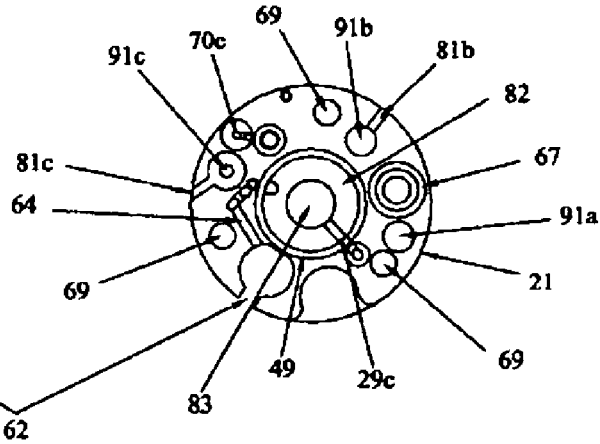
Fig 4c
(Piston Section Rear View) (20)
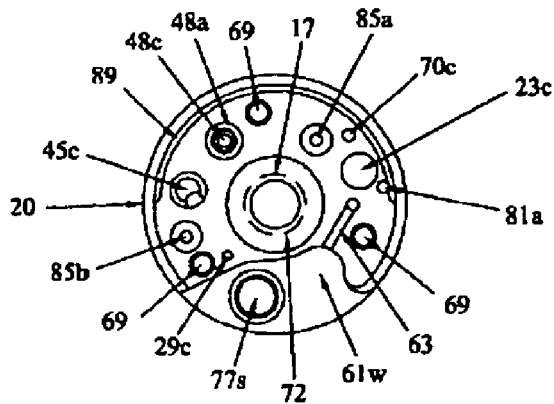
Fig 4d
(Piston Section Front View)
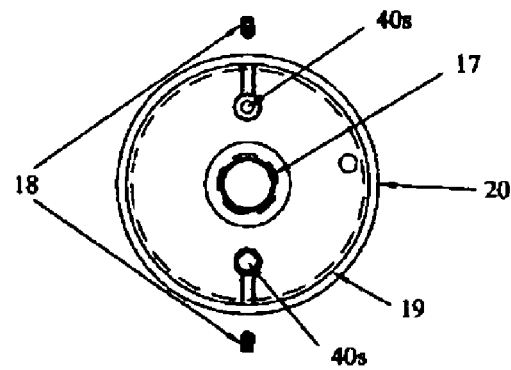

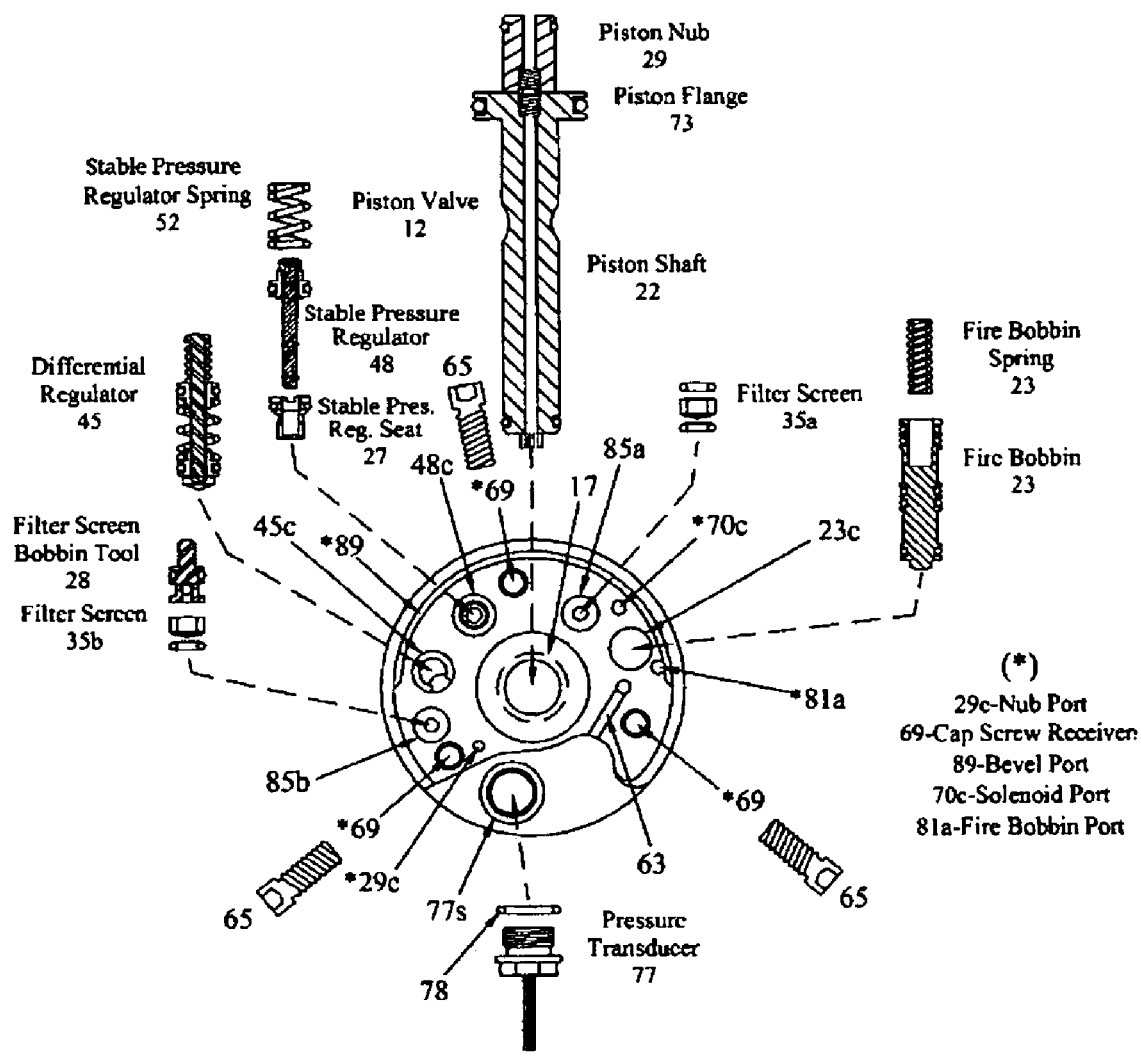

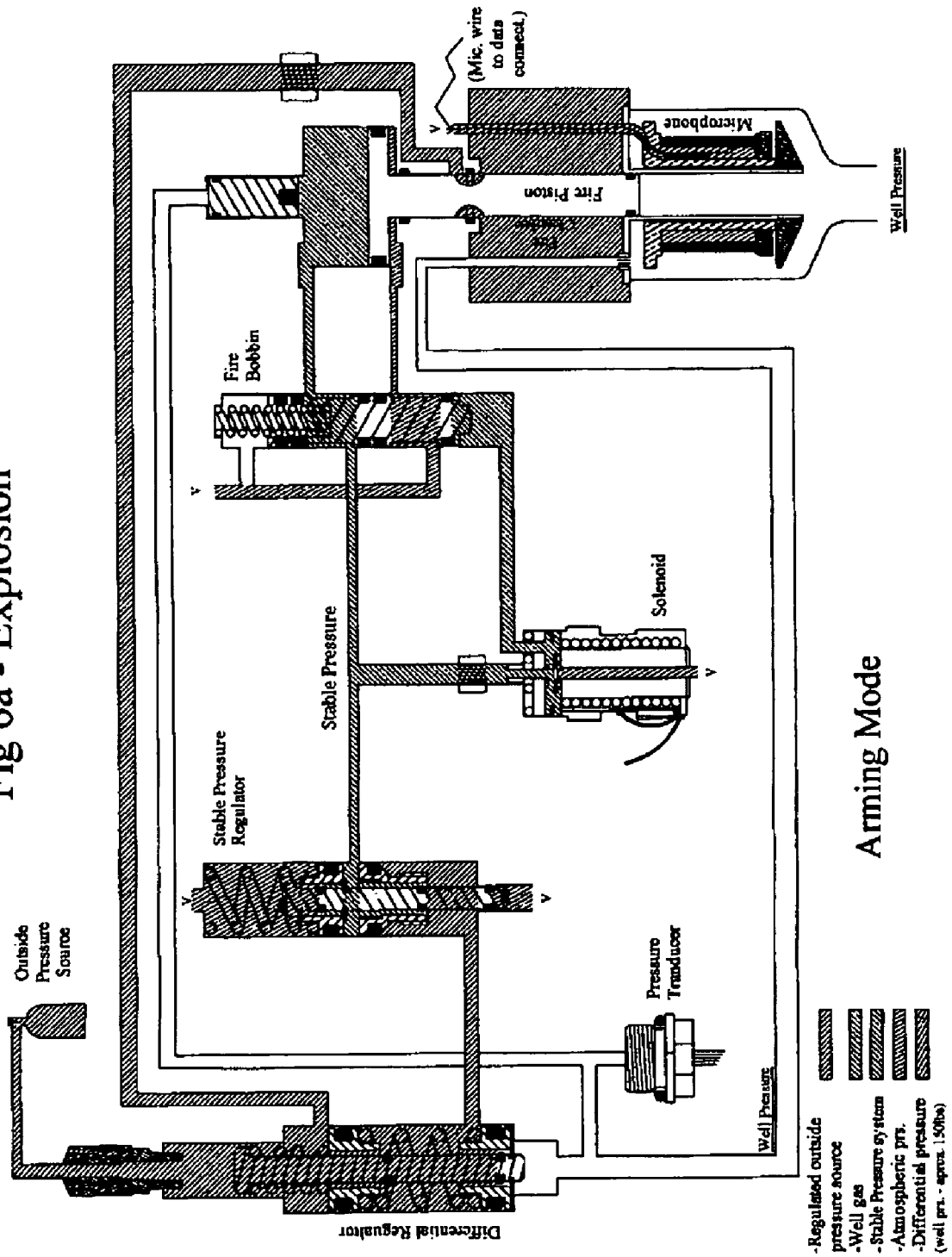

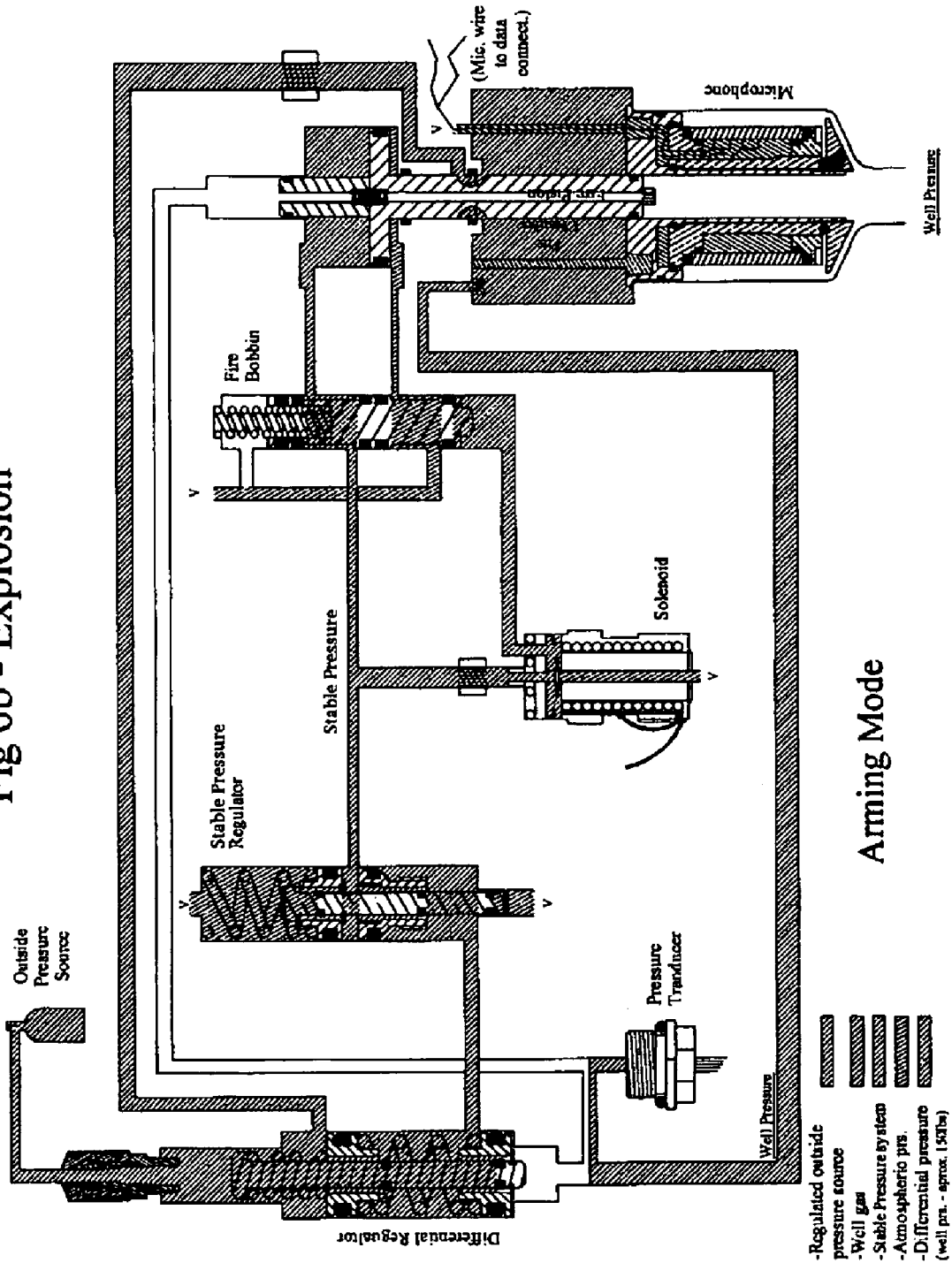

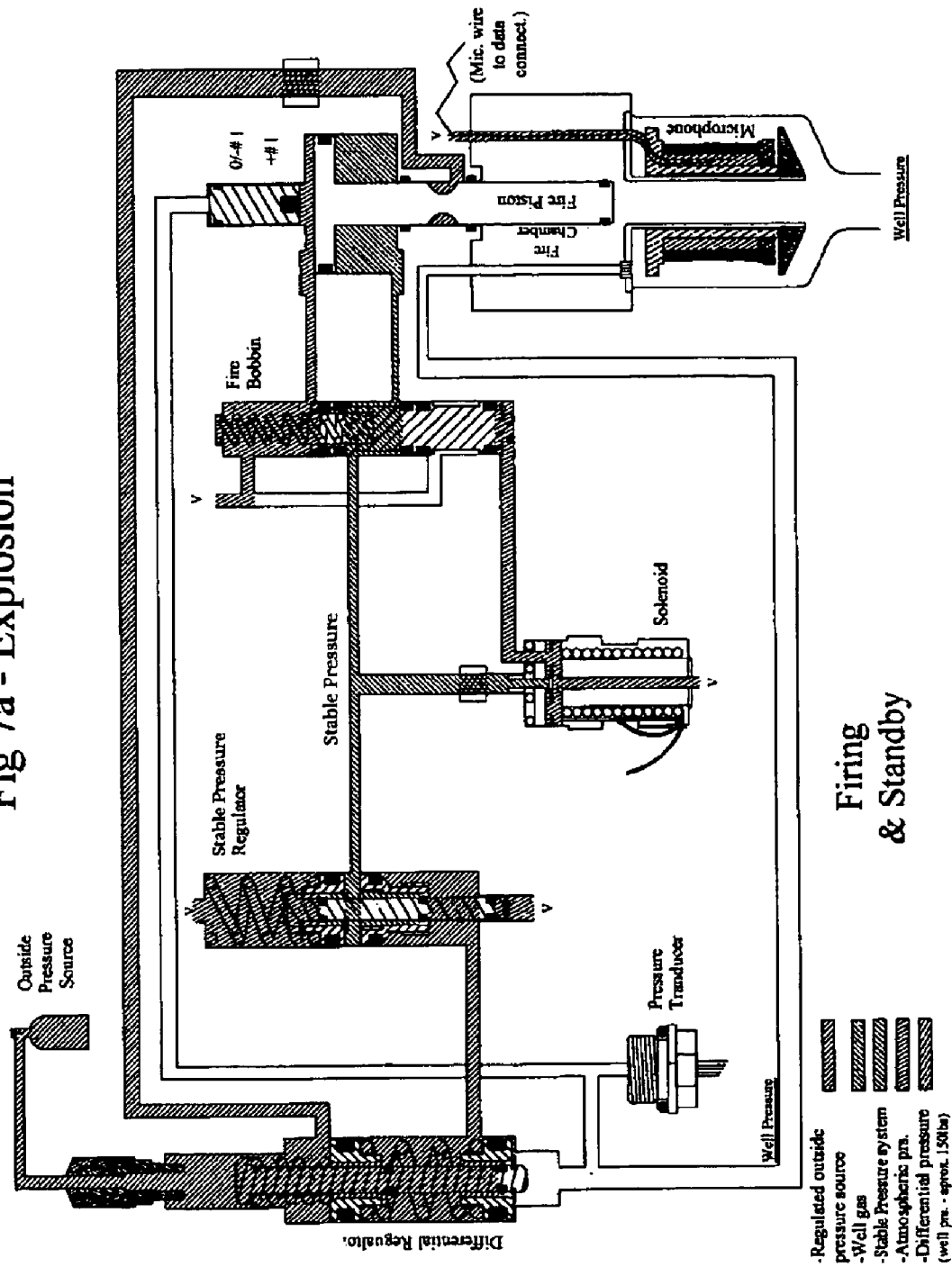

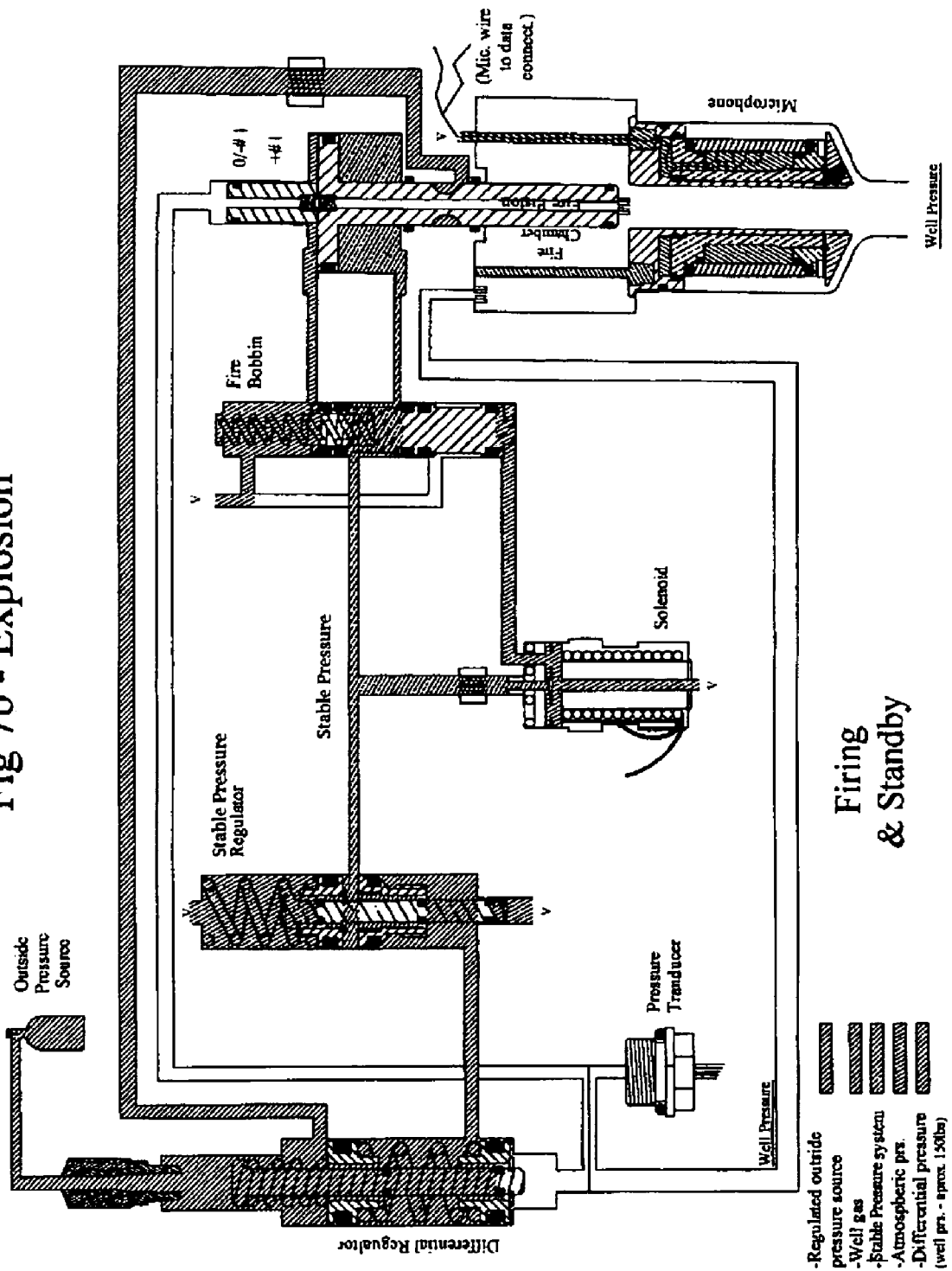
Fig 7b - Explosion

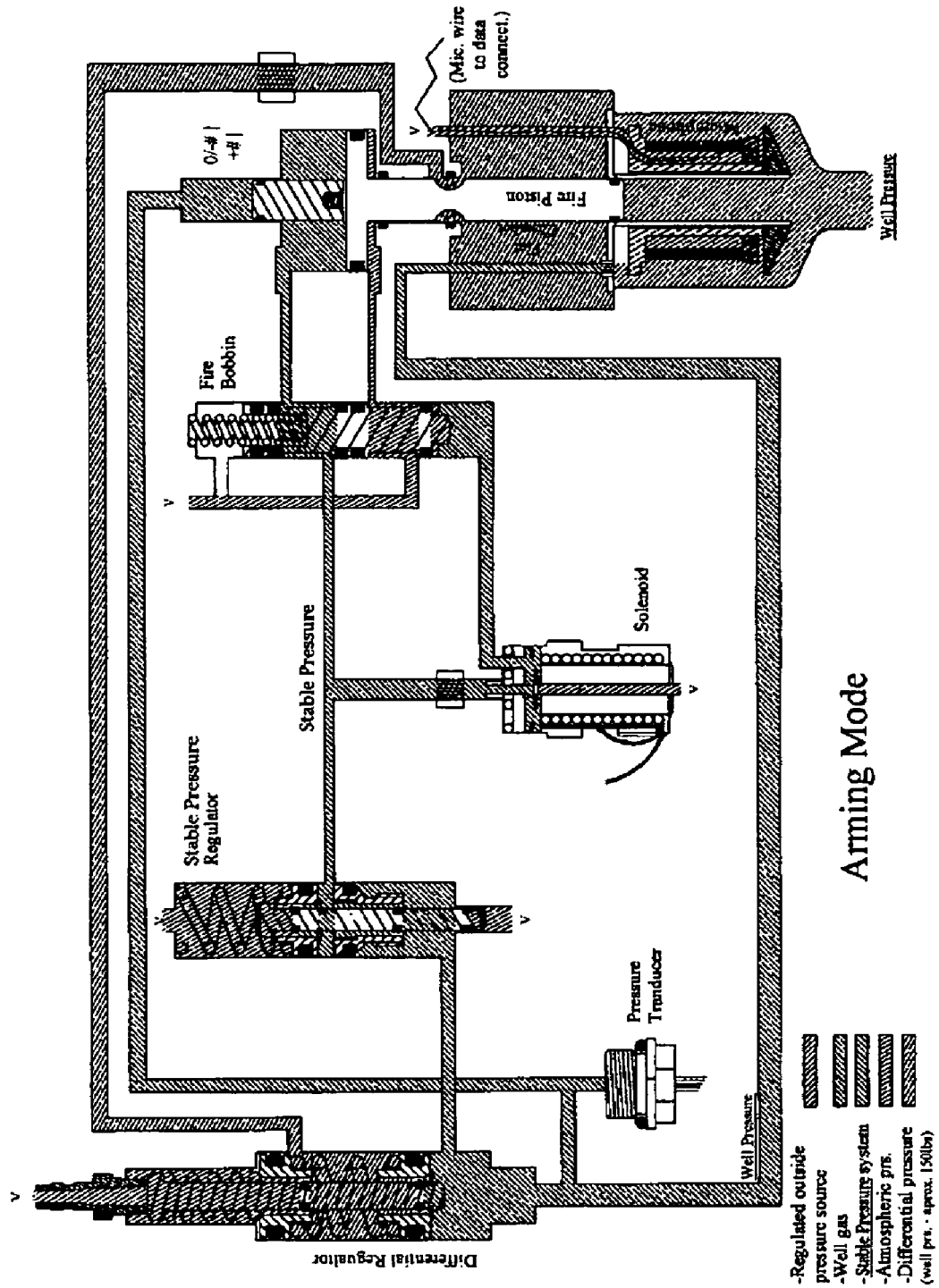

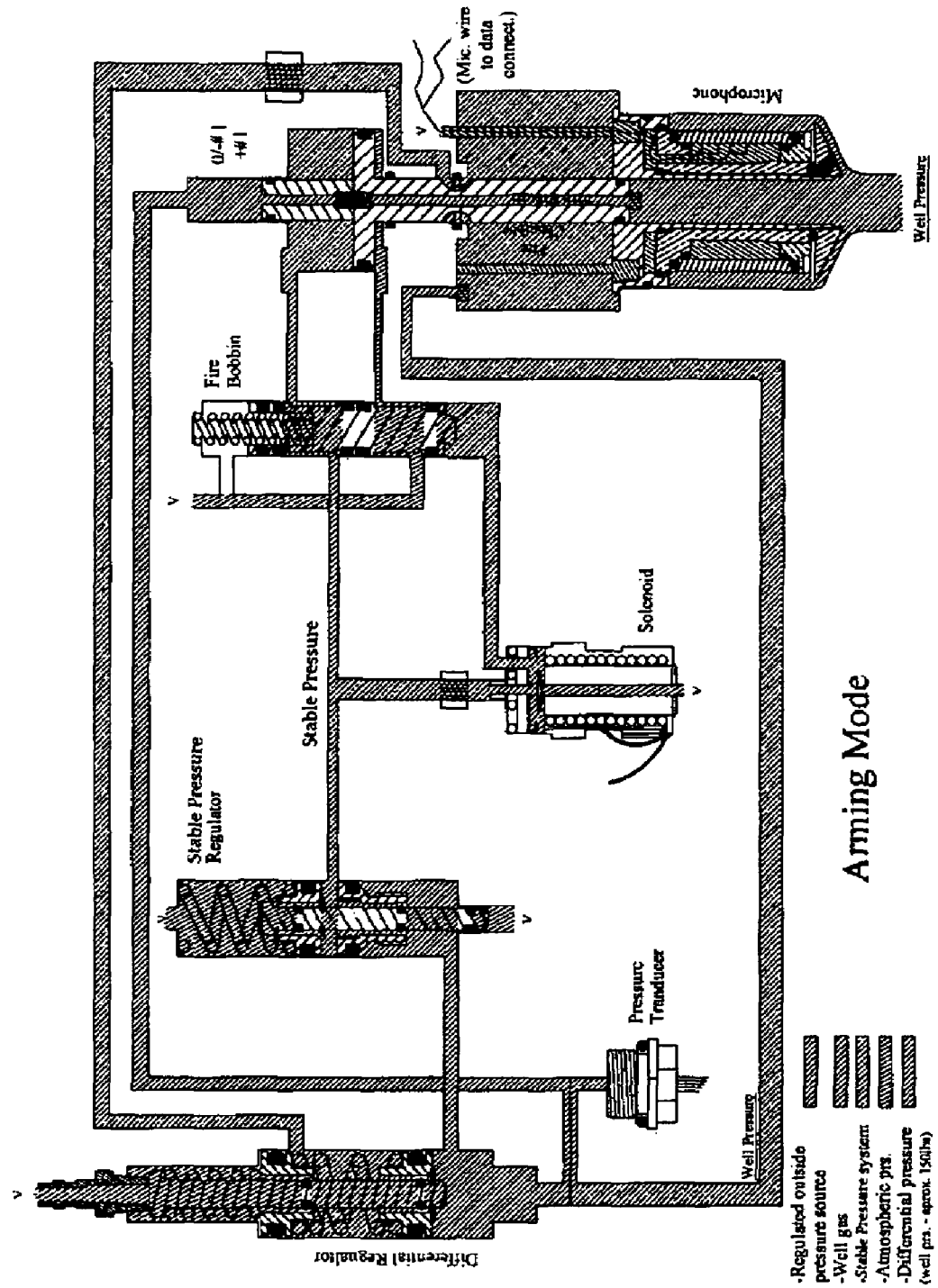

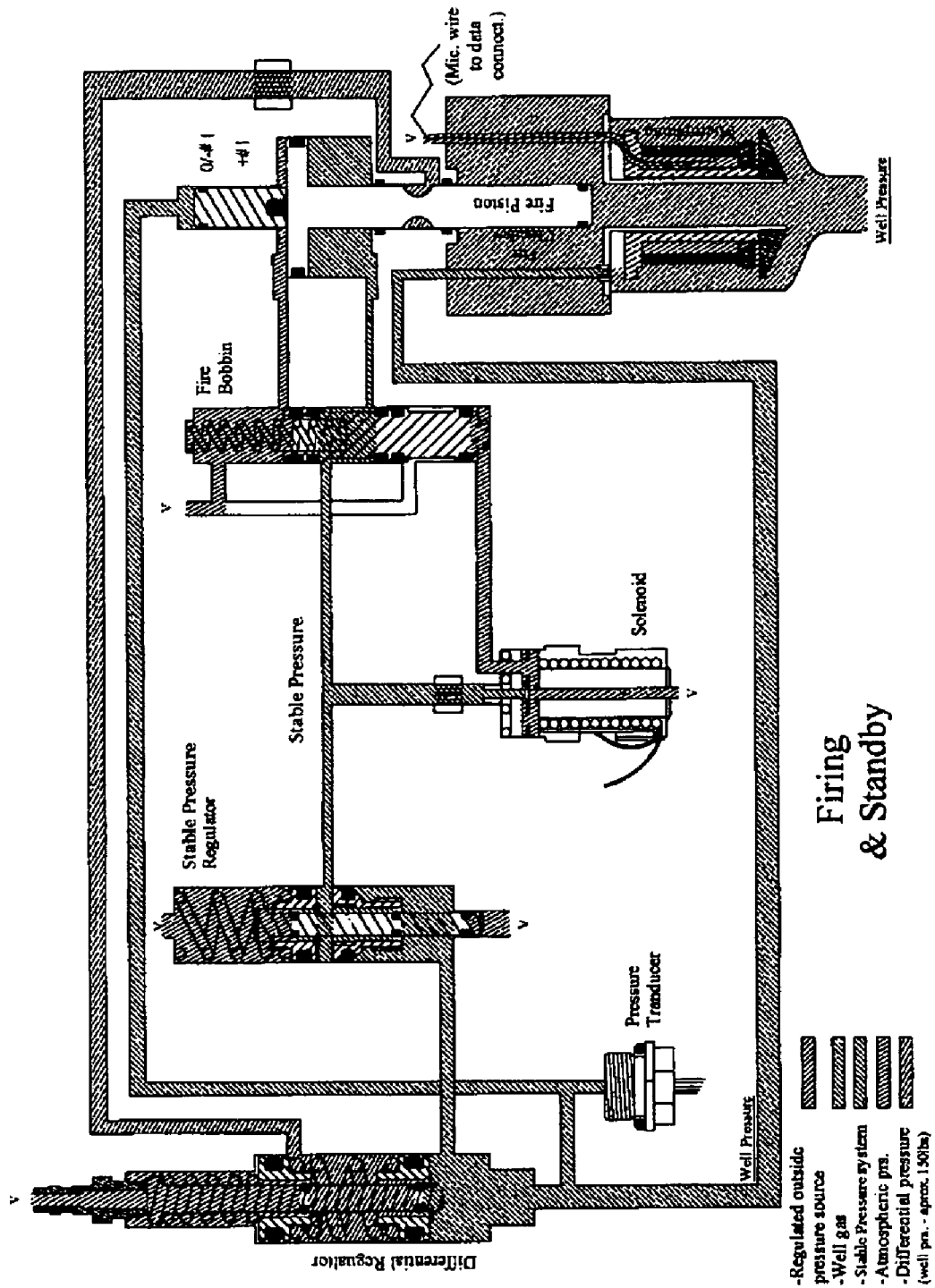
Fig 9a - Implosion

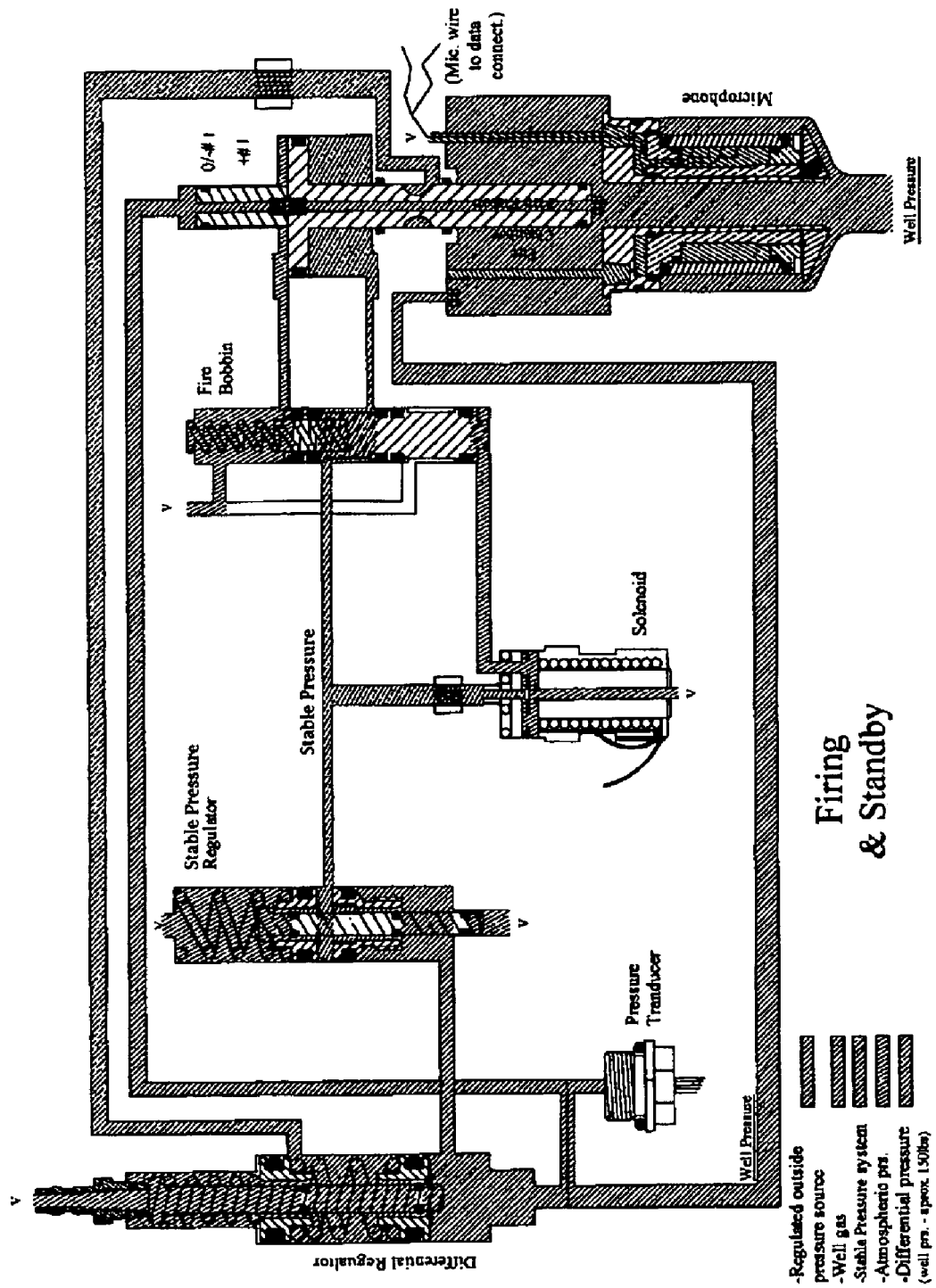
Fig 9b - Implosion

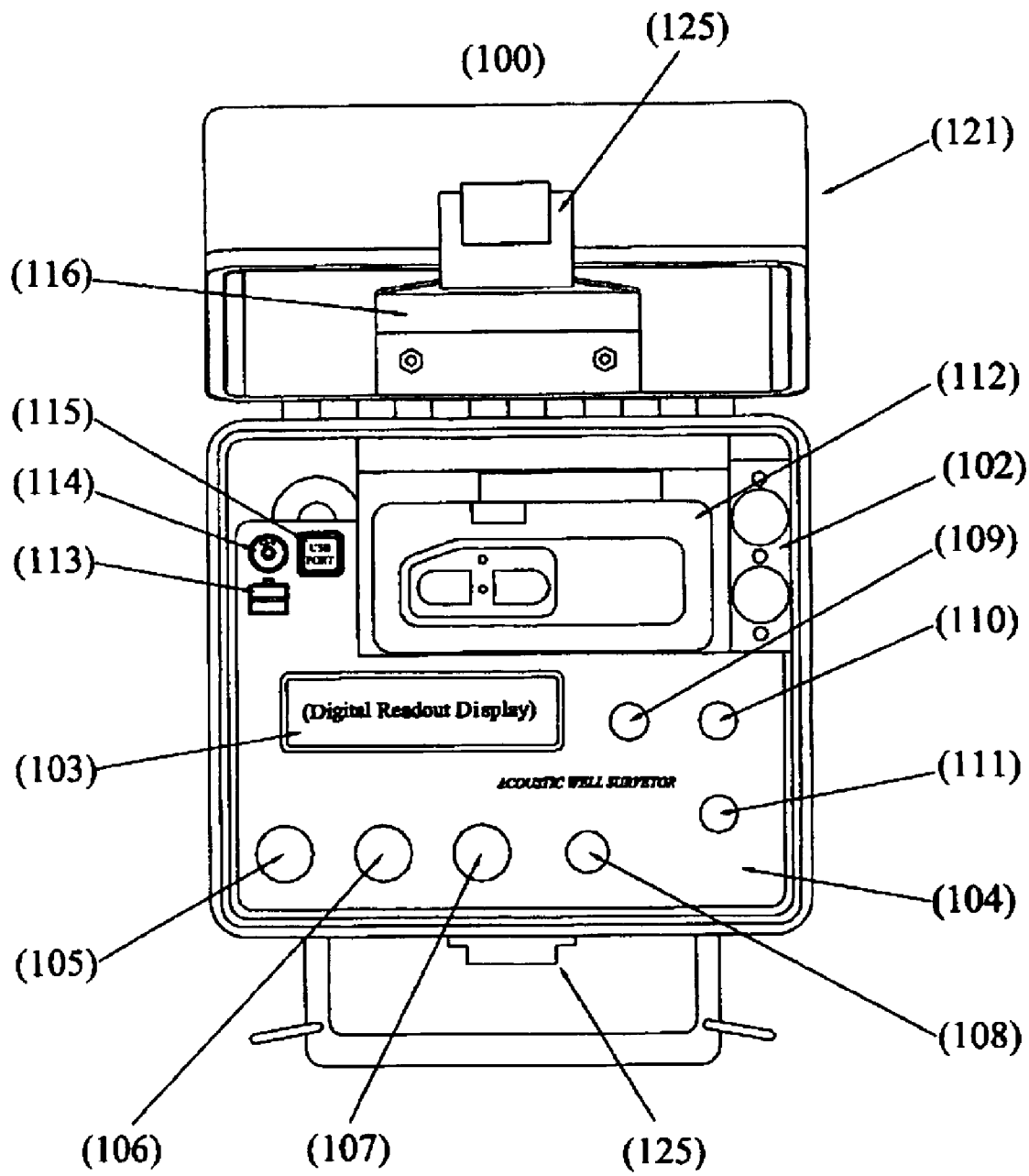

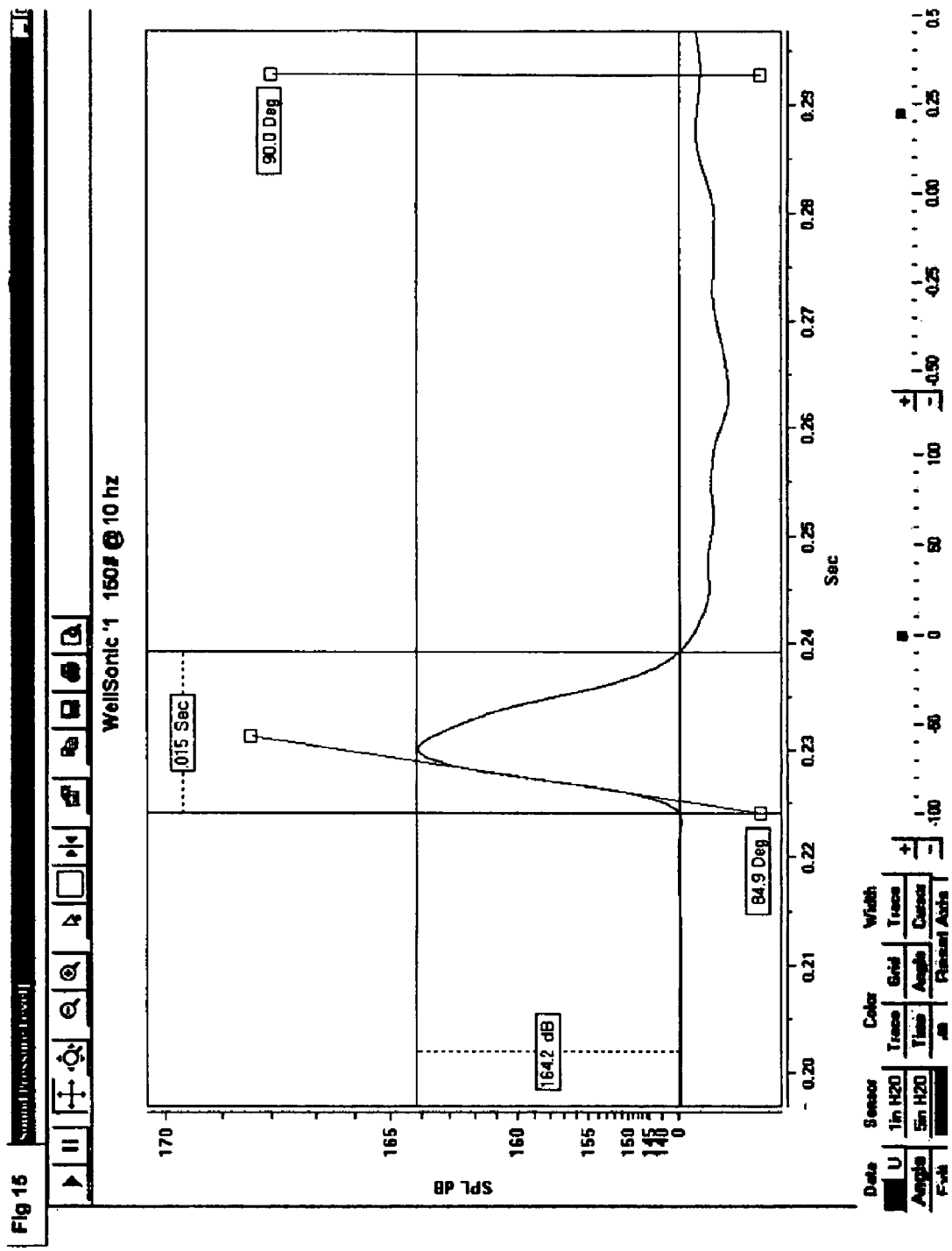

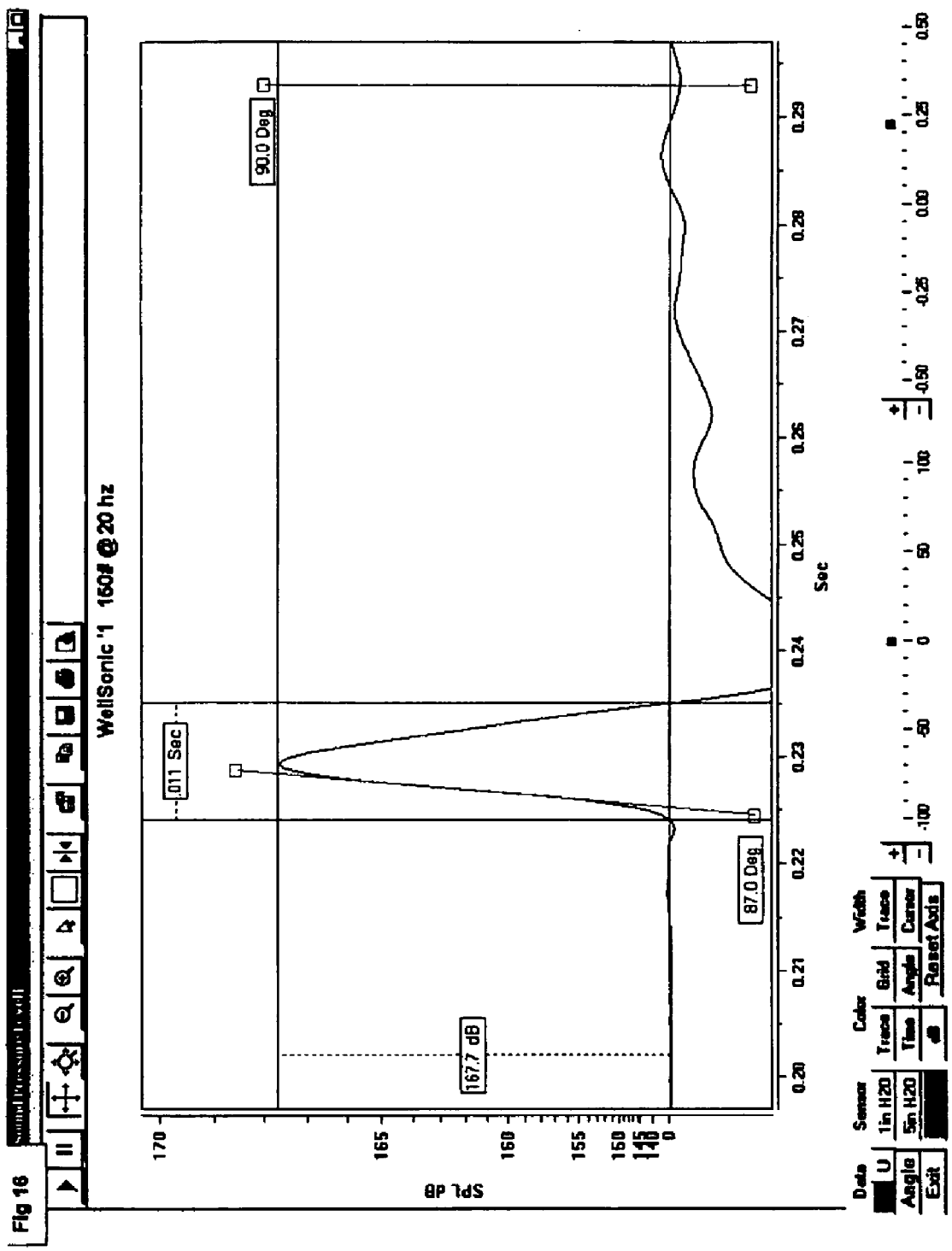

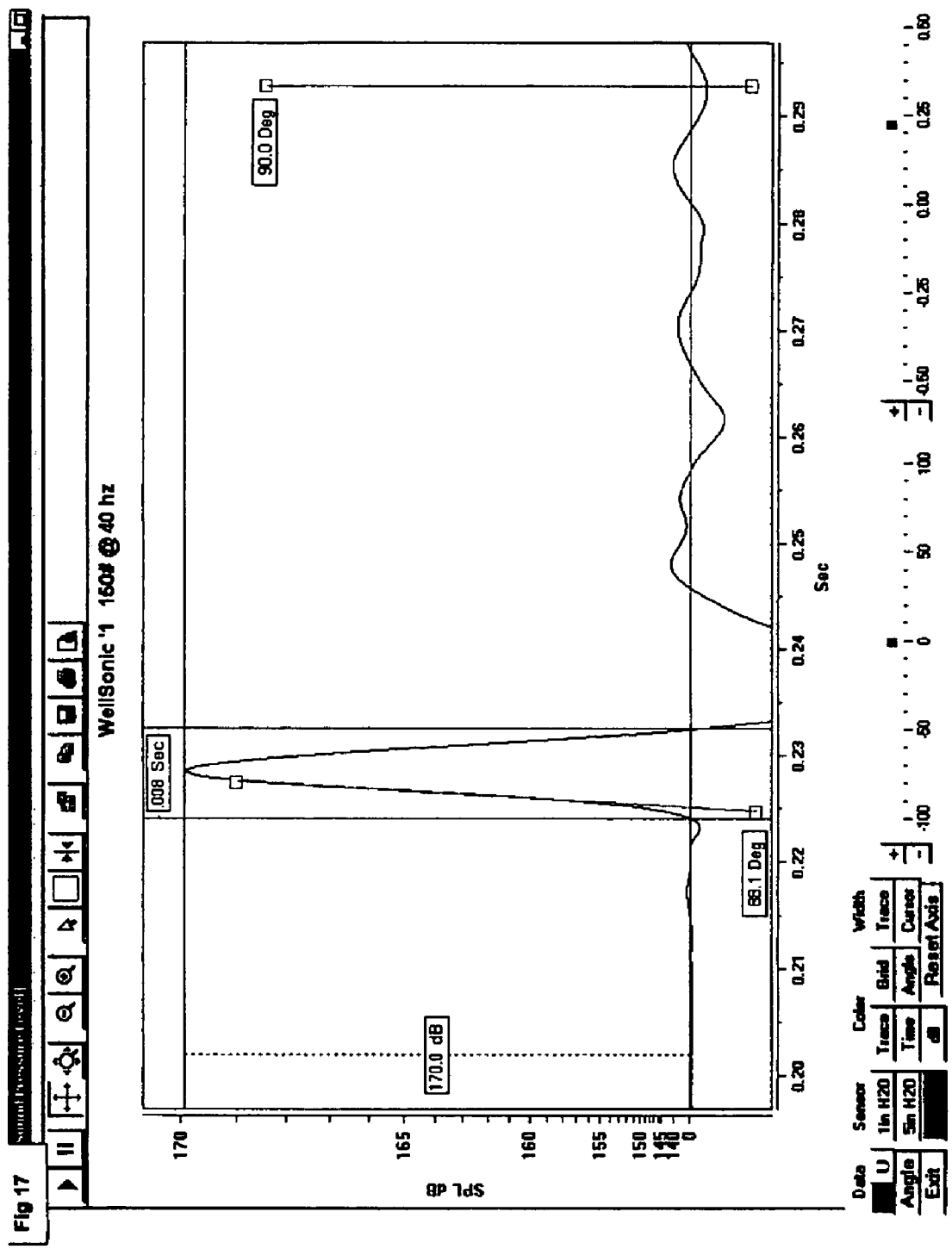

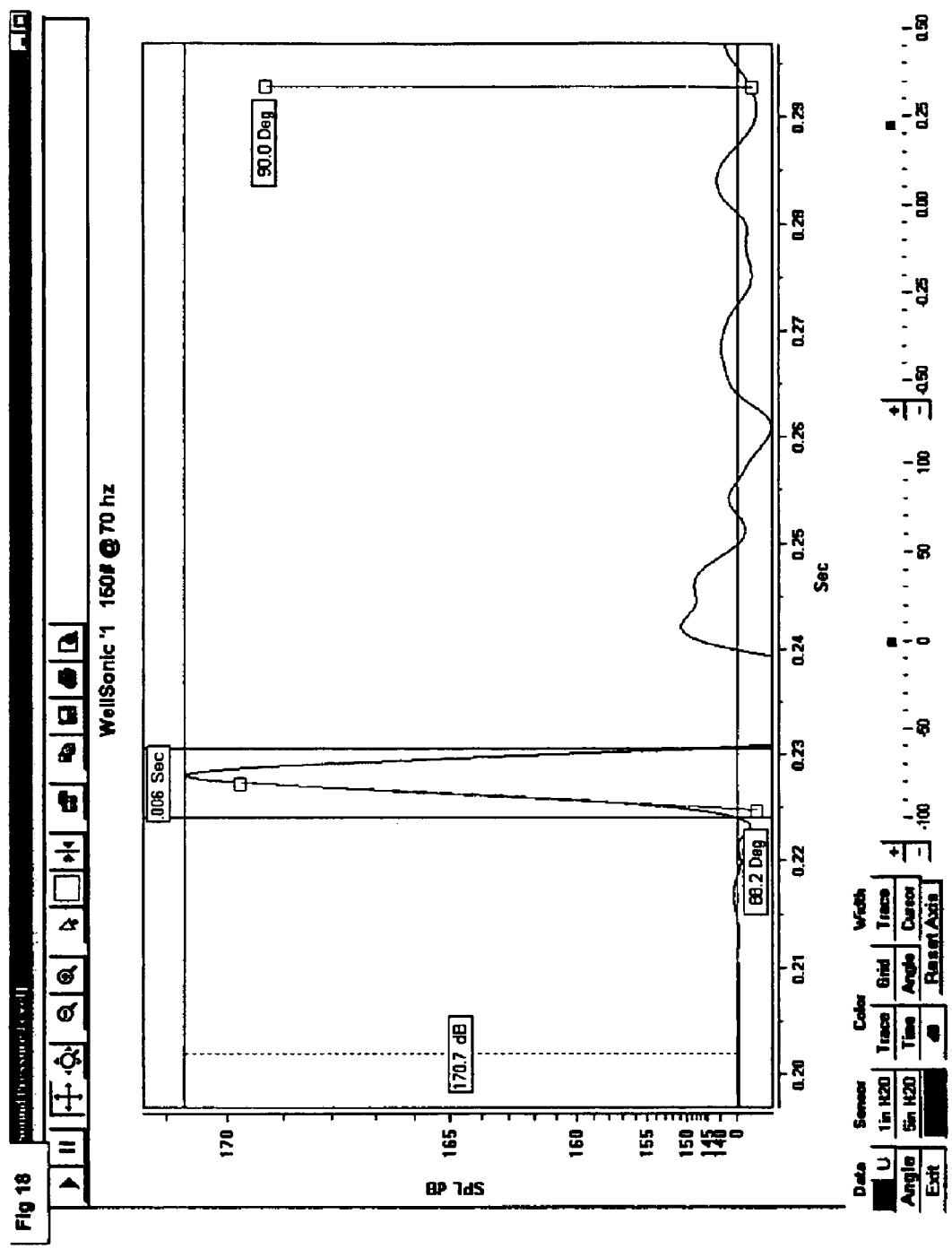

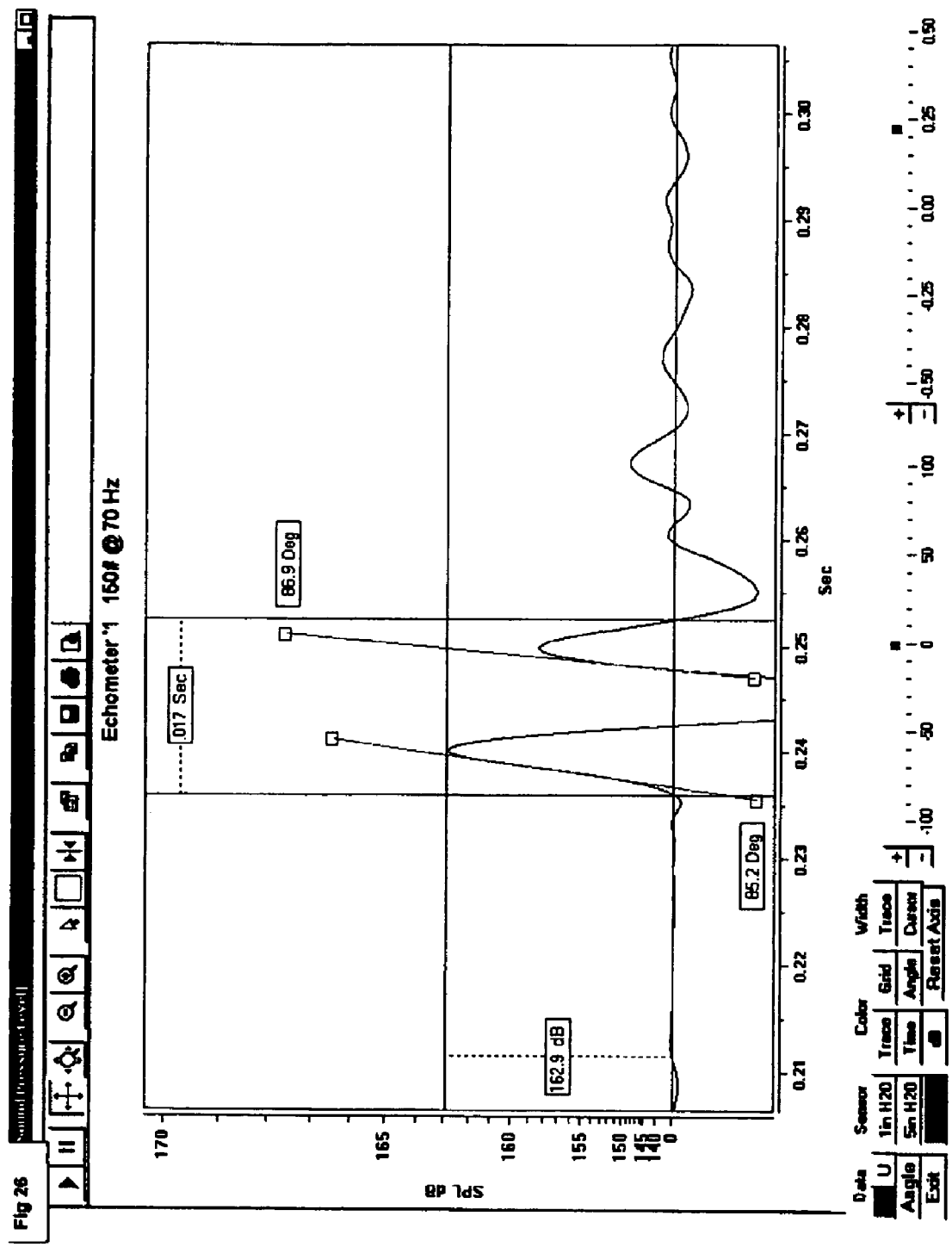

US 7,414,920 B2

ACOUSTIC GENERATOR FOR DISTANCE SOUNDING WITH MICROPHONE DESIGNED FOR EFFICIENT ECHO DETECTION

BACKGROUND OF THE INVENTION

Since the late 1930s the so-called acoustic sounding, or echometering, method has been used in the oil industry for taking distance measurements in an oil well or borehole, see U.S. Pat. No. 2,927,301, Booth, Measurement of liquid levels in wells. The acoustic sounding method involves sending a short, sharp, clear, loud bang sound down an oil well or borehole and using a transducer to "listen" to the echoes reflected back. The signal from the transducer is usually recorded for analysis which is usually performed by a separate device: see U.S. Pat. No. 2,209,944, Walker, Method of measuring location of obstructions in deep wells, and U.S. Pat. No. 2,232,476, Ritzmann, Method and apparatus for measuring depth in wells.

As explained in these patents and other literature, the acoustic sounding method not only determines the distances between the source of the sound and the causes of the echoes, but also determines the physical nature of the causes of the echoes based on the frequency, amplitude, and other attributes of the sound being reflected back. For example, in its application in oil wells the acoustic sounding method can not only determine the distance to the "bottom" of the well, i.e. the fluid level of the well, but it can also determine other attributes and anomalies, such as wax, scale, or gas build-up and other obstructions, encountered down the well based on the nature of the echoes received at the wellhead by the transducer.

Further the acoustic sounding method itself has other distance measuring and obstruction analysis applications beyond its use in oil wells. As an example, an early application of the acoustic sounding method was used by the postal service in New York City in the early 1900s to locate mail bags stuck in mail transportation tubes.

One common method for generating the sound needed for the acoustic sounding method is to use an air or gas pressurized chamber which is discharged at or near the wellhead or the void to be analyzed. As described in U.S. Pat. Nos. 4,750,583 and 4,646,871, Wolf, Gas-Gun for Acoustic Well Sounding (hereinafter "Wolf") the sound generated by the pressurized chamber comes from the energy released by the equilibration of the different pressures between the chamber and the wellhead or the void. A different, earlier method for generating the sound needed for the acoustic sounding method was to fire a blank cartridge from a firearm at the wellhead. Accordingly the oil industry has coined the term "sound gun", "echo gun", "acoustic gun", or simply "gun" to generally describe devices that produce the sound needed for the acoustic sounding method.

Although acoustic generators, acoustic guns using a pressurized gas chamber, have been used for many years, these acoustic generators have failed to address a number of issues in their use and have failed to yield the full benefits of the acoustic sounding method as an analytical tool for measuring distances and analyzing physical attributes.

BRIEF SUMMARY OF INVENTION

The current invention is the application of the acoustic sounding method by using a vastly improved acoustic generator and surveyor unit. The benefits of the current invention include, but are not limited to:

a device for automatically setting gas pressures in various chambers for numerous uses and applications including, but not limited to, setting the pressures for the various chambers in an acoustic generator;

a mechanism for automatically setting the gas pressures of various chambers in a device based on a control gas pressure for numerous uses and applications including, but not limited to, a mechanism for automatically setting the gas pressures for the various chambers of an acoustic generator based upon the void gas pressure;

a unique differential regulator that is used in a mechanism for automatically setting the gas pressures of various chambers in a device based on a control gas pressure;

an acoustic generator with the ability to automatically set the pressure chamber of the acoustic generator to any desired pressure;

an acoustic generator with the ability to automatically set the pressure chamber of the acoustic generator to a suitable pressure with respect to the void pressure for firing the acoustic generator in either the explosion mode or implosion mode;

an acoustic generator with the ability to automatically set the pressure chamber of the acoustic generator to a gas pressure difference that is relative to, and based upon, the void gas pressure at the time of automatic setting;

an acoustic generator with the ability to automatically set the pressure chamber of the acoustic generator to a gas pressure difference that is relative to, and based upon, the void gas pressure for any void gas pressure;

an acoustic generator with the ability to automatically set the pressure chamber of the acoustic generator to a gas pressure difference that is relative to, and based upon, the void gas pressure for any gas pressure difference;

an acoustic generator with the ability to fire the pressure chamber of the acoustic generator at any pressure setting;

an acoustic generator with the ability to fire the pressure chamber of the acoustic generator for any pressure difference between the pressure chamber and the void;

an acoustic generator with the ability to fire the pressure chamber of the acoustic generator for any void gas pressure;

an acoustic generator with the ability to automatically set the arming and firing mechanism of the acoustic generator;

an acoustic generator with a firing mechanism that will fire for any pressure in the pressure chamber;

an acoustic generator with a firing mechanism that will fire the pressure chamber for any void gas pressure;

an acoustic generator with a firing mechanism that will fire for any gas pressure difference between the pressure chamber and the void;

an acoustic generator with an automated mechanism for controlling the timing of the arming and firing of the acoustic generator;

an acoustic generator with a unique outlet or portal design from the pressure chamber for the efficient and effective generation of the desired sound needed for the acoustic sounding method;

an acoustic generator with a unique design and configuration of the microphone element and unit for the efficient and effective detection of echoes from the void;

an acoustic generator that produces a shorter, sharper, and clearer sound wave than any prior art acoustic generator; and a surveyor unit used in the acoustic sounding method with unique attributes for analyzing echo information and data retrieved from the application of the acoustic sounding method.

The current invention is also a component of a real time control system for oil well pumping operations. The objective of the real time control system being to optimize oil production from an oil field. The current invention is a key component to this real time control system because it provides a practical method for providing the oil field operator 1 real time information and feedback about the fluid level status and other physical statuses of the wells in their oil field.

BRIEF DESCRIPTION OF DRAWINGS

FIG. 1a is a cross sectional view of the Acoustic Generator with Main Body Housing (Portable Unit) in a preferred embodiment of the current invention.

FIG. 2 is a cross sectional view of the internal module of the Acoustic Generator in a preferred embodiment of the current invention.

FIG. 2a is a cross sectional view of two different versions of the Stable Pressure Regulator Shaft used in preferred embodiments of the current invention.

FIG. 2b is a cross sectional view of three different versions of the Nub Bobbin and Piston used in preferred embodiments of the current invention.

FIG. 2c is a rear face view of two different versions of the Piston Section used in preferred embodiments of the current invention.

FIG. 2d is a side and cross sectional view of two different versions of Pressure Chamber Sleeves used in preferred embodiments of the current invention.

FIG. 2e is a side view of the Stable Pressure Regulator Spring Guide Spacer used in a preferred embodiment of the current invention.

FIG. 2f is a side view of the Fire Bobbin Spring Guide Spacer used in a preferred embodiment of the current invention.

FIG. 2g is a perspective view of the microphone element and microphone wires used in a preferred embodiment of the current invention.

FIG. 2h is a cross sectional view of the microphone element and microphone wires used in a preferred embodiment of the current invention.

FIG. 3 is a cross sectional exploded view of the internal components of the Acoustic Generator in a preferred embodiment of the current invention.

FIG. 3a is a cross sectional exploded view of the components of the Stable Pressure Regulator used in a preferred embodiment of the current invention.

FIG. 3b is a cross sectional exploded view of the components of the Differential Regulator used in a preferred embodiment of the current invention.

FIG. 3c is a view of the components of the Microphone Area of the Acoustic Generator used in a preferred embodiment of the current invention.

FIG. 4a is a view of the rear of the Top Section in a preferred embodiment of the current invention with the figures denoting the locations of the components placed in the Top Section.

FIG. 4b is a view of the front of the Top Section in a preferred embodiment of the current invention with the figures denoting the locations of the components as placed in the Top Section.

FIG. 4c is a view of the rear of the Piston Section in a preferred embodiment of the current invention with the figures denoting the locations of the components as placed in the Piston Section.

FIG. 4d is a view of the front of the Piston Section in a preferred embodiment of the current invention with the figures denoting the locations of the components as placed in the Piston Section.

FIG. 5 is an exploded view of the rear of the Piston Section used in a preferred embodiment of the current invention showing components as placed in the Piston Section.

FIG. 6a is a schematic depiction of the components, chambers and passages of an embodiment of the Acoustic Generator in the armed position (explosion mode).

FIG. 6b is a schematic depiction of the components, chambers and passages of an alternative embodiment of the Acoustic Generator in the armed position (explosion mode).

FIG. 7a is a schematic depiction of the components, chambers and passages of an embodiment of the Acoustic Generator in the standby/fired position (explosion mode).

FIG. 7b is a schematic depiction of the components, chambers and passages of an alternative embodiment of the Acoustic Generator in the standby/fired position (explosion mode).

FIG. 8a is a schematic depiction of the components, chambers and passages of an embodiment of the Acoustic Generator in the armed position (implosion mode).

FIG. 8b is a schematic depiction of the components, chambers and passages of an alternative embodiment of the Acoustic Generator in the armed position (implosion mode).

FIG. 9a is a schematic depiction of the components, chambers and passages of an embodiment of the Acoustic Generator in the standby/fired position (implosion mode).

FIG. 9b is a schematic depiction of the components, chambers and passages of an alternative embodiment of the Acoustic Generator in the standby/fired position (implosion mode).

FIG. 10 is a face view of a Surveyor Unit in a preferred embodiment of the current invention.

FIG. 15 is a graph depicting the sound generated by a preferred embodiment of the current invention at 10 Hz under the benchmark test conditions described herein.

FIG. 16 is a graph depicting the sound generated by a preferred embodiment of the current invention at 20 Hz under the benchmark test conditions described herein.

FIG. 17 is a graph depicting the sound generated by a preferred embodiment of the current invention at 40 Hz under the benchmark test conditions described herein.

FIG. 18 is a graph depicting the sound generated by a preferred embodiment of the current invention at 70 Hz under the benchmark test conditions described herein.

FIG. 26 is a graph depicting the sound generated by an ECHOMETER COMPACT GAS GUN at 70 Hz under the benchmark test conditions described herein.

DETAILED DESCRIPTION OF INVENTION

Figure 1B:
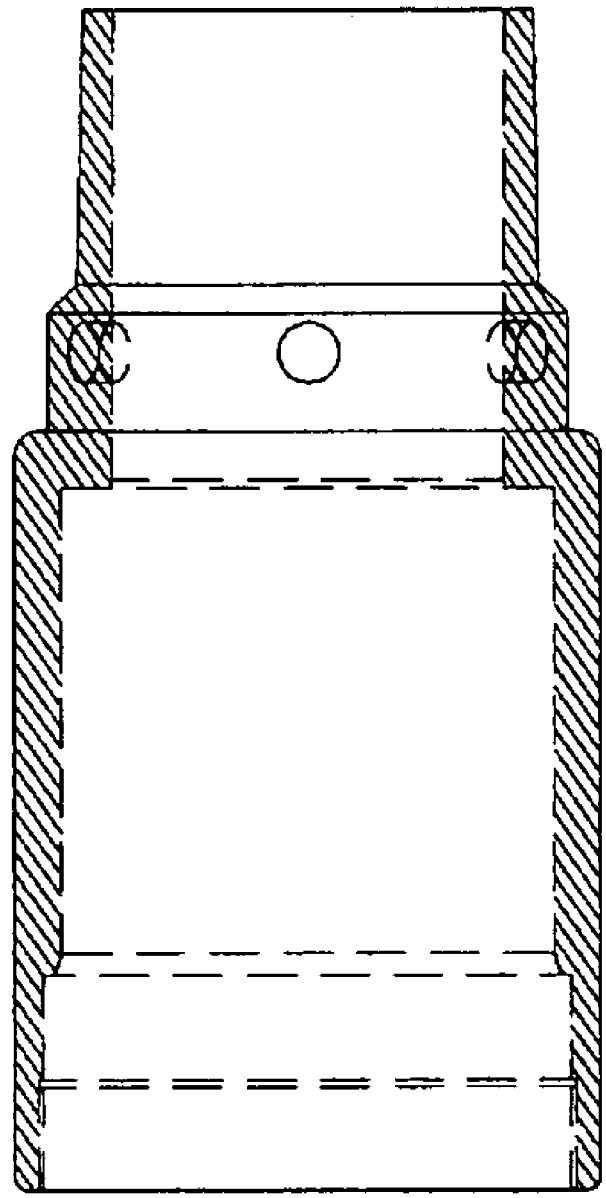
FIG. 1b is a cross sectional view of the Main Body Housing (Stationary Unit) in a preferred embodiment of the current invention.

The following table is a list of the various components that are used in a various preferred embodiments of the current invention as described herein. Note that some of the components listed are optional or are used in some preferred embodiments of the current invention but not in other preferred embodiments:

TABLE 1

| No. | Name |
|---|---|
| 0 | Acoustic Generator |
| 1 | Main Body Housing |
| 1a | Main Body Housing (Portable Unit) |
| 1b | Main Body Housing (Stationary Unit) |
| 2 | Handle Plate |
| 3 | Handle |
| 4 | Handle Leg |
| 5 | Lanyard |
| 6 | Lanyard Ring |
| 7 | Lanyard Guide |
| 8 | Modified Female Quick Connect |
| 9 | Modified Male Quick Connect |
| 10 | Lock Ring |
| 11 | Fire Bobbin O-ring |
| 12 | Piston Valve |
| 13 | Threaded hole in Nub |
| 14 | Nub O-ring |
| 15 | Piston Flange O-ring |
| 16 | Piston Shaft O-ring |
| 17 | Piston Section O-ring for Piston Shaft |
| 18 | Set screws on Piston Section |
| 19 | Piston Section O-ring |
| 20 | Piston Section |
| 21 | Top Section |
| 22 | Piston Shaft |
| 23 | Fire Bobbin |

TABLE 1-continued

| No. | Name |
|---|---|
| 23c | Fire Bobbin Cylinder |
| 24a, b, c | Slide Bobbins |
| 25 | Differential Regulator Shaft |
| 26 | Stable Pressure Regulator Shaft |
| 27 | Stable Pressure Regulator Seat |
| 28 | Filter Spacer/Tool |
| 29c | Nub Channel |
| 29 | Piston Nub |
| 30 | Fire Tube |
| 31 | Wave Guide Nut |
| 32 | Microphone Holder |
| 33 | Microphone Cap |
| 34 | Microphone Element |
| 35a, b, c | Filter Screens |
| 36 | Set Screw for Microphone Nut |
| 37 | Set Screw for Tubes |
| 37s | Piston Nub Set Screw |
| 38a, b, c | Split Bobbin O-ring |
| 39 | Fire Tube O-ring |
| 40 | Support Tube |
| 40s | Support Tube Socket |
| 41 | Support Tube Sleeve |
| 42 | Support Tube Anchor Set Screw |
| 43 | O-ring for Support Tube |
| 44 | Filter Spacer/Tool O-ring |
| 45 | Differential Regulator |
| 45c | Differential Regulator Cylinder |
| 46 | Microphone Cavity |
| 46s | Microphone Cavity Section |
| 47 | Differential Regulator Relief Spring |
| 48 | Stable Pressure Regulator |
| 48a | Stable Pressure Regulator Chamber |
| 48b | Stable Pressure Regulator Channel |
| 48c | Stable Pressure Regulator Cylinder |
| 49 | Top Section Piston Cylinder O-ring |
| 50 | Fire Bobbin Spring |
| 50g | Fire Bobbin Spring Guide Spacer |
| 51 | Differential Regulator Spring |
| 52 | Stable Pressure Regulator Spring |
| 52g | Stable Pressure Regulator Spring Guide Spacer |
| 53 | Stable Pressure Regulator Seat O-ring |
| 54a, b | Differential Regulator O-rings |
| 55a, b, c | Filter Screen O-rings |
| 56a, b, c, d | Stable Pressure Regulator O-rings |
| 57a | Stable Pressure Regulator E-clip |
| 57b | Differential Regulator E-clip |
| 58a, b | Microphone Wires |
| 59 | Solenoid Wire |
| 60 | Data Connector |
| 60r | Data Connector Receiver |
| 61 | Data Cable |
| 61w | Wiring Compartment |
| 62 | Data Channel |
| 63 | Microphone Wire Channel |
| 64 | Solenoid Wire Channel |
| 65 | Cap Screws |
| 66 | Male Quick Connect |
| 66c | Top Section Gas Inlet |
| 66r | Male Quick Connect Receiver |
| 67 | Top Section Gas Connect O-ring |
| 68 | Data Connector Set Screw |
| 69 | Cap Screw Receiver Hole |
| 70 | Solenoid |
| 70c | Solenoid Passage |
| 71a, b | Solenoid O-rings |
| 72 | Piston Cylinder |
| 73 | Piston Flange |
| 73a | Piston Flange O-ring |
| 74 | Piston Screen |
| 75 | Nub Top Section O-ring |

TABLE 1-continued

List of Components

| No. | Name |
|---|---|
| 76 | Screwdriver Slot |
| 77 | Pressure Transducer |
| 77s | Pressure Transducer Seat |
| 78 | Pressure Transducer O-ring |
| 79 | Pressure Transducer Wire |
| 80 | Pressure Chamber |
| 80s | Pressure Chamber Section |
| 81b, c | Vent Chamber Channels |
| 82 | Piston Cylinder Guide |
| 83 | Nub Chamber |
| 84 | Fire Tube Valve |
| 85a | Filter Screen Chamber |
| 85b | Filter Screen and Tool Chamber |
| 86 | Microphone Element O-rings |
| 87 | Zanier Diode |
| 88 | Resistor |
| 89 | Edge Bevel |
| 90 | Pneumatic Computer |
| 90 | Pneumatic Computer Section |
| 91a, b, c | Spring Chambers |
| 92 | Wave Guide O-ring |
| 93 | Small Pressure Chamber Sleeve |
| 93a | Small Pressure Chamber Sleeve O-rings |
| 94 | Large Pressure Chamber Sleeve |
| 94a | Large Pressure Chamber Sleeve O-rings |
| 99 | Compressed Gas Source |
| 100 | Surveyor Unit |
| 102 | Panel Mount Jack |
| 103 | Display Window |
| 104 | Face Panel |
| 105 | Acoustic Velocity Knob |
| 106 | Depth/Changeover Knob |
| 107 | Off/On Gain Menu Knob |
| 108 | Fire Button |
| 109 | Measured Segment Knob |
| 110 | Feet in Segment Knob |
| 111 | Inches to Fluid Knob |
| 112 | Compact Printer |
| 113 | Printer Port |
| 114 | 12 v Power Jack |
| 115 | USB Port |
| 116 | Hold-down Bracket |
| 121 | Surveyor Unit Lid |
| 125 | Surveyor Unit Latch |
| 130 | Preamp |
| 132 | Solenoid Driver |
| 134 | A/D Converter |
| 136 | Gain Stage 1 |
| 138 | Gain Stage 2 |
| 140 | CPU |
| 142 | RAM |
| 144 | Flash Memory |
| 150 | RS-232 Interface |
| 152 | Real-Time Clock |
| 154 | USB Interface |
| 160 | Power Supply |
| 162 | LEDs |
| 164 | Encoders |
| 166 | Battery |
| 168 | External Power Supply |

Configuration of the Acoustic Generator and Surveyor Unit

Figure 14A:
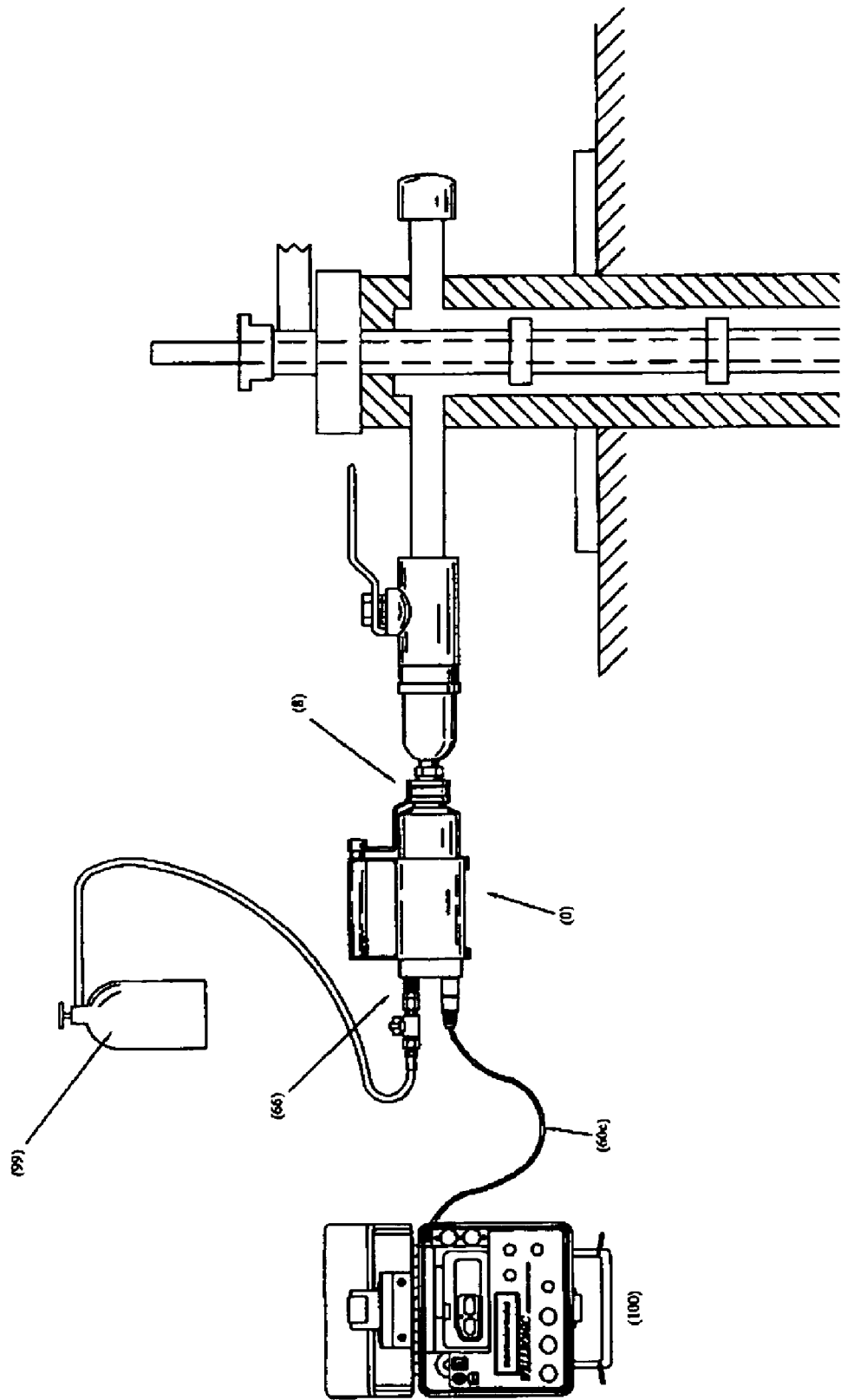
FIG. 14a is a view of the setup between the wellhead, Acoustic Generator, Compressed Gas Source, and Surveyor Unit in applying the acoustic sounding method in a preferred embodiment of the current invention.

As depicted in FIG. 14a, in a preferred embodiment of the current invention the Acoustic Generator 0 is connected to the well annulus at the wellhead by a ½ inch NPT Modified Female Quick Connect 8 on the Main Body Fitting (Portable Unit) 1a. A 2 inch pipe threaded end is normally used for an Acoustic Generator 0 with a Main Body Fitting (Stationary Unit) 1b. For either the portable or stationary configurations the Acoustic Generator 0 is connected to a Compressed Gas Source 99 via the Male Quick Connect 66 using a hose or mounting. The Male Quick Connect 66 is connected to the Top Section Gas Inlet 66c in the Acoustic Generator 0.

The Surveyor Unit 100 is electronically connected to the Acoustic Generator 0 via a Data Cable 60c and controls all of the automatic functions of the Acoustic Generator 0.

In a preferred embodiment of the current invention the connections between all the components can be completed prior to installing the Acoustic Generator 0 to the well annulus thus allowing single-hand installation of the Acoustic Generator 0.

As explained above acoustic soundings for oil wells are normally made within the inside wall of the casing pipe and the exterior of the production tubing string hanging within the casing pipe. The casing pipe is normally cemented in place within the oil producing borehole. The production tubing is normally formed from relatively uniform sections of steel tube screwed together using joints known as collars. As explained herein, the average distance between collars and the echoes created by the collars are used to calibrate readings obtained by an acoustic generator.

Acoustic Generator

In a preferred embodiment of the current invention, the Acoustic Generator 0 has two static positions, the fired/standby position and the armed position. In operation the Acoustic Generator 0 is initially at rest in the fired/standby position, is moved to the armed position, and is fired to return to the fired/standby position.

As depicted in FIG. 1a in a preferred embodiment of the current invention the Acoustic Generator 0 is made of an internal module, see FIG. 2, which is placed inside a Housing 1 and secured by a Lock Ring 10 at the rear of the Acoustic Generator 0.

The Acoustic Generator 0 also has several alternative embodiments and optional parts depending on the needs of the acoustic sounding for a particular well or void. As explained above and shown in FIG. 1a and FIG. 1b, the Acoustic Generator 0 has alternative housings for alternative configurations and connections at the wellhead. Further as shown in FIGS. 2a to 2h inclusive, FIGS. 6a to 9b inclusive, and as explained further herein, several components in the Acoustic Generator 0 have alternative designs depending on the needs of the acoustic sounding method being applied. Also, as explained further herein, there are several optional components with the Acoustic Generator 0 to assist in use and operation, such as the Filter Spacer/Tool 28 which is used for disassembling and reassembling the Acoustic Generator 0 for maintenance and repair purposes.

In addition, unless stated otherwise, the components in the preferred embodiments of the Acoustic Generator 0 are made of high quality stainless steel and the O-rings identified are of Buna-N. Also stainless steel E-clips, screws, and springs have been used in preferred embodiments of the current invention. However, the Acoustic Generator 0 can use alternative comparable materials and alternative comparable components that provide the same functions as O-rings, E-clips, valves, screws, springs, flanges and stops. For example, in a preferred embodiment of the current invention, the four springs used in the Acoustic Generator 0 are all commercially available but can easily be replaced by alternative components that produce the same function and performance. In a preferred embodiment of the current invention the specifications of the springs are as follows:

TABLE 2

Spring specifications in a preferred embodiment of the current invention

| Component | Part Number* | OD | Free Length | Wire Diameter | Total Coils | Solid Coil Height | Solid Load | Spring Rate |
|---|---|---|---|---|---|---|---|---|
| Differential Regulator Relief Spring 47 | C180-500-19000 | 0.180 | 0.500 | 0.024 | 8.5 | 0.228 | 5.16 | 19.00 |
| Fire Bobbin Spring 50 | C180-875-14500 | 0.180 | 0.875 | 0.026 | 14.5 | 0.403 | 6.84 | 14.50 |
| Differential Regulator Spring 51 | C300-687-62000 | 0.300 | 0.687 | 0.045 | 7.5 | 0.382 | 18.87 | 62.00 |
| Stable Pressure Regulator Spring 52 | C300-687-62000 | 0.300 | 0.687 | 0.045 | 7.5 | 0.382 | 18.87 | 62.00 |

*MSDivisions, a division of Commercial Communications LLC of Middletown, NY

As depicted in FIG. 1a, in a preferred embodiment of the current invention the Acoustic Generator 0 is cylindrical in shape and can be viewed as having three distinct areas (moving from the rear to front): the Pneumatic Computer area, the Pressure Chamber area, and the Microphone Cavity area. These three areas can be loosely associated with the three basic functions of the Acoustic Generator 0, i.e. arming a pressure chamber, firing the pressure chamber, and detecting the echoes received, but as explained herein each area of the Acoustic Generator 0 plays a role in each of the three basic functions.

Pneumatic Computer Area

In a preferred embodiment of the current invention the Pneumatic Computer 90 not only controls the arming and firing of the acoustic generator's Pressure Chamber 80 but also controls of the functions of gas pressure regulation, control, timing, delivery, and evacuation for the other chambers, cylinders, channels and passages in a preferred embodiment of the Acoustic Generator 0. As shown in FIGS. 3, 4a to 4d, and 5, in a preferred embodiment of the current invention the Pneumatic Computer 90 area contains most of the components of the Acoustic Generator 0.

Top and Piston Sections

As shown in FIG. 3, in a preferred embodiment of the current invention the two largest components of the Pneumatic Computer 90 are the Top Section 21 and the Piston Section 20. As shown in FIGS. 3, 4a to 4d, and 5, in a preferred embodiment of the current invention the Top Section 21 and the Piston Section 20 are joined together by three Cap Screws 65 located in the Cap Screw Receivers 69 in the Top Section 21 and the Piston Section 20. The three Cap Screws 65 are accessible, and can be removed from, the rear of the Top Section 21. When the Cap Screws 65 are removed, the Top Section 21 and Piston Section 20 spring apart as a result of the spring pressure that exists between the various components of the Pneumatic Computer 90.

In separating the Top Section and Piston Section the first noticeable aspect of the interior of the Pneumatic Computer 90 is that there are no tubes, pipes, or other fallible connections. The pneumatic connections in the body of the Pneumatic Computer 90 are all made by machined cross channels, holes, and cylinders which are conjoining each other within the Top Section 21 and Piston Sections 20. FIGS. 6a through 9b schematically depict the components and the relationship between the chambers, cylinders, channels and passages used in two preferred embodiments of current invention.

Where the Top Section 21 and Piston Section 20 face together there are five O-rings 49, 67, 75, 71a and 71b to seal the pressure channels between the two Sections. A Piston Cylinder O-ring 49 is set around a raised Piston Cylinder Guide 82 and used to seal the Fire Piston Cylinder 72. The other four O-rings 67, 71a, 71b and 75 seal the rest of the pneumatic passages in between the Top Section 21 and the Piston Section 20. This assembly configuration of a preferred embodiment of the Pneumatic Computer 90 allows the components and working parts of the Pneumatic Computer 90 to be removed, replaced, or cleaned quickly. When the two Sections are apart, every component and working part can be removed from the Top Section 21 and Piston Section 20 by hand. In disassembly there may be working parts or components in either Section, but generally all will remain with the Piston Section 20.

As shown in FIG. 3b, on the front side of the Top Section 21 are Spring Holes 91a-c for the springs over several components, and O-ring slots for the various O-rings. There is also a machined Solenoid Wire Channel 64 for the control wires coming from the Solenoid 70 and going over to the Data Cable 61 in the Top Section 21. In the Top Section 21, there are two small machined Vent Channels 81b and 81c being attached to various component Spring Chambers 91b and 91c and over to the outer edge of the Top Section 21. The Vent Channels allow the gas from the internal components to be dissipated into an Edge Bevel 89 surrounding 180 degrees around the outer circumference of the rear end edge of the Piston Section 20. In a preferred embodiment of the current invention a flat surface of the Edge Bevel 89 can be between 0.03 inches to 0.30 inches with a bevel angle of 30 to 60 degrees, with 0.085 inches and a 45 degree Edge Bevel 89 working the best. This is a safety feature of a preferred embodiment of the current invention as gas pressure released from the two Vent Channels 81b and 81c to the atmosphere is rendered harmless by being bled down through the Edge Bevel 89 and disbursed into the space that is left between the outer diameter of the Top Section 21 and the inside diameter of the Lock Ring 10.

Pneumatic Computer Components

The following is a description of the components present in a preferred embodiment of the current invention starting with the components in the Top Section 21.

Piston Nub

As shown in FIG. 1, in a preferred embodiment of the current invention inside the center of the Top Section 20 is a Nub Bobbin 29. In a preferred embodiment of the current invention the Nub Bobbin 29 is about ½" in diameter. The Nub Bobbin 29 acts as a pressure compensation bobbin for the Piston Shaft 22. The Nub Bobbin 29 pushes down on the top of the Piston Shaft 22 with the same void pressure entering into the front of the Acoustic Generator 0. In a preferred embodiment of the current invention the void pressure that might affect the operation of the instrument is balanced and neutralized against itself by utilizing the Nub Bobbin 29. The nub pressure comes directly from the void pressure to equalize and compensate for the well pressure entering the front of the Acoustic Generator 0 and pressuring the front of the Piston Shaft 22. This compensation or equalizing allows the Piston Shaft 22 to be operated with a separate Stable Pressure gas driven firing system as described herein.

As shown in FIG. 2b there are three alternative versions of the Nub Bobbin 29 for various preferred embodiments of the current invention. In Version A, the Nub Bobbin 29 is solid and completely free and separate from the Piston Shaft 22. In Version A the void pressure is fed to the rear the Nub Bobbin 29 through the Pneumatic Computer 90. This is achieved by using Version A of the Piston Section 20 as shown in FIG. 2c, which links the inlet from the Pressure Transducer 77 to the Nub Port 29c. Schematically this is depicted in FIG. 6a which shows the inlet from the void to the Pressure Transducer 77 being continued to the rear of the Nub Bobbin 29. Version B and Version C as shown in FIG. 2b work by connecting a Nub Bobbin 29 with a passageway as an extension of a Piston Shaft 22 with a passageway, the passageways of the Piston Shaft 22 and Nub Bobbin 29 allowing the void gas to pass through the Piston Shaft 22 to the rear of the Nub Bobbin 29. As the void gas does not need to pass through the Pneumatic Computer 90 in this arrangement, the channel from the Pressure Transducer 77 to the Nub Port 29c is omitted, as depicted in Version B of the Piston Section 20 as shown in FIG. 2c and schematically depicted in FIG. 6b.

In a preferred embodiment of the current invention the Nub Bobbin 29 may be removed for maintenance or Nub O-ring 14 replacement with the same Filter Screen/Tool 28 threaded tool that is used for removing the Filter Screens as described herein.

Wire Components

As shown in FIGS. 1 and 5, in a preferred embodiment of the current invention the Pneumatic Computer 90 has a commercially available Pressure Transducer 77 to read the void pressure at any given time. The Pressure Transducer 77 sends its results through its wires to any electronics in sync with its specifications. The Pressure Transducer 77 may be easily removed from its Seat 77s and replaced after the Top Section 21 and the Piston Section 20 have been separated and the Pressure Transducer Wires 79 have been disconnected from the Data Connector 60. The Top Section 21 has a Data Channel 62 on the outer edge of the Data Connector Receiver 60r. The Data Cable 61 which includes the Pressure Transducer Wires 79, the Microphone Wire 58, and the Solenoid Wire 59 can be brought out through the Data Channel 62 after the Data Connector Set Screw 68 is unscrewed from the Data Connector 60 and released. This allows the sections to be moved further apart without unduly disturbing the wiring. The only wire still attached to the Top Section 21 is the Solenoid Wire 59 which is coiled into the open wiring compartment space around the Data Connector 60 when assembled.

Piston Section Components

As shown in FIG. 5, in a preferred embodiment of the current invention the major components that are housed in the Piston Section 20 will be described as viewed in order clockwise beginning at the Filter Screen/Tool 28.

Note although it is a component in the Piston Section 20 as depicted, the Piston Shaft 22 is more fully described in the Pressure Chamber area.

Filter Screen/Tool and Filter Screens

In a preferred embodiment of the current invention the Pneumatic Computer 90 houses a Filter Screen/Tool 28 which is a spacer for the Filter Screen 35b below it. It also has a threaded shaft on one end which is used as a removal tool for the Filter Screens, 35a and 35b, and the Piston Nub 29 which is located inside the Top Section 21. The threaded shaft of the Filter Screen/Tool 28 is used to remove the Filter Screens 35a and 35b by inserting it into the exposed end of the Filter Screen, turning the tool clockwise and pull up and out to remove. Pulling the stainless steel Filter Screen 35b out for cleaning is also the first step for a complete breakdown of the Acoustic Generator 0. This enables the sections to be submerged in solvent and the channels within the Top and Piston Sections cleaned in total. The Filter Screen 35a filters the Stable Pressure gas from the Stable Pressure Regulator 48 into the center or feed of the Solenoid 70.

Differential Regulator

A component within the Pneumatic Computer for a preferred embodiment of the current invention is the Differential Regulator 45, as shown in FIG. 3b. In a preferred embodiment of the current invention the Differential Regulator 45 is an assembly of components that is a little over an inch in length. The Differential Regulator 45 consists of a Center Shaft 25 with shoulders or stops at both ends and the following assembled components, starting from the rear moving to the front: a small Relief Spring 47 resting on the rear shoulder of the Center Shaft 25 with the front end of the Relief Spring 47 compressing against the rear end of a Slide Bobbin 24b. Against the front end of a Slide Bobbin 24b is the rear end of a Differential Pressure Spring 51 which has another identical but inverted Slide Bobbin 24c on its front end and an E-clip 57b or other similar stop holding the assembly to the front end of the Center Shaft 25. The Slide Bobbins have holes through their centers and are used as valves in conjunction with O-rings 54a, 54b on the Center Shaft 25. The Slide Bobbins also have external O-rings 38b, 38c which will allow the bobbins to be used as valves when the Differential Regulator 45 is inside the Differential Regulator Chamber 45c. The Differential Regulator Chamber 45c having two inlets: a front inlet for the void and a rear inlet for the Compressed Gas Source 99. The Differential Pressure Spring 51 determines the pressure differential in the Pressure Chamber 80 in relation to the void pressure, and the Relief Spring 47 holds the whole assembly in place and rapidly moves air by moving the assembly's components before their intended usage. The Relief Spring 47 also holds the front Slide Bobbin 24c down, using O-ring 54b as a closed valve awaiting pressure movement. In a preferred embodiment of the current invention there are two outlet or feed channels connected to the Differential Regulator Chamber 45c. The front channel feeds the Stable Pressure Regulator 48 and the rear channel feeds the Pressure Chamber 80. As the regulator is shifted from front to rear and vise versa, the gas pressure flowing into these feed channels is shifted from one source to another. In this configuration of a preferred embodiment of the current invention the Differential Regulator 45 is able to perform several different functions in the operation of the Acoustic Generator 0.

Automated Explosion vs. Implosion Mode Selection Function

As shown in FIGS. 6a through 9b, one function of the Differential Regulator 45 is that of assessing the operations of the Acoustic Generator 0 for explosion or implosion mode. Depending on the void pressure, a gas pressurized acoustic generator can be armed and fired in one of two modes: the explosion or implosion mode. The explosion mode requires an external source of gas pressure to arm the gun's chamber to a pressure above the void pressure. In firing the gun the sound is generated by the higher pressure gas in the chamber entering the void. Alternatively, the implosion mode sets the gun's chamber to a pressure below the void pressure. In firing the gun the sound is generated by the higher gas pressure in the void entering the chamber.

In a preferred embodiment of the current invention the question of whether to arm the Acoustic Generator 0 in the explosion or implosion mode is automatically determined by the Pneumatic Computer 90 through the Differential Regulator 45 which responds to the source of the greater pressure: the void pressure at the front or the Compressed Gas Source 99 at the rear of the Differential Regulator 45. In a preferred embodiment of the current invention the Compressed Gas Source 99 also provides the preset gas pressure used to charge the Pressure Chamber 80 in the explosion mode. When the rear of the Differential Regulator 45, at Slide Bobbin 24b, is subjected to a greater pressure than the front of the Differential Regulator 45, at Slide Bobbin 24c, the entire Differential Regulator 45 acts like a shuttle valve and shifts forward in the Differential Regulator Chamber 45c. As shown in FIG. 6a, with the Differential Regulator 45 in the forward position, the gas from the Compressed Gas Source 99 can flow into the Pressure Chamber and into the Stable Pressure Regulator Chamber 48a. When the gas pressures are reversed with respect to each other, i.e. void pressure at the front is greater than the Compressed Gas Source 99 pressure at the rear, the Differential Regulator 45 will move to the rear to a position where the Slide Bobbin 24b is restrained from further movement by the front face of the Top Section 21. As shown in FIG. 8a, in this position the pressure feed for both channels shifts. The feed channel for the Pressure Chamber 80 is now positioned to feed or vent from the center section of the Differential Regulator 45. The feed channel for the Stable Pressure Regulator 48 is now in front of the entire Differential Regulator 45 allowing the void pressure to flow freely into this feed channel. As explained herein, in a preferred embodiment of the current invention the Compressed Gas Source 99 provides the basis for a preset gas pressure from which the automatic determination of explosion or implosion mode is made. The Compressed Gas Source 99 can also provide a predetermined gas pressure to charge the Pressure Chamber to in the explosion mode.

Implosion Mode Differential Regulation Function

The next function in a preferred embodiment of the current invention is the differential regulator function that occurs in the implosion mode. The Differential Regulator 45 maintains a regulated differential pressure between the void and the Pressure Chamber 80 for firing in the implosion mode. In a preferred embodiment of the current invention the Pressure Chamber 80 is ported by the Differential Regulator 45 through Slide Bobbin 24b to maintain a constant balance pressure difference between the Pressure Chamber 80 and the void. This regulation is accomplished by the opposing pressures being applied on Slide Bobbin 24c when the Differential Regulator 45 is at the rear of the Differential Regulator Chamber 45c in the implosion mode as explained above. With the Differential Regulator 45 in this position the void pressure on the front side of Slide Bobbin 24c is opposed by the combined pressure of the Pressure Chamber 80 and the Differential Regulator Spring 51 on the rear Slide Bobbin 24c. In this function the compression resistance of the Differential Regulator Spring 51 determines the relative pressure of the Pressure Chamber 80 to the void. In a preferred embodiment of the current invention, in this function the Differential Regulator Spring 51c an be selected to produce pressure in the Pressure Chamber 80 of 25 pounds per square inch (psi) up to the maximum rated working pressure of the Acoustic Generator 0, with a range of 50 psi to 500 psi being good and sufficient for acoustic soundings for most oil wells. In a preferred embodiment of the current invention one guide for setting the Pressure Chamber 80 is to set it at a pressure difference of 100 psi plus 10 psi per 1,000 feet of well. In a preferred embodiment of the current invention a pressure difference of approximately 150 to 300 pounds less than the void pressure is found to be the optimum pressure difference for an acoustic sounding of an average oil well. In circumstances when the void pressure is higher than 1000 psi, the chamber pressure area can also be reduced in size using either Version A or Version B of the Pressure Chamber Sleeves shown in FIG. 2d and the differential pressure between the void and the chamber area can be varied anywhere from 150 psi up to the void pressure.

Implosion Mode Pressure Chamber Setting Function

As shown in FIG. 9a or 9b, in the standby/fired position in the implosion mode of a preferred embodiment of the current invention the Pressure Chamber 80 is open and has the same gas pressure as the void. In the implosion arm cycle the pressure in the Pressure Chamber 80 needs to be reduced with relationship to the void. This is done by releasing an appropriate amount of gas through the center valve of Slide Bobbin 24b into a suitable containment area. In a preferred embodiment of the current invention, as shown in FIG. 1, the Pressure Chamber 80 is armed in the implosion mode by the Piston Shaft 22, which has a Piston Flange 73 and Piston Valve 12, moving forward to close the Fire Tube Valve 84. As the Piston Shaft 22 moves forward the Piston Valve 12 opens allowing the gas pressure in the Pressure Chamber 80 to equalize with the gas pressure that exists between the Slide Bobbins 24b and 24c in the Differential Regulator 45. When the gas pressure between the Slide Bobbins, along with the pressure from the Differential Spring 51 and the Relief Spring 47, spreads the two Slide Bobbins 24b and 24c sufficiently apart the front Slide Bobbin 24c meets the Differential Regulator E-clip 57b on the Center Shaft 25. This draws the Center Shaft 25 forward opening the O-ring 54a from inside the rear Slide Bobbin 24b allowing gas to escape through this channel and the Male Quick Connect 66. When a sufficient amount of gas from the Pressure Chamber 80 has escaped gas pressure along with the compression tension of both the Differential Spring 51 and the Relief Spring 47, moves the O-ring 54a into Slide Bobbin 24b thus closing the path for the escaping gas.

In an alternative preferred embodiment of the current invention by restraining the movement of the Center Shaft 25 when the Differential Regulator 45 is in its rearmost position in the armed position any backward movement of the front Slide Bobbin 24c caused by an increase in void pressure enables additional gas to enter between the Slide Bobbins 24b and 24c to the Pressure Chamber 80. Accordingly in this alternative preferred embodiment of the current invention the difference between the pressure in the Pressure Chamber 80 and the void is constantly maintained even if the void pressure suddenly increases or decreases during the arming cycle.

Implosion Mode Differential Regulator Pressure Punction

In a preferred embodiment of the current invention, when the gas pressure in Pressure Chamber 80 is reduced for firing in the implosion mode, there is also a slight pressure difference between the two Slide Bobbins 24b and 24c of the Differential Regulator 45 and the Pressure Chamber 80 due to the presence of the Relief Spring 47. The additional tension of the Relief Spring 47 to the tension of the Differential Regulator Spring 51 will determine the release pressure at which the Differential Regulator Chamber 45*c* gas is allowed to equalize with the Pressure Chamber 80. In a preferred embodiment of the current invention a range difference of 2 to 50 psi is a possible difference, with a range difference of 3 to 15 psi being good, and a range difference of 5 to 10 psi being the best. The presence of this gas pressure between the two Slide Bobbins 24*b* and 24*c* is sufficient to prevent any chattering effect and to prevent any pressure blast from the Compressed Gas Source 99 from moving the rear Slide Bobbin 24*b* and closing its center passage at an inappropriate time.

Safety Bleed Function

Another function of the Differential Regulator 45 in a preferred embodiment of the current invention is that of a safety bleed function. If the Acoustic Generator 0 needs to be removed from the well annulus and either the void pressure, i.e. the gas pressure in the chamber around the front of the Microphone Section 74, and/or the Pressure Chamber 80 is above atmospheric pressure, then either excess pressure can be relieved by putting a rod or other similar device into the Male Gas Quick Connect 66 inlet and gently pushing on the top of the Differential Regulator 45. This will relieve the excess pressure after the well is shut off and before the Acoustic Generator 0 is removed from the well annulus. This bleed function is important for proper safety and operation of the Acoustic Generator 0.

An alternative way to bleed off unwanted gas pressure is to simply fire the Acoustic Generator 0 when the void pressure is at atmospheric pressure or when the Well Depth is set to "000" on the Surveyor Unit 100. As explained herein because the firing mechanism is an independent mechanism, the Acoustic Generator 0 can be fired at anytime to equilibrate any gas pressure differences.

Stable Pressure Regulator

As shown in FIG. 5, moving clockwise from the Differential Regulator 45 in the Piston Section 20 is the Stable Pressure Regulator 48. In a preferred embodiment of the current invention the Stable Pressure Regulator 48 is depicted in FIG. 3*a*. The Stable Pressure Regulator 48 is housed in the Pneumatic Computer 90 in a Stable Pressure Regulator Chamber 48*a*, the top of which is vented through the Pneumatic Computer 90 to outside atmospheric air pressure. A Stable Pressure Regulator Spring 52 is placed on the rear of the Stable Pressure Regulator 48 in the Stable Pressure Regulator Chamber 48*a*. The Stable Pressure Regulator Spring 52 may also use an optional Stable Pressure Regulator Spring Guide Spacer 52*g*, at FIG. 2*e*, for adjusting its spring tension accordingly.

In a preferred embodiment of the current invention the Stable Pressure Regulator 48 provides a consistent stable gas pressure for operation of the internal processes in the Acoustic Generator 0. This stable gas pressure can be from 25 to 1000 psi, with 70 to 500 psi being better, and 70 to 150 psi being optimum for most of the time. In disassembling the Pneumatic Computer 90, the Stable Pressure Regulator Shaft 26 along with the Slide Bobbin 24*a* may be removed, as with previous items, by simply grasping the upper portion of the stem and pulling them straight out of the Piston Section 20. The Stable Pressure Regulator Shaft 26 has two identical exposed O-rings: one spaced near the center 56*b*, and the other 56*c* spaced near the front of the Stable Pressure Regulator Shaft 26.

In a preferred embodiment of the current invention the O-ring 56*b* regulates the air from the high pressure source to the Stable Pressure system by sealing off incoming gas pressure when the O-ring 56*b* meets the Stable Pressure Regulator Seat 27. The O-ring 56*c* located at the front end of the Stable Pressure Regulator Shaft 26 goes into a Stable Pressure Regulator Valve Cylinder 48*c* located underneath the Seat 27, As shown in FIG. 2*a*, the O-rings can be either single or doubled as there is a slight improvement in performance using doubled O-rings. The other end of the Stable Pressure Regulator Valve Cylinder 48*c* is vented through the Pneumatic Computer 90 to the outside atmospheric air pressure. Because of this configuration with the venting of the Stable Pressure Regulator Chamber 48*a* and the Stable Pressure Regulator Valve Cylinder 48*c* the rear and front ends of the Stable Pressure Regulator Shaft 26 are at the same atmospheric pressure. The front and rear ends of the Stable Pressure Regulator Shaft 26 being at the same atmospheric pressure, and isolated from the higher pressures that exist in the Acoustic Generator 0 during its operation, enable the accurate control of the Stable Pressure Regulator Shaft 26 by the Stable Pressure Regulator Spring 52. In a preferred embodiment of the current invention, this same pressure compensation technique is used on the Piston Nub 29.

In a preferred embodiment of the current invention there is an O-ring 56*a* underneath the Slide Bobbin 38*a* which provides the Stable Pressure Regulator Shaft 26 flexibility in operation by allowing it to self align with its respective seats that are further inside the Piston Section 20. The Slide Bobbin 24*a* is held in position over this O-ring 56*a* by an E-clip 57*a* around the Stable Pressure Regulator Shaft 26.

In front of the Stable Pressure Regulator Shaft 26 and Slide Bobbin 24*a* in the Stable Pressure Regulator Chamber 48*a* is the Stable Pressure Regulator Seat O-ring 53 which sits on Stable Pressure Regulator Seat 27.

In a preferred embodiment of the current invention the Stable Pressure Regulator 48 works by taking any higher gas pressure from the void or from the Compressed Gas Source 99 and reduces it to the working pressure for the Solenoid 70, Fire Bobbin 23, and the Piston Shaft 22. The Stable Pressure gas system created by the Stable Pressure Regulator 48 can be from 25 to 1000 psi, with 70 to 200 psi being better, and 70 to 150 psi being optimum.

As shown in FIG. 2*a*, in one preferred embodiment of the current invention single O-rings can be used for each of the 3 sections on the Stable Pressure Regulator Shaft 26. However, it is found that when the front section uses two O-rings, as shown in FIG. 2*a*, there is a slight improvement in operation.

In a preferred embodiment of the current invention the Stable Pressure Regulator Seat 27 has a Screwdriver Slot 76 for ease of removal and replacement for maintenance.

In a preferred embodiment of the current invention some of the components in the Pneumatic Computer 90 are identical. For example, the Slide Bobbins (24*a*, *b*, and *c*) in the Differential Regulator 45 and Stable Pressure Regulator 48 are identical, as are O-rings on the shafts of both regulators and as are the O-rings on the Slide Bobbins.

Fire Bobbin

As shown in FIG. 5, moving clockwise on the Pneumatic Computer 90 the next component in a preferred embodiment of the current invention is the Fire Bobbin 23. In the preferred embodiment of the current invention the Fire Bobbin 23 is a little over an inch long and has 3 sections of O-rings 11. Although single O-rings can be used for each of the 3 sections on the Fire Bobbin it is found that when the top two sections have two O-rings, as shown in FIG. 5, there is a slight improvement in operation.

The Fire Bobbin 23 is spring loaded at its rear end by a Fire Bobbin Spring 50 which fits in the center of the Fire Bobbin 23 and protrudes out above the Fire Bobbin 23. The preferred embodiment of the current invention also permits an optional Fire Bobbin Stable Pressure Regulator Spring Guide Spacer 50g at FIG. 2f to be used for adjusting the tension of the Fire Bobbin Spring 50 as needed.

On the front end of the Fire Bobbin 23 is a nub that is designed to alStable pressure to pass around it quickly in the arming process. The nub also suspends the Fire Bobbin 23 away from the blunt end of the Fire Bobbin Cylinder 23c as an anti-jamming feature. In a preferred embodiment of the current invention the Fire Bobbin 23c an be removed from the Pneumatic Computer 90 using any shaft of appropriate size to dislodge and remove the Fire Bobbin 23. This is accomplished by inserting the end of the shaft into the hole where the Fire Bobbin Spring 50 was removed and, with a small side pressure to create some resistance, pulling the Fire Bobbin 23 out of the Fire Bobbin Cylinder 23c.

Solenoid

Figure 14B:
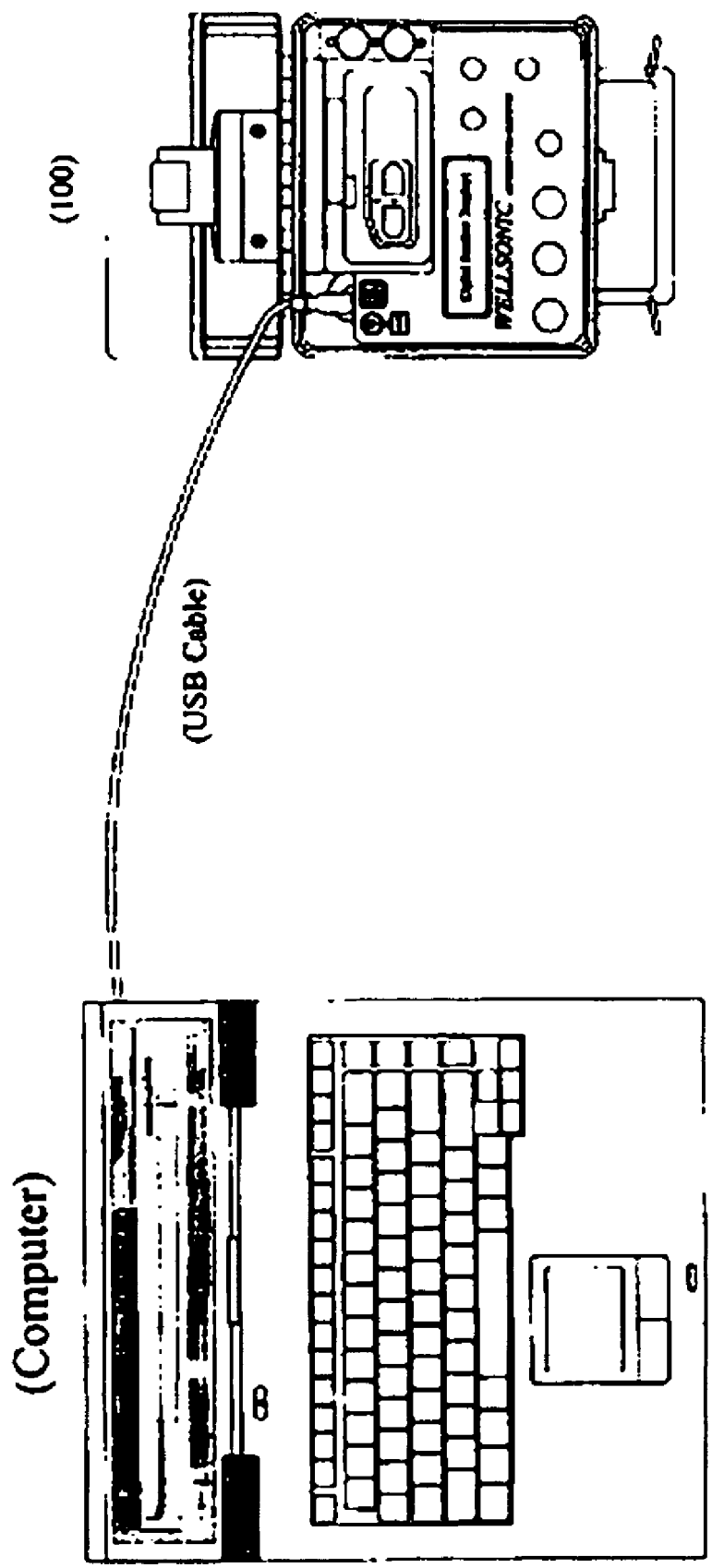
FIG. 14b is a view of the Surveyor Unit and a programmed computer for downloading the data collected by the Surveyor for offsite analysis of the data collected in the acoustic sounding method in a preferred embodiment of the current invention.

In the preferred embodiment of the current invention moving clockwise on the Pneumatic Computer 90 the next component is the Solenoid 70 which is located on the rear end of the Acoustic Generator 0 secured to the Top Section 21. This Solenoid 70 is used to initiate both the arming and firing of the Acoustic Generator 0. In a preferred embodiment of the current invention the Solenoid 70 has two positions to control the Acoustic Generator 0. In the off-position the internal valve in the Solenoid 70 is closed and Acoustic Generator 0 is in the fired/standby mode. In the on-position the internal valve in the Solenoid 70 is open allowing the various gases to enter the Acoustic Generator 0 to switch it to the armed mode. Several benefits arise from this arrangement. One benefit is safety as the Acoustic Generator 0 can only become armed when an electrical signal from an outside source activates the magnetic field in the Solenoid 70 to open the internal valve in the Solenoid 70. This means that if no electrical signal is sent to the Solenoid 70 the Acoustic Generator 0 will remain in the fired/standby position and the electrical connection is only needed when the Acoustic Generator 0 needs to be armed and fired. As shown in FIG. 14 there are several potentially hazardous connections to be made in order to set up the Acoustic Generator 0. Many prior art acoustic generators use the opposite configuration, i.e. the solenoid is to remain on at all times and only turned off to fire the acoustic generator. Other prior art acoustic generators were even more hazardous by requiring the operator to first charge the pressurized chamber and then set up the connections as depicted in FIG. 14.

As shown in FIGS. 6a to 9b, when activated the valve in the Solenoid 70 allows the Stable Pressure gas from the Stable Pressure Regulator 48 through the Solenoid Channel 70c and Filter Screen 35a to the nub end of the Fire Bobbin 23. Because the rear end of Fire Bobbin 23 is vented to atmospheric pressure in the fired/standby mode the Fire Bobbin 23 is pushed backward which allows Stable Pressure gas from the Stable Pressure Regulator 48 to be directed to exhaust port of the Piston Cylinder 72 and the rear face of the Fire Piston Flange 73 which is pushed forward closing the Fire Tube Valve 84 between the Pressure Chamber 80 and the void as the Piston Shaft O-ring 16 seals inside the Fire Tube 30. When the Solenoid 70 is closed the gas pressure is released through the solenoid vent, the Fire Bobbin Spring 50 pushes the Fire Bobbin 23 down, which redirects the Stable Pressure gas to the pressure supply port of the Piston Cylinder 72 and the front face of Fire Piston Flange 73 pulling the connected Piston Shaft 22 to the rear and the Piston Shaft O-ring 16 out of the Fire Tube 30 and opening the Pressure Chamber 80 to the void for rapid pressure equalization.

As further shown schematically in FIGS. 6a to 9b, the firing mechanism is the same regardless of the gas pressures that exist in the Pressure Chamber 80, void, or Compressed Gas Source 99.

The Solenoid 70 can easily be removed by disconnecting the Solenoid Wire 59 and unscrewing the unit while the Top Section 21 is separated from the Piston Section 20. With the sections separated O-rings 49, 67, 71a, b, and 75 can be removed or replaced.

Pressure Chamber Area

As shown in FIG. 1, in a preferred embodiment of the current invention the Pressure Chamber 80 is formed between the Piston Section O-ring 19 and the Fire Tube O-ring 39 sealing against the inside diameter of the Acoustic Generator Housing 1. As shown in FIG. 1 the Pressure Chamber 80 also has Support Tubes 40 and the Piston Shaft 22 running through its length from rear to front. The Piston Shaft 22 with its Piston Shaft O-ring 16 forms the Fire Tube Valve 84 and seals the Pressure Chamber 80 from the void when the Piston Shaft 22 is inserted into the Fire Tube 30. The Support Tubes, which are used as a conduit for the wire components and to provide atmospheric pressure to the inside of the Microphone Unit, as further described herein, have O-rings 43 on both of their ends to seal the Pressure Chamber 80, and are suspended between the Piston Section 20 and the Fire Tube 30, which has a flange plate at the rear. In alternative embodiments of the current invention Support Tubes 40 may have Support Tube Sleeves 41 and may be held in position at either end by an E-clip or Anchor Set Screw 42. The use of Anchor Set Screws 42 at the front end of the Support Tube 40 for securing to the Fire Tube 30 eliminates the need for Support Tube Sleeves 41 and O-rings on the set screw ends.

As the Pressure Chamber area is the main portion associated with the firing mechanism of the Acoustic Generator 0, the following not only describes the various components in the Pressure Chamber area in a preferred embodiment of the current invention, but also describes the firing mechanism of the Acoustic Generator 0.

Firing Mechanism

As described in Wolf, a gas pressurized acoustic generator works by isolating a chamber from the wellhead or void, changing the gas pressure in the chamber to be different than the void pressure, and connecting the chamber to the void to equilibrate the pressure difference. The energy released in the gas pressure equalization process generates the sound needed for making the echoes from the borehole.

Without being bound by any theory or hypotheses the sharpness, duration, clarity, and intensity of the sound made by a gas pressured acoustic generator are related to the time taken for the gas pressure difference to equilibrate. Essentially, the shorter the time to equilibrate the better the sharpness, duration, clarity, and intensity of the gunshot sound for acoustic sounding purposes. The preferred embodiment of the current invention is designed to use a number of systems to improve time taken for the gas pressure difference to equilibrate.

One of the systems used in a preferred embodiment of the current invention is the firing mechanism, which is an actuating system that uses a separate force, other than the force created by the unequal gas pressures, to continue to open the firing valve past the initial moment the unequal gas pressures meet, i.e. past the moment the firing valve is cracked open.

By using this actuating system, the current invention does not use nor rely upon the gas pressure difference between the pressure chamber and the void in order to effectuate a quick time to equilibrate. In fact the actuating system is designed not only to be independent of the pressures of the pressure chamber, void and external source but also to reduce the effects of any force created between the pressure chamber and void when firing the Acoustic Generator 0.

Accordingly the actuating system will operate regardless of the pressure chamber, the void, the external gas source, and the pressure difference between the pressure chamber and the void. As a direct outcome of using this actuating system, the current invention removes any effects of the difference in gas pressures on the firing mechanism. As a result the current invention can produce a suitable sound at any pressure within the device's physical limitations. As the actuating system is not dependent on the pressure difference, the current invention can be used in either explosion or implosion mode. Further the magnitude of the unequal gas pressures can be made very high for deep wells, or very low for an acoustic sounding of the top of a well or for shallow wells.

In the preferred embodiment of the current invention the actuating system is driven by the Stable Pressure gas system as defined herein. This is a gas-powered pneumatic system, but it is not the only type of system that can provide the actuating force. The actuating force could be provided by hydraulic, electromechanical, or any other type of mechanism that could provide an actuating force to open the pressure chamber to the void.

Further, as shown herein, the independent firing mechanism is just one of the systems used in a preferred embodiment of the current invention to eliminate, reduce or offset the effects that the unequal gas pressure force has on the time taken for the gas pressures to equilibrate. As shown in the Benchmark Test results herein, the interesting and unexpected phenomena of the current invention is that the preferred embodiment of the current invention not only produces an equilibration time shorter than any prior art gas pressurized acoustic generator but also produces a sharper, shorter, clearer, and more intense sound for acoustic soundings than all prior art gas pressurized acoustic generators.

Firing Mechanism Components

The following describes the components that make the firing mechanism in a preferred embodiment of the current invention.

Piston Shaft

The Piston Shaft 22 provides the platform for several functions in the pressure chamber setting and firing mechanisms. As shown in FIG. 2b there are alternative embodiments of the Piston Shaft depending on the path for providing void gas to the rear of the Nub Bobbin 29 as described herein. In FIG. 2b, Version A of the Piston Shaft 22 is solid and the rear of the Nub Bobbin 29 is set to the void pressure by gas sent through the Pneumatic Computer 90 as described herein. In FIG. 2b, Versions B and C of the Piston Shaft 22 show the rear of the Nub Bobbin 29 being set to the void pressure by gas sent through passageways in both the Piston Shaft 22 and the Nub Bobbin 29. In both versions the Piston Shaft 22 has a filter screen on the front of the channel to prevent material from the void entering the Acoustic Generator 0. The difference between Versions B and C being the connection between the Piston Shaft 22 and the Nub Bobbin 29 which can be temporary by using a hollow Piston Nub Set Screw 37s or permanent by machining the Piston Shaft 22 and Nub Bobbin 29 together as a single unit.

Piston Cylinder

In a preferred embodiment of the current invention as shown in FIG. 1a, the Piston Cylinder 72, which is a part of the firing mechanism, is at the rear of the Piston Section 20.

As shown in FIGS. 2 and 3 in a preferred embodiment of the current invention the Piston Cylinder 72 is of a size and diameter so as to utilize an actuating force created by the Stable pressure system created in the Pneumatic Computer 90 in order to drive the Piston Flange 73 and the Piston Shaft 22 forward and backward at a very high rate of speed. In a preferred embodiment of the current invention the Piston Cylinder 72 has an exhaust port and a pressure supply port fed through the Fire Bobbin 23. In a preferred embodiment of the current invention the Piston Cylinder 72 cavity can be from 0.5" to 1.5" in diameter and 0.2" to 1.5" in depth with a 0.850" diameter by 0.850" depth working well and a 1.0" diameter by 0.750" depth working the best.

Piston Shaft

In a preferred embodiment of the current invention as shown in FIG. 1, with the Top Section 21 and the Piston Section 20 separated the Piston Shaft 22, which has a Piston Flange 73 and Piston Valve 12, may be removed by pushing the Piston Shaft 22 up through the Piston Section 20 to exit the rear of the Piston Section 20.

Piston Flange

In a preferred embodiment of the current invention the Piston Flange 73, which sealed against Piston Cylinder 72 wall by an O-ring 73a is moved by the differences and changes in gas pressure on either side of the Piston Flange 73. The changes in the gas pressure on either side of the Piston Flange 73 in turn moves Piston Shaft 22 between the fired/standby and armed positions. In the fired/standby position the Piston Flange 73 is to the rear of the Piston Cylinder 72 as the result of a higher gas pressure being applied to the front face of the Piston Flange 73. As described herein by moving to the armed position the pressures on the exhaust and pressure supply channels to the Piston Cylinder 72 are reversed, with the higher gas pressure on the rear face of the Piston Flange. This moves the Piston Flange and Piston Shaft forward closing the Fire Tube Valve 84 isolating the Pressure Chamber 80 from the void and enabling the Pressure Chamber 80 to be charged to the appropriate pressure via the Piston Valve 12 which is now open to the Differential Regulator 45. The forces on the Piston Flange 73 provide a power stroke when pushing the Piston Shaft 22 forward to close the Fire Tube Valve 84 and a speed stroke when moving the Piston Shaft 22 back to release the pressure wave created between the Pressure Chamber 80 and the void. The size and diameter of the entrance and exit passages directly relates to the power and speed strokes. A small diameter is used to create a back pressure brake for the power stroke and a larger diameter passage is used for the speed stroke. This prevents damage to the internal parts and alleviates any unwanted sounds from metal contact.

As further described herein, in a preferred embodiment of the current invention the void pressure that might affect the operation and firing of the Acoustic Generator 0 is offset against itself by utilizing the Nub Bobbin 29 which sits behind the Piston Flange 73 in the Pneumatic Computer 90 as described herein. The nub gas pressure comes directly from the void pressure to equalize and compensate for the void pressure entering the front of the Acoustic Generator 0 and pressuring the front of the Piston Shaft 22. This compensation or equalizing allows the Piston Shaft 22 to be operated with the separate Stable Pressure gas system as described herein.

Piston Valve

As shown in FIGS. 2 and 5, in a preferred embodiment of the current invention there is a Piston Valve 12 on the Piston Shaft 22. The Piston Valve 12 is the link between the firing mechanism and chamber pressure setting mechanism in the Acoustic Generator 0. The function of the Piston Valve 12 is to open the Pressure Chamber 80 to the Differential Regulator 45 in order for the Pressure Chamber 80 to be automatically set to the appropriate pressure for firing. In a preferred embodiment of the current invention the Piston Valve 12 is formed by a curved indent completely around a portion of the Piston Shaft 22.

In a preferred embodiment of the current invention when moving from the fired/standby position to the armed position the Piston Shaft 22 moves forward and closes the Fire Tube Valve 84 resulting in the Pressure Chamber 80 being isolated from the void. After the Fire Tube Valve 84 closes the Piston Shaft 22 continues to move forward opening the Piston Valve 12. The opening of the Piston Valve 12 allows gas to flow past the Piston Section O-ring 17*a* to gaseously link the void-isolated Pressure Chamber 80 to the Differential Regulator 45. As described herein the Differential Regulator 45 performs either one of two functions in setting the pressure of the Pressure Chamber 80. In the implosion mode, excess gas will follow from the Pressure Chamber 80 through the Differential Regulator 45 to the appropriate lower pressure as determined by the mechanisms of the Differential Regulator 45 as explained herein. In the explosion mode, gas from the Compressed Gas Source 99 will follow to the Pressure Chamber 80 via the Differential Regulator 45 as explained herein.

In a preferred embodiment of the current invention the indent of Piston Valve 12 allows required gas to flow either in or out, depending on the mode of firing, around and past the O-ring 17*a* to fill or empty the Pressure Chamber 80. When the Piston Shaft 22 is pulled backward, i.e. to fire the gun and return to the fired/standby position, the shaft portion without the indent, seals against the Piston Section O-ring 17*a* and the Piston Valve 12 is closed.

In a preferred embodiment of the current invention the radius of the cut for the Piston Valve 12 can be from 0.1" to 0.4"; we have found 0.25" to work well with 0.261" being best. The depth of this machine cut radius can be from 0.01" to 0.5"; it has been found that 0.350" to works well and 0.339" to works the best. In a preferred embodiment of the current invention the Piston Valve 12 curve completely encompasses the Piston Shaft 22 in order to disperse the gas uniformly, to reduce turbulence, and to prevent any tendency to lift out of place or pit the Piston Section O-ring 17*a*.

Fire Tube Valve

As shown in FIG. 1, in a preferred embodiment of the current invention the Fire Tube Valve 84 is inside the rear of the Fire Tube 30 and is formed when the Piston Shaft O-ring 16 at the front of the Piston Shaft 22 seals inside the rear of the Fire Tube 30. In a preferred embodiment of the current invention the Piston Shaft 22, with Piston Shaft O-ring 16, is propelled forward by the Piston Flange 73 so as to insert the front end, approximately ¼ inch in a preferred embodiment of the current invention, into the Fire Tube 30 center shaft hole at the flange end completely sealing off and isolating the Pressure Chamber 80 from the void. When the Piston Flange 73 is propelled backward the Piston Shaft 22 and Piston Shaft O-ring 16 are extracted from the Fire Tube 30 and the valve is opened. As described herein in the explosion mode the Pressure Chamber 80 is charged with pressurized gas from an outside gas source, the Fire Piston Flange 73 is fired, pulling the Piston Shaft 22 and the Piston Shaft O-ring 16 out of the Fire Tube 30 opening the Fire Tube Valve 84 and expelling the pressured gas charge into the void. As described herein in for the implosion mode the Pressure Chamber 80 is set to a pressure lower than the void, the Fire Piston Flange 73 is fired, pulling the Piston Shaft 22 and the Piston Shaft O-ring 16 out of the Fire Tube 30 instantly opening the Fire Tube Valve 84 and allowing the higher pressure void gas to fill the Pressure Chamber 80.

The firing mechanism operation is shown in FIGS. 6*a* to 9*b*. The figures show the various components, channels, passageways, and gas pressures at the fired/standby and armed positions for both the explosion and implosion mode in two alternative embodiments of the current invention. There are differences in position of various components in the explosion and implosion mode due to the Pressure Chamber 80 pressure setting mechanism. But the firing mechanism for both modes is the same and is not influenced by the pressures in the Pressure Chamber 80, Compressed Gas Source 99, void, or any part of the Pressure Chamber 80 pressure setting mechanism.

In a preferred embodiment of the current invention the time of the firing mechanism to be set from the fired/standby to armed position is determined by an electrical supply that is sent through the Data Cable 61 to the actuating side of the Solenoid 70. This electrical supply opens the internal valve in the Solenoid 70. In a preferred embodiment of the current invention the electrical supply is left on for ½ to 5 seconds duration, with 2 seconds being optimum. During this time the Stable Pressure gas from Stable Pressure Regulator 48 then travels through the Solenoid 70 and into the Pneumatic Computer 90 to apply pressure to the actuating end of the Fire Bobbin 23 which in turn compresses the Fire Bobbin Spring 50 located inside the opposite end of the Fire Bobbin 23. The movement of the Fire Bobbin 23 reverses the exhaust and pressure supply ports which are applied to the rear and front of the Piston Cylinder 72 respectively, the exhaust port being increased from atmospheric to the Stable pressure, the pressure supply port being decreased from the Stable pressure to atmospheric. This pressure difference moves the Piston Flange 73 with its Piston Shaft 22 forward to seal off the Pressure Chamber 80 from the void by utilizing the Piston Shaft O-ring 16 seated inside the rear end of the Fire Tube 30 creating the High Pressure Fire Valve 84. When the Fire Valve 84 closes the Piston Valve 12 opens and the Pressure Chamber 80 is then set to the appropriate pressure as determined by the Pneumatic Computer 90 as described herein.

In a preferred embodiment of the current invention when the electrical supply is shut off to the Solenoid 70 the pressure supply to the passageway for the actuating end of the Fire Bobbin 23 vents to atmospheric pressure. The compressed Fire Bobbin Spring 50 pushes the Fire Bobbin 23 forward which in turn reverses the pressures in the exhaust and the pressure supply ports of the Piston Cylinder 72, the exhaust port returns to atmospheric pressure and the pressure supply port is increased from atmospheric pressure to the Stable pressure. This change in pressure moves to the Piston Flange 73 back to its original fired/standby position pulling the Piston Shaft 22 with the Piston Shaft O-ring 16 out of the Fire Tube 30 to close the Piston Valve 12 and open the Fire Valve 84 thus enabling the pressure difference between the Pressure Chamber 80 and the void to equilibrate. In a preferred embodiment of the current invention the complete cycle time is just over 2 seconds.

Microphone Cavity Area

In a preferred embodiment of the current invention the Microphone Cavity area at the front of the Acoustic Generator 0 contains the Fire Tube 30 which sends the sound into the void, and the Microphone unit (32, 33, and 34) which receives echoes from the well and sends the appropriate electrical signal to the Surveyor Unit 100.

As mentioned before in a preferred embodiment of the current invention there are systems used to eliminate, reduce or offset the effects that the unequal gas pressure force has on the time taken for the gas pressures to equilibrate. This includes the portal structure design and the design of the components in the Microphone Cavity area which are made for the efficient and effective firing of sound and the accurate recording of the echoes generated.

Fire Tube

As shown in FIG. 1 in a preferred embodiment of the current invention the Fire Tube 30 is set in its position against the Housing 1 at the front of the Pressure Chamber area and is sealed from the void by the Fire Tube O-ring 39. The rear flange plate of the Fire Tube 30 and the Housing 1 form the front wall of the Pressure Chamber 80. As shown in FIG. 2 in a preferred embodiment of the current invention the rear flange plate of the Fire Tube 30 also secures the Support Tubes 40.

Without being bound by any theory or hypotheses due to the design of the Acoustic Generator 0 in a preferred embodiment of the current invention the barrel or portal of the Fire Tube 30 has a number of features which shorten the time taken for the gas pressure difference to equilibrate.

First, in a preferred embodiment of the current invention the diameter of the barrel or portal of the Fire Tube 30 is as large enough so as to shorten the time to equilibrate and yet not too large so as to create unwanted or excess turbulence. In a preferred embodiment of the current invention the opening has an area of 0.1 to 2.5 square inches.

Second, in a preferred embodiment of the current invention the portal of the Fire Tube 30 is in the center of the front face of the Pressure Chamber 80. In a preferred embodiment of the current invention the front face of the Pressure Chamber 80 is symmetrical with the Fire Tube 30 in the center to ensure a symmetrical release of the gases when the Acoustic Generator 0 is fired.

Third, in a preferred embodiment of the current invention barrel of the Fire Tube 30 is a hollow cylinder which provides a straight shot of the sound wave into the void. In a preferred embodiment of the current invention when the Piston Shaft 22 is pulled back to fire the Acoustic Generator 0 the sound generated is directly channeled by the barrel of the Fire Tube 30 into the void.

Another option for a preferred embodiment of the current invention is for the barrel of the Fire Tube 30 to be rifled, i.e. to have cut or machined in any number if spiral grooves to the inside surface.

Microphone Unit and Wave Guide

As shown in FIGS. 2 and 3c, in a preferred embodiment of the current invention the Microphone unit (32, 33, and 34) is a hollow cylindrical design that is fits over the barrel of the Fire Tube 30 and is secured into place with the Wave Guide Nut 31 screwed on to the front end of the Fire Tube 30. The Wave Guide Nut 31 is further locked down from unscrewing with a Set Screw 36. As shown in FIG. 2, in a preferred embodiment of the current invention the Microphone Element 34 is parallel to the barrel of the Fire Tube 30 and perpendicular to the front of the barrel. The Wave Guide Nut 31 has a symmetrical bevel on the front so as to correspond and be parallel to the angle of the internal symmetrical bevel of the Housing 1. The Wave Guide Nut 31 is larger in diameter than the outside surface of the Microphone Element 34. This design allows any incoming pressure waves that might affect the signals from the Microphone unit to be deflected around the Wave Guide Nut 31 into the main part of the Microphone Cavity 46 area as they ricochet against the rear flat side of the Wave Guide Nut 31. This design permits the Microphone Unit to be extremely sensitive in order to enhance and improve the quality of the echoes detected. In a preferred embodiment of the current invention the bevel of the Wave Guide Nut 31 can be 20 to 45 degrees, depending on other internal characteristics of the Acoustic Generator 0 and microphone. Thirty degrees works well but twenty-five degrees works the best for acoustic sounding purposes.

In a preferred embodiment of the current invention the Microphone unit itself consists of a Microphone Element 34 made of a cylindrical Ceramic Piezo material which is suspended between the Microphone Holder 32 and the Microphone Cap 33 with Microphone O-rings 86 on the ends and inside diameter. There are alternative embodiments for the Microphone Element 34. As shown in FIGS. 2g and 2h one embodiment has two separate oppositely charged conductive coatings on the inside of the Microphone Element 34 with the outer surface having a neutral coating. A Lead Wire, 58a and 58b, is connected to each of the conductive coatings on the inside.

As shown in FIG. 3c in another embodiment the Microphone Element 34 has two separate oppositely charged conductive coatings, one on the outside and the other on the inside with both Lead Wires 58a and 58b being connected to the inside coating through a Zener Diode 87 and a Resistor 88 respectively.

For either embodiment of the Microphone Element 34 described the Lead Wires, 58a and 58b, run through a Support Tube 40 to the Data Channel 61 as shown in FIG. 1. The Microphone unit (32, 33 and 34) is assembled with specific torque specifications for resonant frequency response and sufficient sensitivity. The cavity made in the Microphone unit by its three components is air-tight but is constantly at the atmospheric pressure due to the air passageway through the Support Tube to the rear of Acoustic Generator 0. Maintaining atmospheric pressure in the cavity of the Microphone unit maintains the quality of the echoes received regardless of the void gas pressure.

Surveyor Unit

The following is a description of the components and operation of the Surveyor Unit 100.

Components and Operations of the Surveyor Unit

Figure 11:
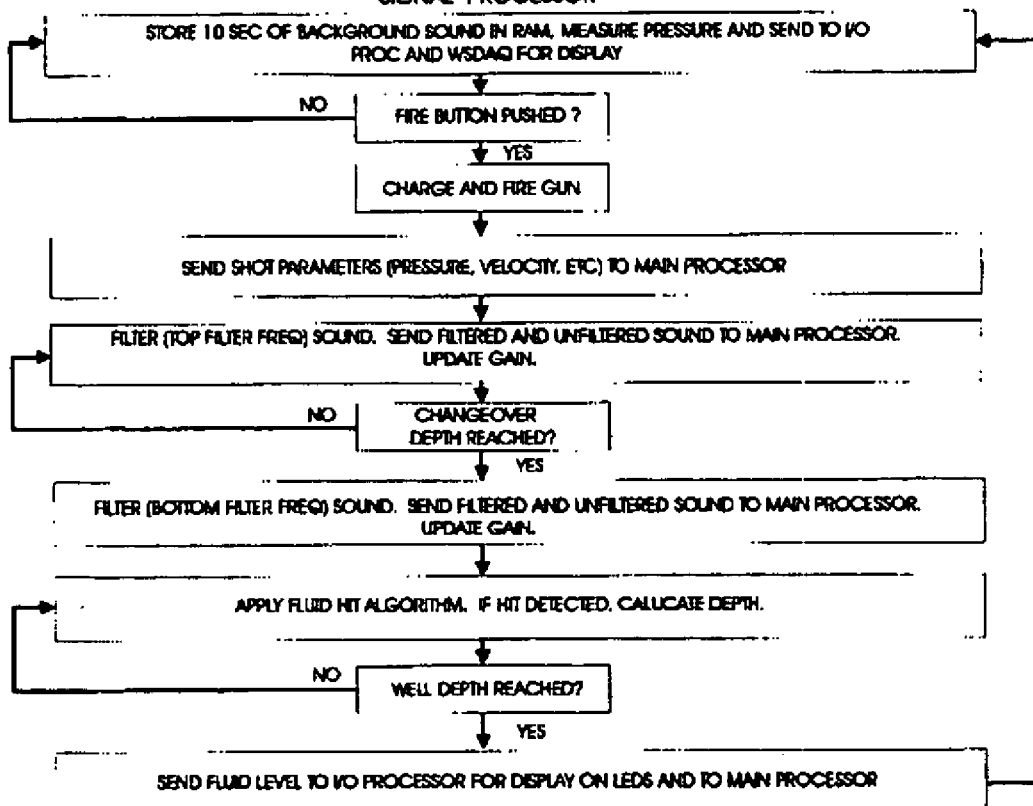
FIG. 11 is a flowchart depicting the instructions executed by the signal processor, main processor, and i/o processor of a Surveyor Unit in a preferred embodiment of the current invention.
Figure 12:
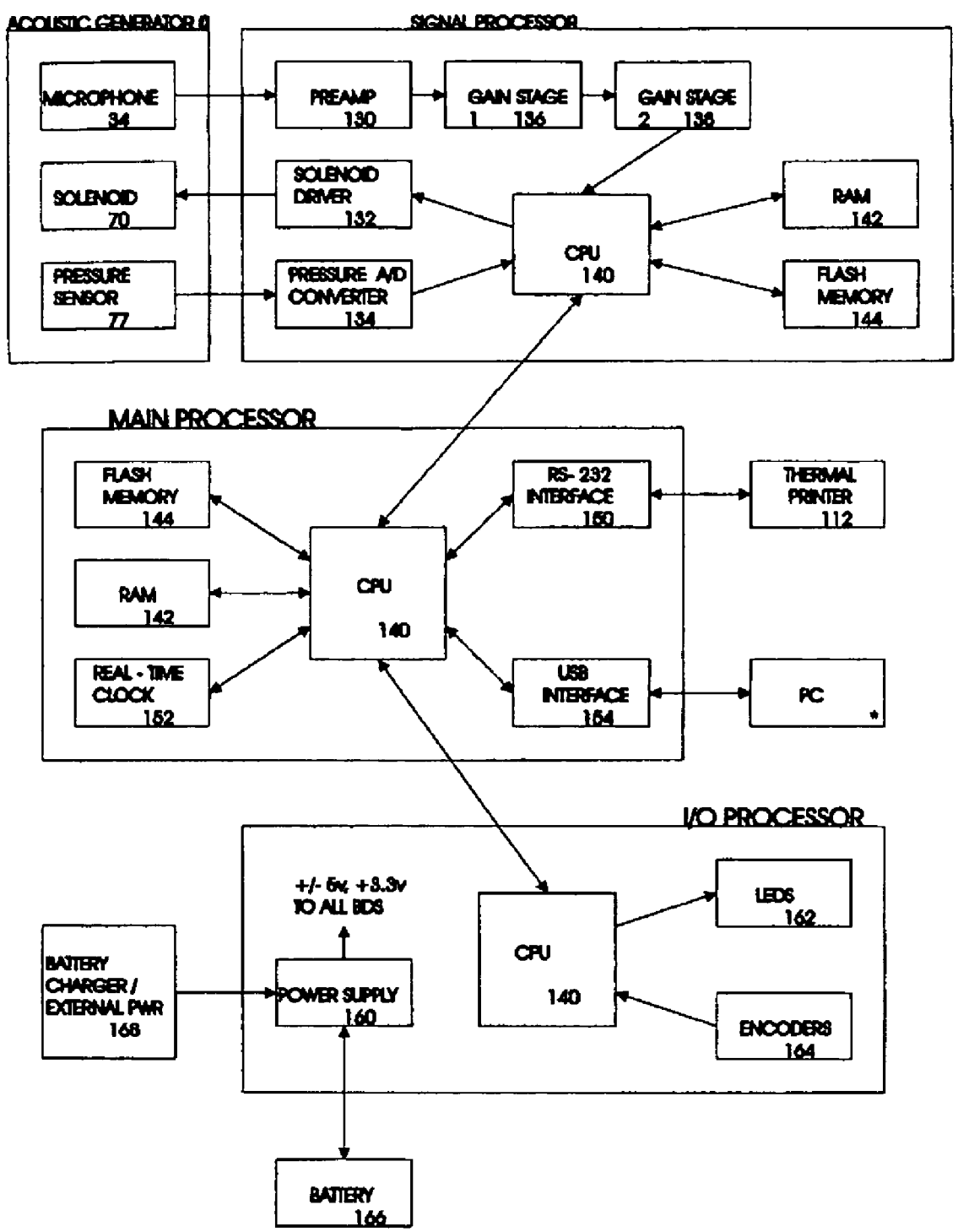
FIG. 12 is a block diagram depicting the components of a Surveyor Unit in a preferred embodiment of the current invention.

As shown in FIGS. 10 and 11, the following describes the components and operations of the Surveyor Unit 100 in a preferred embodiment of the current invention.

As shown in FIG. 10, in a preferred embodiment of the current invention there are two input signals and one output signal from the Surveyor Unit 100 to the Acoustic Generator 0. The analog signals from the Pressure Transducer 77 are digitized by an A/D Converter 134 for processing by the Surveyor Unit CPU 140. The analog signal from the Microphone 34 is sent to a Preamp 130 and two Gain Stages 136 and 138 for input to the CPU 140 where it is digitalized by the A/D converter inside the CPU 140. There are two gain stages to maximize the signal and minimize gain errors although more could be used if needed. The CPU 140 also controls the Solenoid 70 by using a Solenoid Driver 132.

Figure 13:
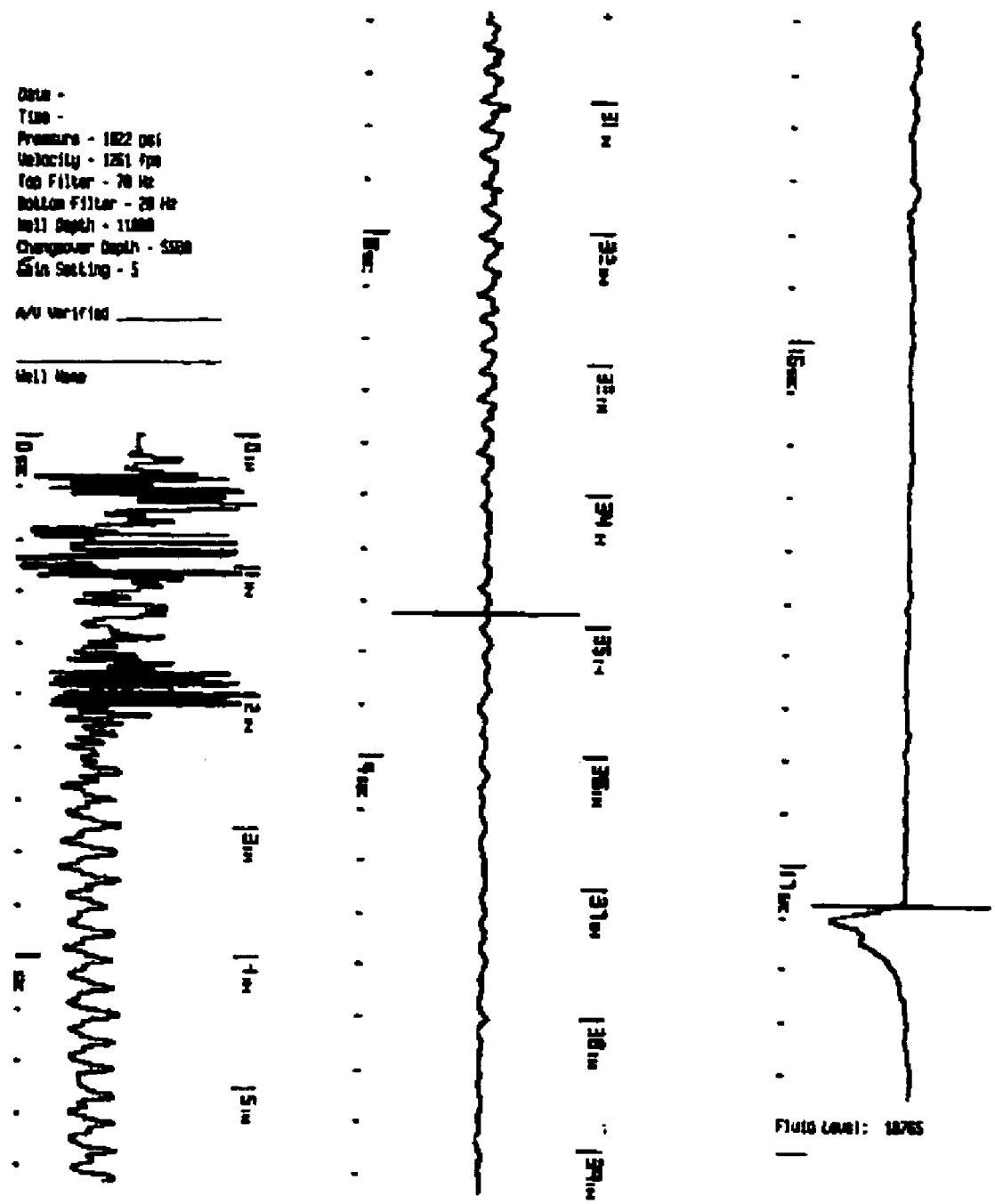
FIG. 13 is a copy of a typical strip chart printed by a preferred embodiment of the current invention from an acoustic sounding of a 12,000 foot well.

The CPU has two additional outputs, an Interface 150 to the Compact Printer 112 component of the Surveyor Unit 100, and a USB Interface 154, shown as the USB Port 115 in FIG. 13, to connect the Surveyor Unit 100 to a computer for further analysis of the data stored in the Surveyor Unit 100.

There are two types of memory. Flash memory 144 is used for storing long term data such as settings and shot files. Data in a flash memory is not lost when power is removed. Ram memory 142 is used for temporary storage and data is lost when power is removed.

The Encoders 164 are rotary encoders and their function is similar to potentiometers. They are used when a user turns a knob. A digital signal is sent to the I/O Processor CPU 140 to input settings such as velocity and well depth into the Surveyor 100.

There are various parameters and functions performed by the I/O Processor CPU 140 which are shown in FIG. 11 and saved in a Surveyor shot file. These functions are:
Well pressure
Changeover depth
Well depth
Acoustic velocity
Decay rate
Peak averaging time
Threshold multiplier
Autostart setting
Filter frequencies
Preamp gain
Minimum gain
Maximum gain
Start gain knob setting
End gain knob setting The filters used in the Surveyor Unit 100 are digital filters. The "top" filters filter sound collected from the start of the shot until the changeover depth is reached. The "bottom" filters are used the rest of the time. Digital filters are implemented by multiplying the current and previous sound readings by a set of stored coefficients. The output of the filter is the sum of the products. Frequencies, "sharpness" and stop band attenuation are determined by the coefficients used and can be changed by software at any time. The calculations are performed by the CPU so no additional components are needed.

The actual gain of the amplifiers is determined by the knob settings and the minimum and maximum gain settings. The amplifier gain with a knob setting of 1 is equal to the minimum gain setting and the gain at a knob setting of 10 equals the maximum gain. Minimum and maximum gains will be set when the Surveyor is initially setup and probably will not be changed by the user.

The fluid hit algorithm is a set of steps taken by the Signal Processor to find the reflection from the fluid surface. The background sound during the shot is filtered and a threshold is determined. The threshold is found by first tracking the instantaneous peak sound amplitude. Between peaks, this amplitude is "bled away" by the decay rate. The threshold is the average of previous peaks multiplied by the threshold multiplier. The characteristics of the threshold can be changed to work in a particular well by changing the decay rate, averaging time, and threshold multiplier.

Last, each sound sample is compared to the current threshold. When the sound amplitude reaches the threshold in a negative direction, the fluid reflection has been found.

The depth calculation performed by the Surveyor is the following:

Depth=Time to hit×(Velocity/2)

Operating of the Surveyor Unit

As shown in FIG. 10, in a preferred embodiment of the current invention the Surveyor Unit 100 is in a protective case of approximately 7×8×5.5 inches. After opening the Latch 125 and lifting the Lid 121 of the Surveyor Unit 100, various colored knob controls will be available for usage. The Compact Printer 112 is located above the top of the Face Panel 104 and is electronically connected through an Interface 150, which is shown in FIG. 13 as the Panel Mount Jack 102. Additional optional functions can be supported through additional plugs next to the Panel Mount Jack 102.

In a preferred embodiment of the current invention the Compact Printer 112 uses a frequency-controlled step-motor for a consistent, exact, and reproducible printer speed. The strip chart produced by the Compact Printer 112 shows time in seconds at the top of the tape along the edge to the bottom of the printed tape and likewise measurements in inches on the opposite edge with the zero for both being set at the face wave of the shot. As shown in FIG. 13, in the upper left hand corner of the Face Panel 104 there are plugs for the 12V PowerJack 112, the USB Port 115, and the Printer Port 113. In the bottom left corner of the Face Plate 104 moving from left to right are control knobs and the fire button.

As shown in FIG. 10, in a preferred embodiment of the current invention the first knob on the left is the Acoustic Velocity Knob 105, and is used to adjust the Acoustic Velocity measurement in feet per second. The Acoustic Velocity Knob 105, like several other knobs in the Surveyor Unit 100, has two height positions, up and down, with the up position being the default. In the up position the Acoustic Velocity Knob 105 is used to finely adjust the acoustic velocity setting by feet per second units. In the down position the Acoustic Velocity Knob 105 will make large adjustments to the acoustic velocity setting by one hundred feet per second units.

Moving to the right in FIG. 10, the next knob shown is the Depth/Changeover Knob 106. In a preferred embodiment of the current invention the Depth/Changeover Knob 106 has three functions, in the default up position it changes the void or well depth distance, clockwise to increase and counterclockwise to decrease in increments of 100 feet. In the down position the Depth/Changeover Knob 106 alters the frequency changeover depth, clockwise to increase and counterclockwise to decrease. The third function of the Depth/Changeover Knob 106 occurs when it is used in conjunction with the Off/On Gain Knob 107 to enter desired numerical values into the Surveyor Unit 100 from the menu selection which is displayed on the Digital Readout Display 103.

TABLE 3

Off/On Gain Knob Menu for Surveyor Unit

| No. of Knob pushes | Menu Function | | |
|---|---|---|---|
| | Mode | Default | Start/Stop |
| 0 | Off-On | Off | Off = Turn Right On = Turn Left |
| | Ending Gain | Default Setting | Turn Right or Left |
| 1 | Beginning Gain | Default Setting | Depress and Turn Right or Left |
| 2 | Setup Code | Default Setting | Start = Fire Stop = Tap Once |
| 3 | Auto-Fire Clock | Zero | Start = Fire Stop = Tap 3 Times |
| 4 | Pressure Transducer Zero Set | Zero | Stop = Automatic |

Moving to the right in FIG. 10, the Off/on Gain Knob 107 is the next knob and is commonly called the menu knob. In a preferred embodiment of the current invention the ions are shown in Table 3:

In a preferred embodiment of the current invention the Off/On Gain Knob 107 as the off-on switch by turning to the right in the standard height position for "on" left in the standard position for "off". The selected menu function is displayed on the Display Window 103 and the Depth/Changeover Knob 106 is used to enter the numerical values into the electronic programming of the Surveyor Unit 100. When using the Depth/Changeover Knob 106 in this mode, single digit units are selected in the up position and turning the Selector Knob 106 to the left or right to the desired number. The down position will change the values by multiples of tens or hundreds as appropriate.

Moving to the right in FIG. 10, in a preferred embodiment of the current invention the knob to the right of the Off/On Gain Knob 107 is the Fire Button 108. This is a momentary contact push button used to arm and then fire the Acoustic Generator 0. At a desired time after all numeric entries have been made into the Surveyor Unit 100 the Fire Button 108 is pressed and released initiating an electronic signal. This will immediately set all surveyor data entries and initiate the firing cycle. In a preferred embodiment of the current invention an electronic pulse travels through the Data Cable 61 to the Acoustic Generator 0 to automatically trigger the Solenoid 70 for two seconds for arming and then releases the Solenoid 70 to fire the Acoustic Generator 0 as explained herein. As also explained herein, the Fire Button is also used as a safety button for pressure bleed-off. When the Well Depth is set to "000" the Fire Button can be pressed to open the Solenoid 70 to relieve all excess pressures prior to Acoustic Generator 0 disconnection from a well.

In a preferred embodiment of the current invention as shown in FIG. 13, there are three smaller knobs in a triangular pattern in the upper right corner of the Face Panel 104. These knobs are used as an alternate method to calculate and adjust the acoustic velocity reading. Starting on the top above the Fire Button 108 and slightly to the right is the Measured Segment Knob 109. It is used for entering the number of inches measured on the printout tape which correlate to ten pipe collars or any other known distance measurement in the well. In a preferred embodiment of the current invention the default setting for the Measured Segment Knob 109 is set to a distance that represents ten normal collars, 2.123 inches. The next small knob to the right is the Feet in Segment Knob 110 which is used to enter the average number of feet for ten lengths of well tubing in the well being measured. In a preferred embodiment of the current invention the default setting for the Feet in Segment Knob 110 is 317.5 feet. The third knob is the Inches to Fluid Knob 111. It is straight below the Feet in Segment Knob 110. This Inches to Fluid Knob 111 is used to enter the total number of inches on the printout tape from the start of the shot fired to the fluid hit. When these values are entered into the Surveyor Unit 100 the fluid level is recalculated and shown on the Digital Readout Display 103. In a preferred embodiment of the current invention the default setting for the Inches to Fluid Knob 111 is 22.34 inches which correlates with our standard demo shot. While this example is using 10 collar lengths to determine the overall acoustic velocity of the well, a much greater known distance to an anomaly deep in the well is preferred as it will give greater accuracy for the entire distance. The three knobs 109, 110 and 111 are used as a manual method for calculating acoustic velocity and fluid levels from the Surveyor Unit 100.

In a preferred embodiment of the current invention the Compact Printer 112 will print a continuous line readout of the well shot feedback information as a positive bump or negative dip off of the centerline which when interpreted will show pipe collars, fluid level, and other well anomalies. This readout will have various control settings printed on the first portion of each shot tape prior to the shot feedback information.

In a preferred embodiment of the current invention the top lid of the protective case has a metal Hold-down Bracket 116 to restrain the Compact Printer 112 from unwanted movement while the Surveyor Unit 100 is being transported and to provide a storage place for digital calipers, the data cord, and the unit's instruction card.

Explosion and Implosion Mode

In a preferred embodiment of the current invention the Acoustic Generator 0 will automatically determine the explosion or implosion mode through the Differential Regulator 45 by detecting the difference in pressure from the void compared to the external gas source. The greater of the two pressures will shift the Differential Regulator 45 forward or backward which in turn changes the pressure passages accordingly. The Surveyor arms and fires the Acoustic Generator 0 exactly the same for both the explosion and implosion modes.

Setting Shot Properties Manually

In a preferred embodiment of the current invention the properties and settings can be manually altered for specific desired results using one or more of the three larger knobs, 105, 106, and 107. Typically the void or well depth is set first using the Depth/Changeover Knob 106 in the up position. Then the frequency crossover depth is set by using the same knob, pushing it down, and turning it right or left as desired, although this is not necessary as the default changeover will automatically be adjusted to one half of the entered well depth. Following this the beginning and ending gain settings can be changed using the Off/On Gain Knob 107; the ending gain in the up position and the beginning gain in the pushed down position. If the acoustic velocity is known it can be entered at any time prior to initiating the fire sequence, by turning the Acoustic Velocity Knob 105 right or left in the up position to achieve the desired result. Tapping any of these knobs once will display its current setting.

Using Set-Up Code Option

In a preferred embodiment of the current invention specific settings for any individual well or void can be entered as the default settings. This is done by pressing the Off/On Gain Knob 107 twice and then using the Depth/Changeover knob 106 to enter the numeric setup code. These new default settings will remain in the Surveyor Unit 100 until cleared by setting a new set-up code, by turning off the power, or by manual adjustment of Knobs 105, 106, or 107. When the power is turned back on, the original set-up codes will revert as the default codes.

Changeover

In a preferred embodiment of the current invention the changeover depth is the depth in feet where high frequency for readings in the upper portion of the well changes to a lower frequency for readings from the lower portion of the well. As explained herein, higher frequencies of 40 Hz to 100 Hz are normally used to measure the reflections from the collars. The measurement of the echoes from the collars is used to calibrate the echoes from the well as the distance between the collars is known. The lower frequency of 1 to 40 HZ is normally used to detect the fluid hit; i.e. the fluid level present in the well. However these frequency ranges may not be applicable for every well and so the frequencies being detected may need to be altered or adjusted accordingly.

In the Surveyor Unit 100 the results to be analyzed have a changeover point, at the place where the higher frequency detection changes over to the lower frequency detection. In a preferred embodiment of the current invention the Surveyor Unit 100 can change the changeover by using the Depth/Changeover Knob 106 when depressed and turned right or left as desired.

Setting Automated Firing Timer

In a preferred embodiment of the current invention the automated shot timer can be set by pressing the Off/On Gain Knob 107 three times. The Digital Readout Display 103 will show Hr 0.00. This represents the amount of time from one automatic firing to the next automatic firing. It can be set at regular intervals from 1 minute apart up to 24 hours apart in most cases. In other cases, depending on the nature of a well, an operator may want to set an irregular specific automatic firing time sequence to observe an unusual phenomena exhibited by the well.

Regardless of the regularity or irregularity of the firing time sequence, setting the Automated Firing Timer is accomplished with the Depth/Changeover Knob 106; in the up position, turning right or left will dial in the amount of minutes and in the depressed position, turning right or left will dial in the hours. After the desired time has been set, one press of the Fire Button 108 will start the sequence of automatic firing, or to cancel the automatic firing sequence tap three times on the Off/On Gain Knob 107 to revert to the default settings.

Well Depth Setting

In a preferred embodiment of the current invention the well depth is set using the Depth/Changeover knob 106 in the up position. Turning this knob right or left will dial in the desired well depth in 100 foot increments. Typically in the preferred embodiment of the current invention the well depth is set at or below the known well depth.

Acoustic Velocity

In a preferred embodiment of the current invention the default acoustic velocity is set at 1220 ft per second. Any known acoustic velocity can be entered by turning the Acoustic Velocity Knob 105 right or left in the up position for single units and depressed for hundreds of units to the desired amount.

Confirming Fluid Level

In a preferred embodiment of the current invention the fluid level depth will show on the Digital Readout Display 103 as the distance in feet from the top of the well to the fluid level at the conclusion of any shot fired. It is automatically calculated and determined through the internal computer electronics and is not subject to any direct manipulation or control externally other then recalculations from adjusted parameters. If no fluid level is determined from the internal electronics the Digital Readout Display 103 will read all 8s.

Automated Marker Finder and the Corrected Acoustic Velocity Calculator

When shooting a well to ascertain the level of the fluid standing within the well, it is common practice to find a length of time encompassing a known distance. This length is extrapolated to the point where the fluid level is observed, while counting this number of lengths or segments and multiplying by the known length of the segment. This segment length is usually near the top of the well, where pipe collars of a known length are most visible.

This method does not account for the variations in Acoustic Velocity which occur when gas within the well settles into layers, often having differing Specific Gravity and therefore widely varying Acoustic Velocities. To get more accurate estimations of fluid levels, some professionals try to find the location of a known feature of the well which is close to the fluid level and measure the shorter distance from this feature to the fluid. These known features are commonly referred to as "Markers". These Markers may be valves, anchors, casing liners and other objects within the well, or larger collars or other objects placed along the tubing or casing string for the purpose of generating an acoustic anomaly or a Marker anomaly.

In a preferred embodiment of the current invention, Marker anomalies are found automatically by the Surveyor Unit 100 much in the same manor as the automatic fluid level is determined described above with some variations. First, the Marker anomaly for which the program is searching is often a solid object, which will create an upward spike on the readout display, instead of the downward spike usually indicating the fluid level hit. Second, an upward spike anomaly is usually expected to be found within a narrow range, and this range may be set to about one second, or less of the shot recording to search only in this narrow range and ignore other similar anomalies. In a preferred embodiment of the current invention the range is set in the Surveyor Unit 100. Another unique feature of this search is that its' frequency may be set to one that best singles out the Marker anomaly. This unique frequency/filter applies only during the narrow range selected for this search. In a preferred embodiment of the current invention the range and threshold amplitude for the Marker anomalies are set in the Surveyor Unit 100.

When the Marker anomaly is detected by the Surveyor Unit 100 it calculates the precise time from the beginning of the shot to the detection of the Marker anomaly, and use this time and known distance to ascertain an Acoustic Velocity which is calculated over as much of the well depth as possible for superior accuracy over previous methods which rely on the length of a few collars near the surface of the well.

About one tenth of a second prior to every automatic fluid level calculation, the Acoustic Velocity is determined and applied to the Acoustic Velocity calculation used for the current fluid level determination for maximum accuracy. Since many wells already have noticeable features which may be used as known Markers, this becomes very practical in many wells, and therefore is part of the standard Set-up Code criteria to be applied to each unique well situation by our instruments.

Viewing the Well Background Sounds

In a preferred embodiment of the current invention the well background noise can be seen directly in real time on the Surveyor Unit 100 from the Compact Printer 112 by pressing once and holding down the Off/On Gain Knob 107 until the desired amount of tape has been released for review from the Compact Printer 112. This viewing will show any noise originating from the well itself.

Benchmarking the Invention

The main goal of any acoustic generator is to generate a sound that enables the microphone in the gun, or a separate transducer, to detect a clear range of echoes from the entire borehole. For the acoustic sounding method the sound to be generated by the gun should be similar to that of a gunshot, i.e. a sharp short loud bang. This is oversimplifying the situation, but the phrase "loud sharp short bang" is useful because it relates to the three measurable qualities of the sound's effectiveness in the acoustic sounding method: intensity (loud), the face angle (sharp), and the elapsed time (short). In addition to these criteria there is a fourth factor in determining the effectiveness of the sound generated for the acoustic sounding method: interference. Interference is a fourth measurement of a sound's effectiveness in the acoustic sounding method because it takes into consideration the effects that any interfering secondary sounds may have with the primary sound wave generated by the acoustic sounding equipment.

Intensity

Intensity is the initial power release rated in decibels (dB) which are easily measured with readily available electronic instruments and programs, such as a pressure transducer calibrated in a linear scale converted to millivolts and sent to a digital readout. But decibels are not an empirical measurement unit as the decibel value depends on the agreed upon reference. The decibel scale is a base 10 logarithmic scale, so from any given starting point it takes 10 times an increase in sound power to increase the dB readings by 10. As an example to increase 150 dBs to 160 dBs it takes 10 times greater power needed then at 150 dBs. To the average person a 10 dB increase in sound level is perceived as a doubling in loudness.

So although intensity is rated in decibels, intensity is related to pressure amplitude. Pressure amplitude being a measure of the size of the variation in air pressure caused by a sound wave. In particular, the energy in a sound wave is proportional to the square of the pressure amplitude. As an example, if the pressure amplitude of a sound wave is doubled then the energy carried by that wave is quadrupled. In pure silence there is a constant pressure—atmospheric pressure. It is fairly simple to understand how a calibrated measurement of the pressure amplitude can be made using a microphone to convert the pressure variations into an electrical signal. By applying known pressure variations to the microphone the electrical signal can be calibrated to directly measure the air pressure variations. With suitable processing this pressure variation can be converted into the pressure amplitude. This function is performed by Sound Pressure Level (SPL) meters.

Elapsed Time

The second is elapsed time. This equates to the exact amount of time measured in milliseconds from the first recordable pressure wave created by this rapid equalization to the end of any equalization activity which will create distortion in the echo return. The end of the equalization activity being defined as the point when the amplitude drops back to 0 db and does not produce a secondary wave afterwards, i.e. does not produce a subsequent positive reading of 155 dB or More.

Face Angle

The third factor determining the effectiveness of a sound wave intended for acoustic sounding purposes is the flatness of the front wave face. For the purposes of benchmarking, this is measured from the graph results as being the angle of the front wave face as compared to a horizontal line in sync with the base line of the wave trace.

Secondary Wave

Figure 19:
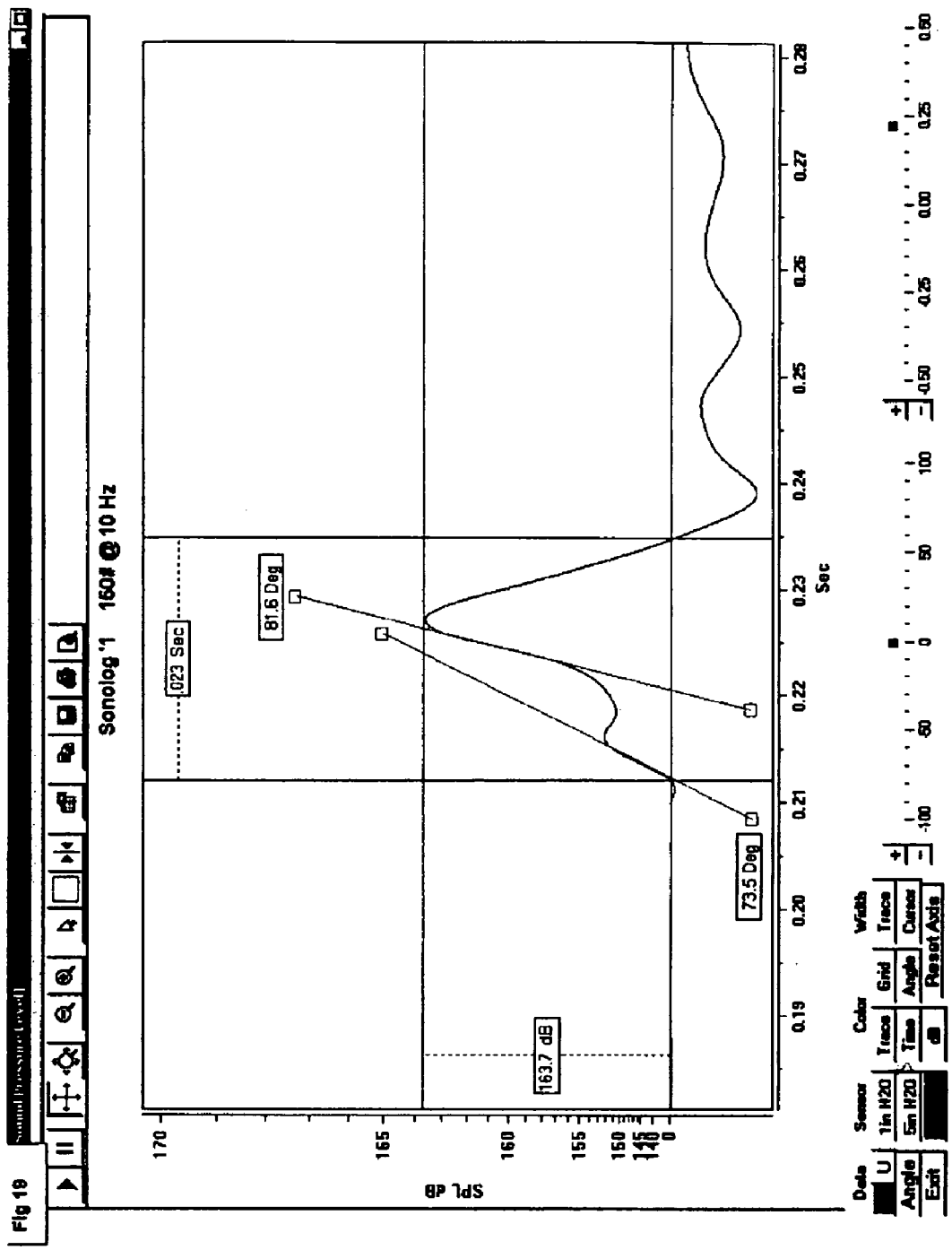
FIG. 19 is a graph depicting the sound generated by a SONOLOG D-6C2 at 10 Hz under the benchmark test conditions described herein.
Figure 20:
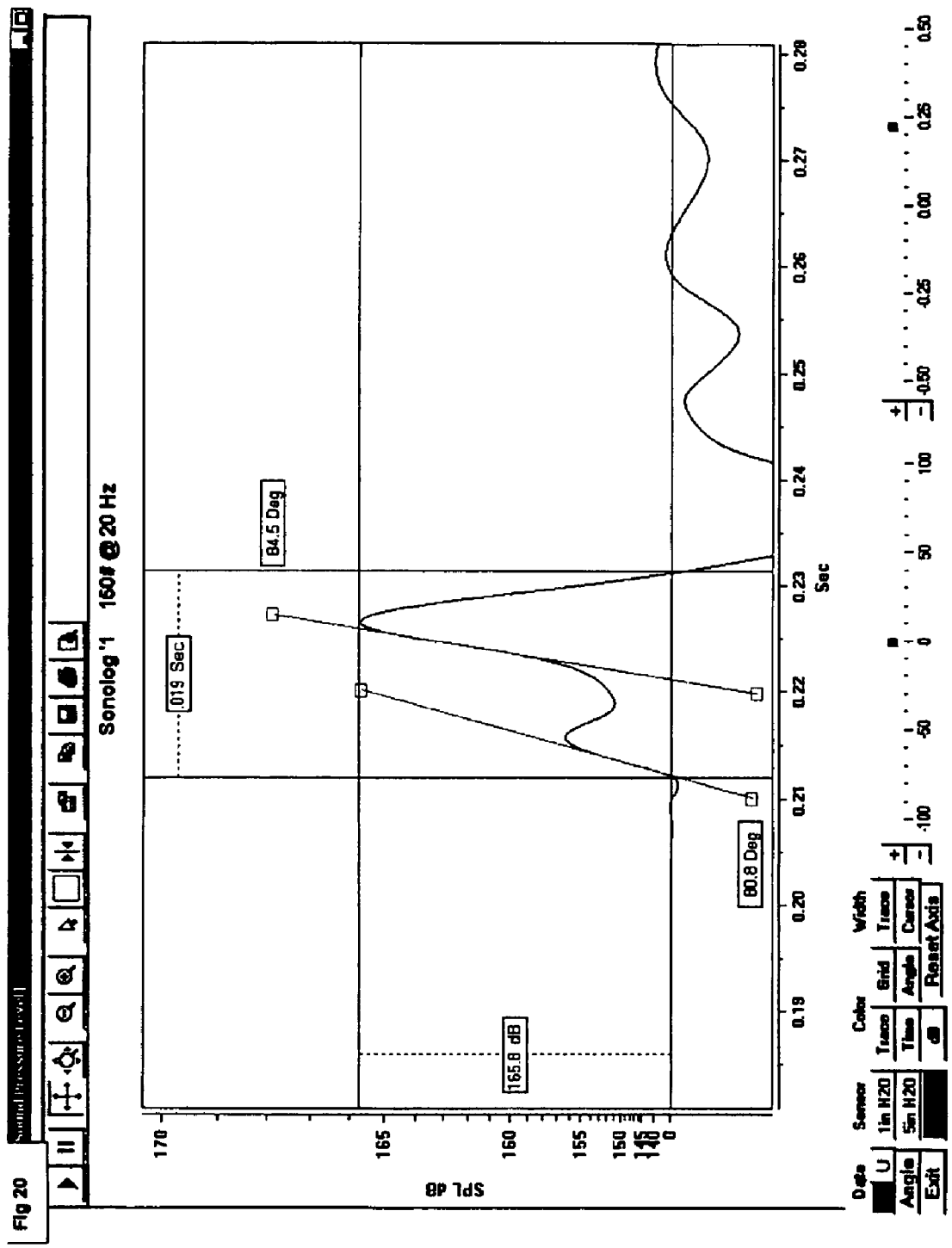
FIG. 20 is a graph depicting the sound generated by a SONOLOG D-6C2 at 20 Hz under the benchmark test conditions described herein.
Figure 21:
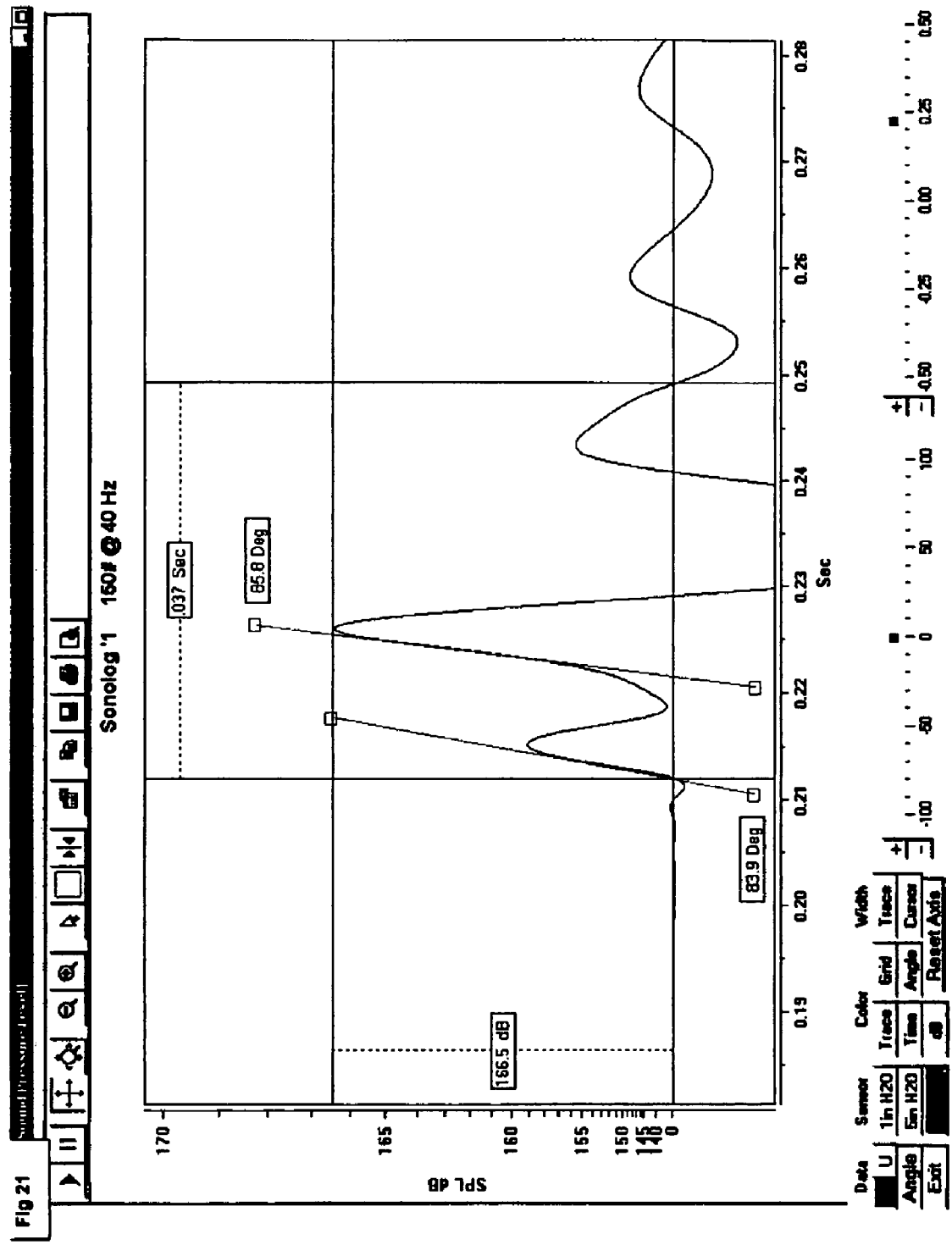
FIG. 21 is a graph depicting the sound generated by a SONOLOG D-6C2 at 40 Hz under the benchmark test conditions described herein.
Figure 22:
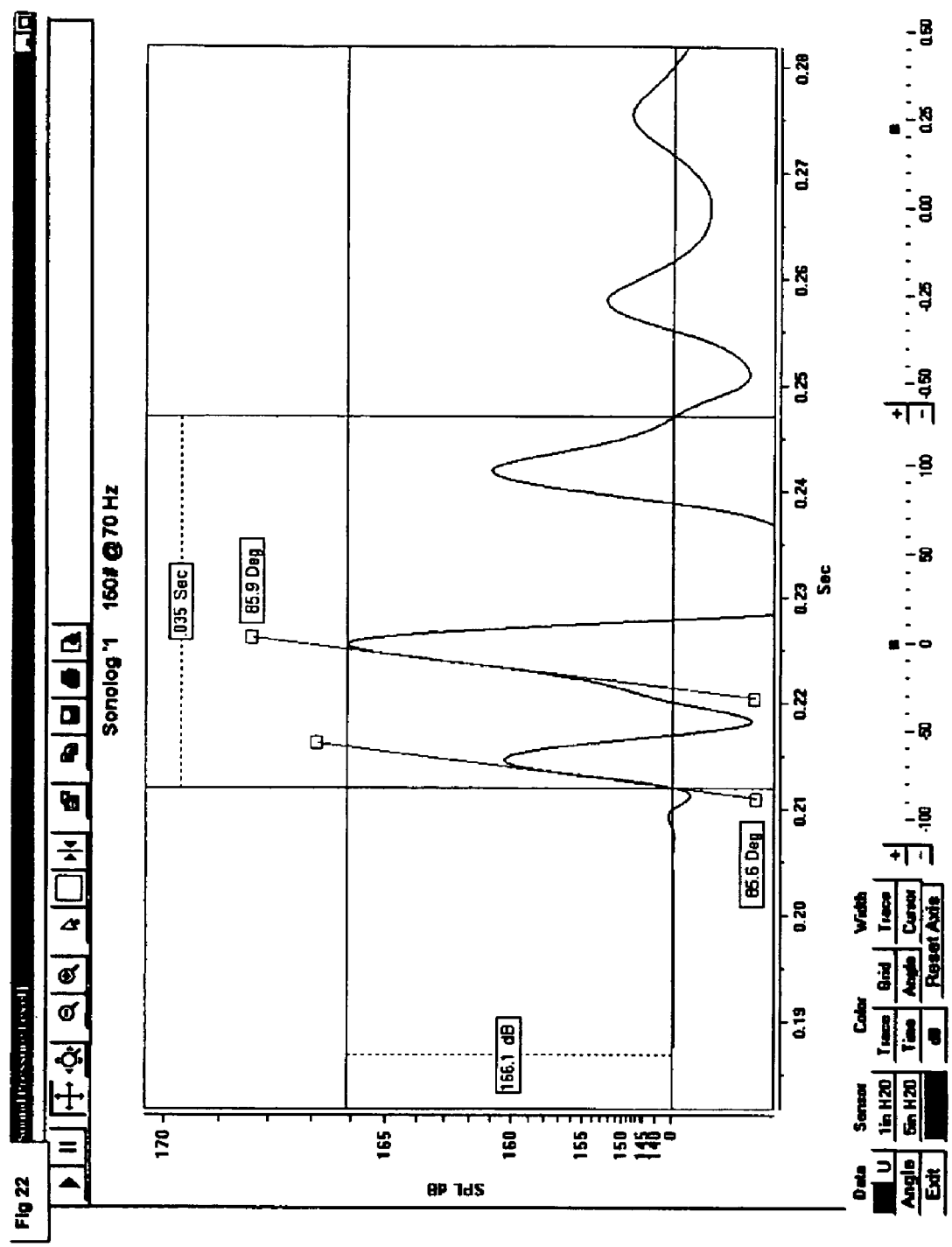
FIG. 22 is a graph depicting the sound generated by a SONOLOG D-6C2 at 70 Hz under the benchmark test conditions described herein.
Figure 23:
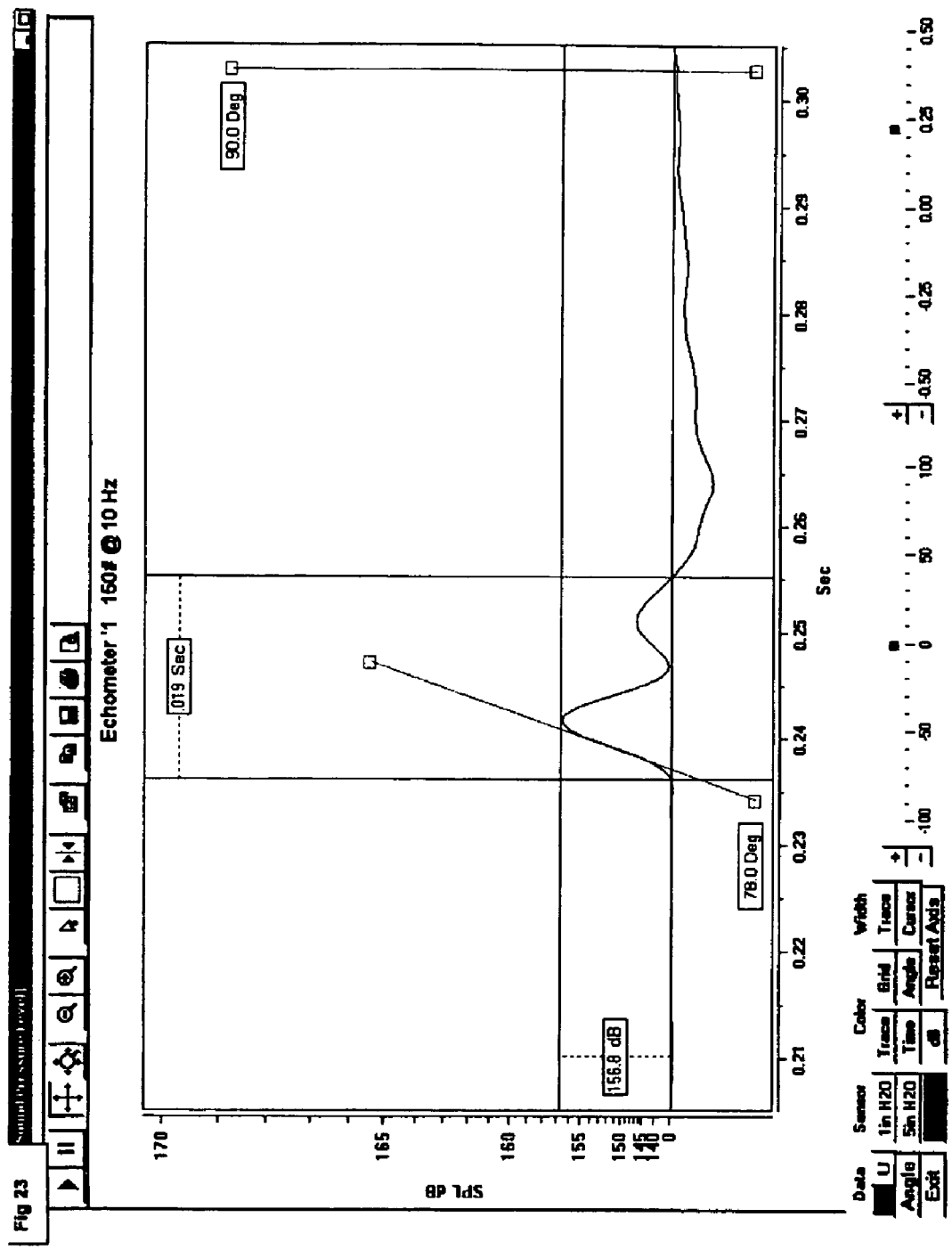
FIG. 23 is a graph depicting the sound generated by an ECHOMETER COMPACT GAS GUN at 10 Hz under the benchmark test conditions described herein.
Figure 24:
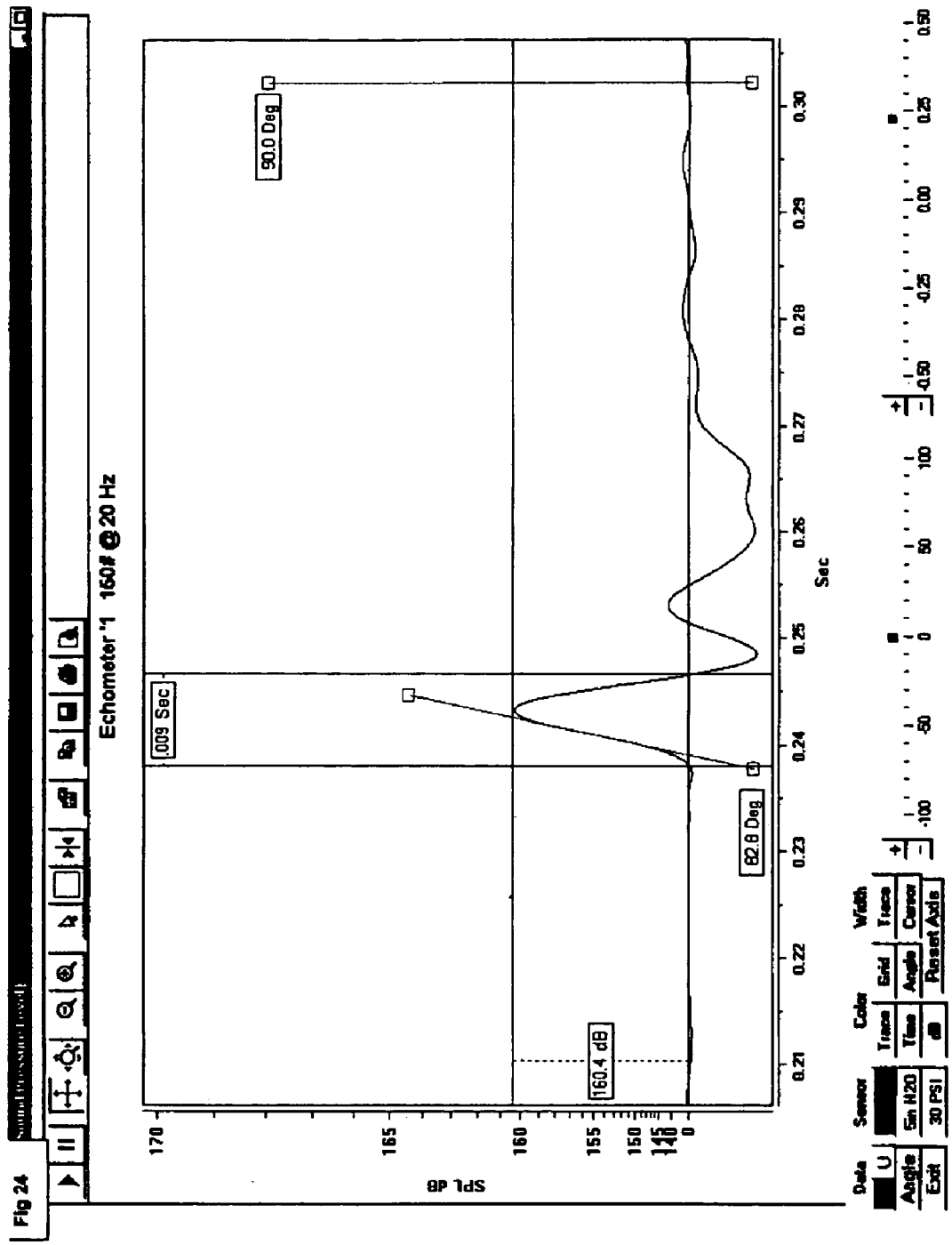
FIG. 24 is a graph depicting the sound generated by an ECHOMETER COMPACT GAS GUN at 20 Hz under the benchmark test conditions described herein.
Figure 25:
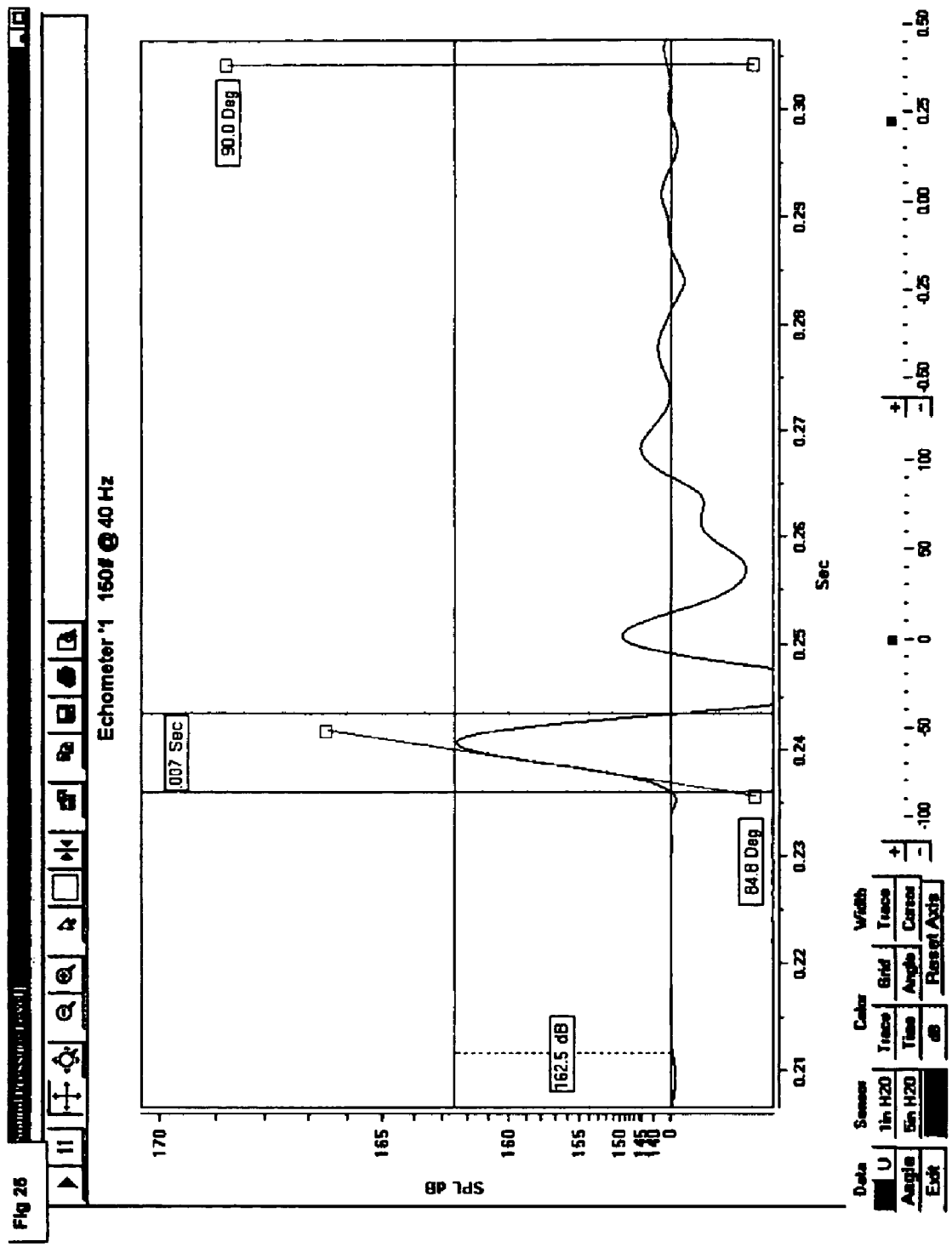
FIG. 25 is a graph depicting the sound generated by an ECHOMETER COMPACT GAS GUN at 40 Hz under the benchmark test conditions described herein.

The fourth factor to be determined is the clarity of the sound. The presence or absence of a secondary wave being an indicator of the clarity of the sound. To be effective the primary sound wave, i.e. the largest sound wave generated by the acoustic generator when fired must not encounter interference created by a secondary wave or a ripple in the primary or first wave. For the purposes of benchmarking, a secondary wave is defined as a second positive reading of 155 dB or more produced from the acoustic generator during the initial firing of the generator for at least one-half of the firings at the particular setting. A ripple is defined as a sharp dip or fall off in the front face of the first primary wave so as to separate the front face into two or more angles (see Sonolog FIGS. 19, 20, and 21).

Test Methodology

A preferred embodiment of the current invention was tested with two commercially available pressurized chamber acoustic generators, the SONOLOG D-6C2 from Keystone Development Corporation as described in Wolf and the COMPACT GAS GENERATOR from the Echometer Corporation. Each of the three generators was attached to a one meter long, two inch diameter stationary pipe with a threaded end at one end for attaching the generator. The generators were fired at room temperature using an external gas pressure source in the explosion mode and the sounds emitted from the generators were detected at the other end of the pipe by a Honeywell 30 psig microphone. The microphone output being sent to a computer programmed with a standard audio signal analysis program with the results being plotted on a graph such as the one shown in FIG. 15 with time (in seconds) on the x-axis and the decibel (dB) logarithmic scale for the y-axis.

In the oil industry the acoustic sounding method uses very low audio to sub-audio sound wave frequencies. These sound frequencies can range from 100 Hz to 1 Hz, with a range of 80 Hz to 10 Hz being the norm. The different frequencies within these ranges are used to detect different attributes in the well, for example, collars are usually detected at the 80 Hz to 40 Hz range, whereas the fluid level is detected in the 30 Hz to 1 Hz range. Accordingly the results from the microphone were detected at 10, 20, 40 and 70 Hz for each firing to determine the sound generated by each generator at each frequency.

Further for the purposes of benchmarking the different generators, the generators were fired with their pressure chambers set at 150 psi and 100 psi to determine any change in performance at these different pressures and each generator was fired at least ten (10) times at each pressure setting for statistical accuracy.

Benchmark Results

FIGS. 15 through 26 show the results produce at 10, 20, 40 and 70 Hz from firing of each generator. The following are the benchmark results for the three gas pressurized acoustic generators:

TABLE 4

SONOLOG D-6C2 Benchmark Results

| Frequency (Hz) | Intensity (dB) | | Elapsed Time (microseconds) | | Face Angle (degrees) | | Secondary Wave | |
| --- | --- | --- | --- | --- | --- | --- | --- | --- |
| | Chamber pressure (psi) | | | | | | | |
| | 100 | 150 | 100 | 150 | 100 | 150 | 100 | 150 |
| 10 | 153 | 163 | 25 | 21 | 78 | 77 | Y | Y |
| 20 | 155 | 165 | 22 | 18 | 82 | 82 | Y | Y |
| 40 | 157 | 166 | 20 | 23 | 85 | 84 | Y | Y |
| 70 | 158 | 166 | 19 | 33 | 85 | 85 | Y | Y |

TABLE 5

ECHOMETER INC. COMPACT GAS GENERATOR - Benchmark Results

| Frequency (Hz) | Intensity (dB) | | Elapsed Time (microseconds) | | Face Angle (degrees) | | Secondary Wave | |
| --- | --- | --- | --- | --- | --- | --- | --- | --- |
| | Chamber pressure (psi) | | | | | | | |
| | 100 | 150 | 100 | 150 | 100 | 150 | 100 | 150 |
| 10 | 148 | 156 | 33 | 20 | 75 | 79 | Y | — |
| 20 | 152 | 159 | 20 | 12 | 82 | 83 | Y | — |

TABLE 5-continued

ECHOMETER INC. COMPACT GAS GENERATOR - Benchmark Results

| Frequen- | Intensity (dB) | | Elapsed Time (microseconds) | | Face Angle (degrees) | | Secondary Wave | |
|---|---|---|---|---|---|---|---|---|
| cy (Hz) | 100 | 150 | 100 | 150 | 100 | 150 | 100 | 150 |
| | \multicolumn{8}{c}{Chamber pressure (psi)} | | | | | | | |
| 40 | 154 | 161 | 19 | 11 | 84 | 85 | Y | Y |
| 70 | 156 | 162 | 18 | 14 | 86 | 86 | Y | Y |

TABLE 6

PREFERRED EMBODIMENT OF THE CURRENT INVENTION - Benchmark Results

| Frequen- | Intensity (dB) | | Elapsed Time (microseconds) | | Face Angle (degrees) | | Secondary Wave | |
|---|---|---|---|---|---|---|---|---|
| cy (Hz) | 100 | 150 | 100 | 150 | 100 | 150 | 100 | 150 |
| 10 | 156 | 163 | 11 | 18 | 83 | 84 | — | — |
| 20 | 160 | 165 | 8 | 13 | 85 | 86 | — | — |
| 40 | 163 | 166 | 6 | 8 | 87 | 87 | — | — |
| 70 | 164 | 169 | 5 | 7 | 87 | 88 | — | — |

From the results in the following tables there are similarities and differences in erators increased in both intensity and face angle with an increase in the chamber gas pressure. Also all generators increased in both intensity and face angle with an increase in the frequency of the sound.

The change in chamber pressure had a different effect on the elapsed time for the prior art gas pressurized generators when compared to a preferred embodiment of the current invention, providing proof of the effect of the different mechanisms and systems used in the current invention to speed up the equilibration time. For the SONOLOG D-6C2 and the ECHOMETER COMPACT GAS GENERATOR the elapsed time for a pressure chamber set to 150 psi was less than the elapsed time for a pressure chamber set to 100 psi. This result supports the theory that the performance of these gas pressurized acoustic generators is linked to the pressure difference between the chamber and the void.

The preferred embodiment of the current invention produced the opposite result in testing. An increase in the pressure chamber produced an increase in the elapsed time. But regardless of this trend, the preferred embodiment of the current invention produced significantly shorter elapsed times than the prior art gas pressurized acoustic generators for all chamber pressures at all frequencies measured.

What is claimed is:

1. An acoustic generator, a device that generates sound by opening a pressurized gas chamber to a gaseous void, comprising an acoustic generator and a directional microphone positioned in the acoustic generator to detect sounds in a direction perpendicular to the plane of the pressurized gas chamber opening where said directional microphone is further placed behind a passageway in said acoustic generator, said passageway being 45 to 70 degrees relative to the plane of said pressurized gas chamber opening.

2. An acoustic generator as in claim 1 where said directional microphone is further placed in said acoustic generator so that said directional microphone is not located along the line of sight of said pressurized gas chamber opening.

3. An acoustic generator as in claim 2 where said directional microphone is further placed in said acoustic generator so that said directional microphone is not located along the line of sight of said passageway.

4. An acoustic generator as in claim 3 where said directional microphone is a piezoelectric material.

5. An acoustic generator as in claim 4 where said piezoelectric material is a ceramic piezoelectric material.

6. An acoustic generator as in claim 5 where said ceramic piezoelectric material is a planar.

7. An acoustic generator as in claim 6 where said planar ceramic piezoelectric material is a placed perpendicular to the plane of said pressurized gas chamber opening.

8. An acoustic generator as in claim 7 where said planar ceramic piezoelectric material is cylindrical.

9. An acoustic generator as in claim 8 where the inner radius of said planar ceramic piezoelectric cylinder is larger than the radius of said pressurized gas chamber opening.

10. An acoustic generator as in claim 9 where the inner radius of said planar ceramic piezoelectric cylinder is not located in the line of sight of the pressurized gas chamber opening.

11. An acoustic generator as in claim 10 where said ceramic piezoelectric cylinder is not located in the line of sight of the pressurized gas chamber opening.

12. An acoustic generator as in claim 11 where said ceramic piezoelectric cylinder is secured to a cylindrical microphone holder.

13. An acoustic generator as in claim 12 where said microphone element and microphone holder forms a gas-tight seal.

14. An acoustic generator as in claim 13 where said gas-tight seal is vented to atmospheric pressure through said acoustic generator.

15. An acoustic generator as in claim 14 where the inner surface of said ceramic piezoelectric material has at least one positively charged conductive coating.

16. An acoustic generator as in claim 15 where the inner surface of said ceramic piezoelectric material has at least one negatively charged conductive coating.

17. An acoustic generator as in claim 16 where the outer surface of said ceramic piezoelectric material is oppositely charged relative to the inside conductive coating.

18. A microphone unit used in a gaseous void, comprising, a planar piezoelectric microphone element and a microphone holder, said planar piezoelectric microphone element and microphone holder forming a gas-tight cavity that is vented to atmospheric pressure, a first surface area of the microphone element inside said cavity having a positively charged conductive coating, and a second surface area of the microphone element inside said cavity having a negatively charged conductive coating.

19. A microphone unit as in claim 18 wherein the outside surface of said microphone element has a neutrally charged coating.

* * * * *